(12) United States Patent
Agarwal et al.

(10) Patent No.: US 11,216,478 B2
(45) Date of Patent: Jan. 4, 2022

(54) PLAN MODEL SEARCHING

(71) Applicant: o9 Solutions, Inc., Dallas, TX (US)

(72) Inventors: Amit Agarwal, Bangalore (IN);
Koustuv Chatterjee, San Ramon, CA (US)

(73) Assignee: o9 Solutions, Inc., Dallas, TX (US)

( * ) Notice: Subject to any disclaimer, the term of this patent is extended or adjusted under 35 U.S.C. 154(b) by 1120 days.

(21) Appl. No.: 14/885,764

(22) Filed: Oct. 16, 2015

(65) Prior Publication Data
US 2017/0140007 A1 May 18, 2017

(51) Int. Cl.
*G06F 16/248* (2019.01)
*G06Q 10/06* (2012.01)

(52) U.S. Cl.
CPC ....... *G06F 16/248* (2019.01); *G06Q 10/0637* (2013.01)

(58) Field of Classification Search
CPC ............ G06F 17/3064; G06F 17/3079; G06F 17/30696; G06F 17/30991; G06F 17/30554; G06F 17/30716; G06F 17/30719; G06F 17/30672; G06F 17/30867; G06F 17/30398; G06F 16/3322; G06F 16/338; G06F 16/248; G06Q 10/0637
See application file for complete search history.

(56) References Cited

U.S. PATENT DOCUMENTS

| | | | |
|---|---|---|---|
| 5,918,232 A | | 6/1999 | Pouschine et al. |
| 6,900,807 B1 * | | 5/2005 | Liongosari ........ G06F 17/30011 |
| | | | 345/440 |
| 6,983,237 B2 | | 1/2006 | Paterson et al. |
| 7,165,037 B2 | | 1/2007 | Lazarus et al. |
| 7,222,302 B2 | | 5/2007 | Hauser et al. |

(Continued)

FOREIGN PATENT DOCUMENTS

WO WO 2014/032037 2/2014

OTHER PUBLICATIONS

Chreyh, Rachid and Wainer, Gabriel. "CD++ Repository: An Internet Based Searchable Database of DEVS Models and Their Experimental Frames". Published Mar. 22, 2009. Accessed Aug. 30, 2019 from <https://dl.acm.org/citation.cfm?id=1655388> (Year: 2009).*

(Continued)

*Primary Examiner* — Robert W Beausoliel, Jr.
*Assistant Examiner* — Arthur Ganger
(74) *Attorney, Agent, or Firm* — Schwegman Lundberg & Woessner, P.A.

(57) ABSTRACT

An interactive user interface is generated to illustrate a graphical view of a network of plan models. The network of plan models includes a plurality of plan models, each plan model including one or more measures and one or more dimensions. At least one user-entered text character is entered in a query field and the plan models are searched for names of measures and/or dimensions in the plan models that correspond to the user entry. The names are presented as search term suggestions in the search query field and at least one suggestion is selected and adopted as at least a portion of a search query. The network of plan models is searched to generate search results corresponding to the search query. The graphical view of the network of plan models can be revised based on the search results.

17 Claims, 40 Drawing Sheets

(56) References Cited

U.S. PATENT DOCUMENTS

| | | |
|---|---|---|
| 7,437,277 B2 | 10/2008 | Benayon et al. |
| 7,571,082 B2 | 8/2009 | Gilipin et al. |
| 7,711,588 B2 | 5/2010 | Ouimet |
| 7,756,901 B2 | 7/2010 | Their |
| 7,835,893 B2 | 11/2010 | Cullick et al. |
| 7,861,215 B2 | 12/2010 | Tong et al. |
| 7,904,327 B2 | 3/2011 | Phelan et al. |
| 7,908,159 B1 | 3/2011 | Ordonez et al. |
| 7,917,344 B2 | 3/2011 | Butine |
| 7,971,180 B2 | 6/2011 | Kreamer et al. |
| 7,979,248 B2 | 7/2011 | Benayon et al. |
| 8,145,518 B2 | 3/2012 | Cao et al. |
| 8,175,911 B2 | 5/2012 | Cao et al. |
| 8,176,440 B2 * | 5/2012 | Stading .............. G06F 17/30554 715/853 |
| 8,180,623 B2 | 5/2012 | Lendermann et al. |
| 8,195,709 B2 | 6/2012 | Pulfer |
| 8,209,216 B2 | 6/2012 | Whipkey et al. |
| 8,214,238 B1 | 7/2012 | Fairfield et al. |
| 8,214,246 B2 | 7/2012 | Springfield et al. |
| 8,260,587 B2 | 9/2012 | Sanchez et al. |
| 8,306,845 B2 | 11/2012 | D'Imporzano et al. |
| 8,311,863 B1 | 11/2012 | Kemp |
| 8,352,397 B2 | 1/2013 | Rubin et al. |
| 8,359,216 B2 | 1/2013 | Cao et al. |
| 8,386,300 B2 | 2/2013 | April et al. |
| 8,412,548 B2 | 4/2013 | Benayon et al. |
| 8,612,262 B1 | 12/2013 | Condon et al. |
| 8,712,812 B2 | 4/2014 | Snow et al. |
| 2001/0004520 A1 | 6/2001 | Nomoto et al. |
| 2001/0027455 A1 | 10/2001 | Abulleil et al. |
| 2001/0049595 A1 | 12/2001 | Plumer et al. |
| 2001/0053991 A1 | 12/2001 | Bonabeau |
| 2002/0065888 A1 | 5/2002 | Wall et al. |
| 2002/0169658 A1 | 11/2002 | Adler |
| 2003/0187717 A1 | 10/2003 | Crites et al. |
| 2004/0138934 A1 | 7/2004 | Johnson et al. |
| 2004/0162743 A1 | 8/2004 | Thier |
| 2004/0181378 A1 | 9/2004 | Gilmore |
| 2004/0210509 A1 | 10/2004 | Eder |
| 2005/0096950 A1 | 5/2005 | Caplan et al. |
| 2005/0246215 A1 | 11/2005 | Rackham |
| 2005/0261787 A1 | 11/2005 | Plante et al. |
| 2006/0031048 A1 | 2/2006 | Gilpin et al. |
| 2006/0069585 A1 | 3/2006 | Springfield et al. |
| 2006/0074864 A1 * | 4/2006 | Naam .............. G06F 17/30867 |
| 2006/0116922 A1 | 6/2006 | Homann et al. |
| 2006/0129518 A1 | 6/2006 | Andreev et al. |
| 2007/0038465 A1 | 2/2007 | Jang et al. |
| 2007/0038501 A1 | 2/2007 | Lee et al. |
| 2007/0078869 A1 | 4/2007 | Carr et al. |
| 2007/0118419 A1 | 5/2007 | Maga et al. |
| 2007/0156677 A1 | 7/2007 | Szabo |
| 2007/0299743 A1 | 12/2007 | Staib et al. |
| 2008/0004922 A1 | 1/2008 | Eder |
| 2008/0004924 A1 | 1/2008 | Cao et al. |
| 2008/0066067 A1 | 3/2008 | Stimpson et al. |
| 2008/0126394 A1 | 5/2008 | Jain et al. |
| 2008/0133299 A1 | 6/2008 | Sitarski |
| 2008/0140688 A1 | 6/2008 | Clayton et al. |
| 2008/0162480 A1 | 7/2008 | Clayton et al. |
| 2008/0172273 A1 | 7/2008 | Rackham |
| 2008/0221940 A1 | 9/2008 | Cohn et al. |
| 2008/0235179 A1 | 9/2008 | Kurien et al. |
| 2008/0243912 A1 | 10/2008 | Azvine et al. |
| 2008/0312980 A1 | 12/2008 | Boulineau et al. |
| 2008/0313110 A1 | 12/2008 | Kreamer et al. |
| 2009/0018879 A1 | 1/2009 | Flazer et al. |
| 2009/0192867 A1 | 7/2009 | Farooq et al. |
| 2009/0319246 A1 | 12/2009 | Takayama |
| 2010/0070251 A1 | 3/2010 | Sanchez et al. |
| 2010/0082381 A1 | 4/2010 | Merrifield et al. |
| 2010/0082386 A1 | 4/2010 | Cao et al. |
| 2010/0082387 A1 | 4/2010 | Cao et al. |
| 2010/0082696 A1 | 4/2010 | Cao et al. |
| 2010/0106561 A1 | 4/2010 | Peredriy et al. |
| 2010/0161360 A1 | 6/2010 | Clement et al. |
| 2010/0179794 A1 | 7/2010 | Shah et al. |
| 2010/0281241 A1 | 11/2010 | El-Nakhily et al. |
| 2011/0015958 A1 | 1/2011 | April et al. |
| 2011/0022374 A1 | 1/2011 | Benayon et al. |
| 2011/0060704 A1 | 3/2011 | Rubin et al. |
| 2011/0071811 A1 | 3/2011 | Kuehr-McLaren et al. |
| 2011/0153685 A1 | 6/2011 | Butine |
| 2011/0307290 A1 | 12/2011 | Rolia et al. |
| 2012/0116850 A1 | 5/2012 | Abe et al. |
| 2012/0158633 A1 * | 6/2012 | Eder .................. G06N 5/022 706/46 |
| 2012/0265779 A1 * | 10/2012 | Hsu .................. G06F 17/3064 707/767 |
| 2013/0035985 A1 | 2/2013 | Gilbert |
| 2013/0041683 A1 * | 2/2013 | Boissel ................ G06F 19/12 705/2 |
| 2013/0151305 A1 | 6/2013 | Akinola et al. |
| 2013/0151315 A1 | 6/2013 | Akinola et al. |
| 2014/0058712 A1 | 2/2014 | Gottemukkala et al. |
| 2014/0058798 A1 | 2/2014 | Gottemukkala |
| 2014/0058799 A1 * | 2/2014 | Gottemukkala ....... G06Q 10/06 705/7.37 |
| 2014/0330821 A1 * | 11/2014 | Tullis ................ G06F 17/30398 707/728 |

OTHER PUBLICATIONS

PCT International Search Report and Written Opinion in PCT Application Serial No. PCT/US2013/056540 dated Dec. 17, 2013.
PCT International Preliminary Report on Patentability in PCT International Application Serial No. PCT/US2013/056540 dated Feb. 24, 2015 (14 Pages).
U.S. Appl. No. 13/410,222, filed Mar. 1, 2012 entitled Global Market Modeling for Advanced Market Intelligence, inventors Chakradhar Gottemukkala et al.
U.S. Appl. No. 14/493,277, filed Sep. 22, 2014 and entitled Business Graph Model, inventors Devaraya Prabhu et al.
U.S. Appl. No. 14/751,526, filed Jun. 26, 2015 entitled Plan Modeling and User Feedback, inventors Chakri Gottemukkala et al.
U.S. Appl. No. 15/054,036, filed Feb. 25, 2016 entitled Unstructured Data Processing in Plan Modeling U.S. Appl. No. 15/054,036, inventors Chakri Gottemukkala et al.
U.S. Appl. No. 14/752,774, filed Jun. 26, 2015 and entitled Plan Modeling and Task Management, inventors Chakri Gottemukkala et al.
U.S. Appl. No. 14/752,810, filed Jun. 26, 2015 and entitled Plan Modeling Visualization, Inventors Chakri Gottemukkala et al.

* cited by examiner

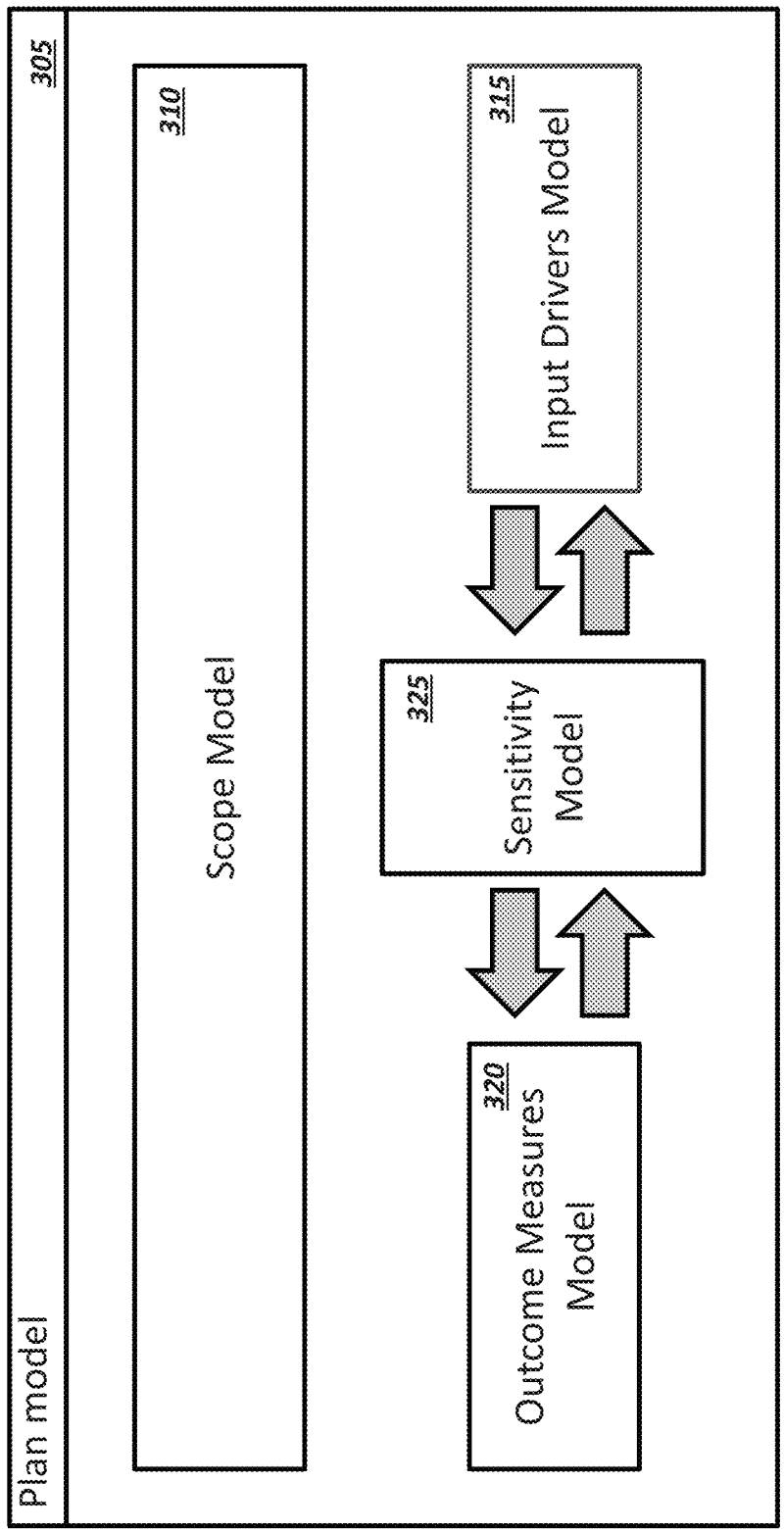
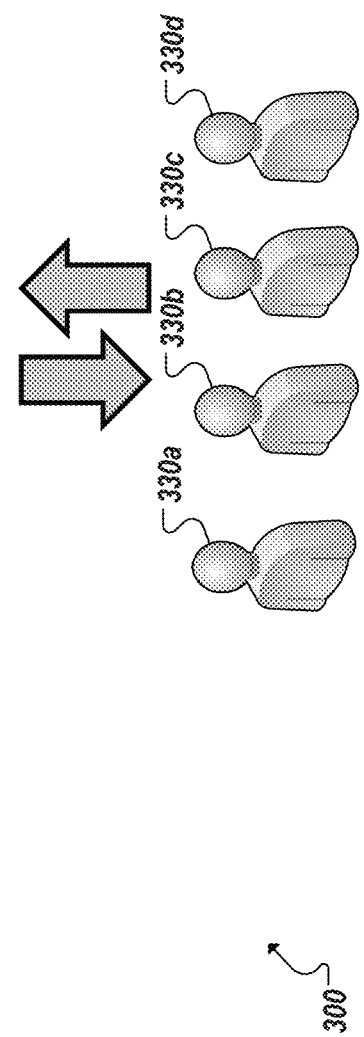
FIG. 3

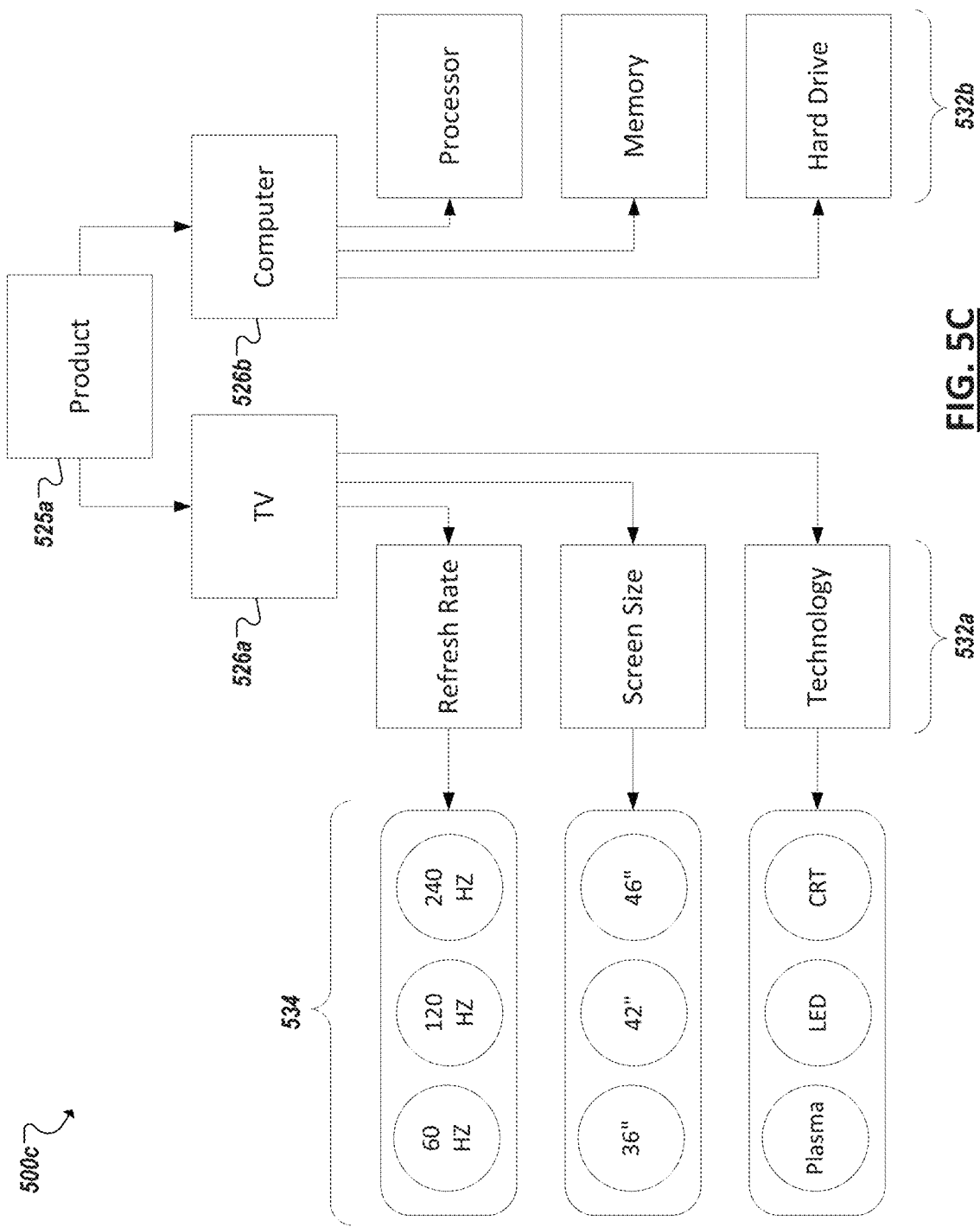

Include Members where "Member Type" = "TV" and "Technology" = "PLASMA" or "LED" and "Screen Size" <> "36""

| PRODUCT ID | Member Type | Technology | Screen Size | Refresh Rate |
|---|---|---|---|---|
| M1 | TV | PLASMA | 46" | 120HZ |
| M2 | TV | PLASMA | 46" | 240HZ |
| M3 | TV | PLASMA | 42" | 120HZ |
| M4 | TV | PLASMA | 42" | 240HZ |
| M9 | TV | PLASMA | 36" | 120HZ |
| M10 | TV | PLASMA | 36" | 240HZ |
| M5 | TV | LED | 46" | 120HZ |
| M6 | TV | LED | 46" | 240HZ |
| M7 | TV | LED | 42" | 120HZ |
| M8 | TV | LED | 42" | 240HZ |
| M11 | TV | LED | 36" | 120HZ |
| M12 | TV | LED | 36" | 240HZ |
| M13 | TV | CRT | 46" | 120HZ |
| M14 | TV | CRT | 46" | 240HZ |
| M15 | TV | CRT | 42" | 120HZ |
| M16 | TV | CRT | 42" | 240HZ |
| M17 | TV | CRT | 36" | 120HZ |
| M18 | TV | CRT | 36" | 240HZ |
| ... | ... | ... | ... | ... |

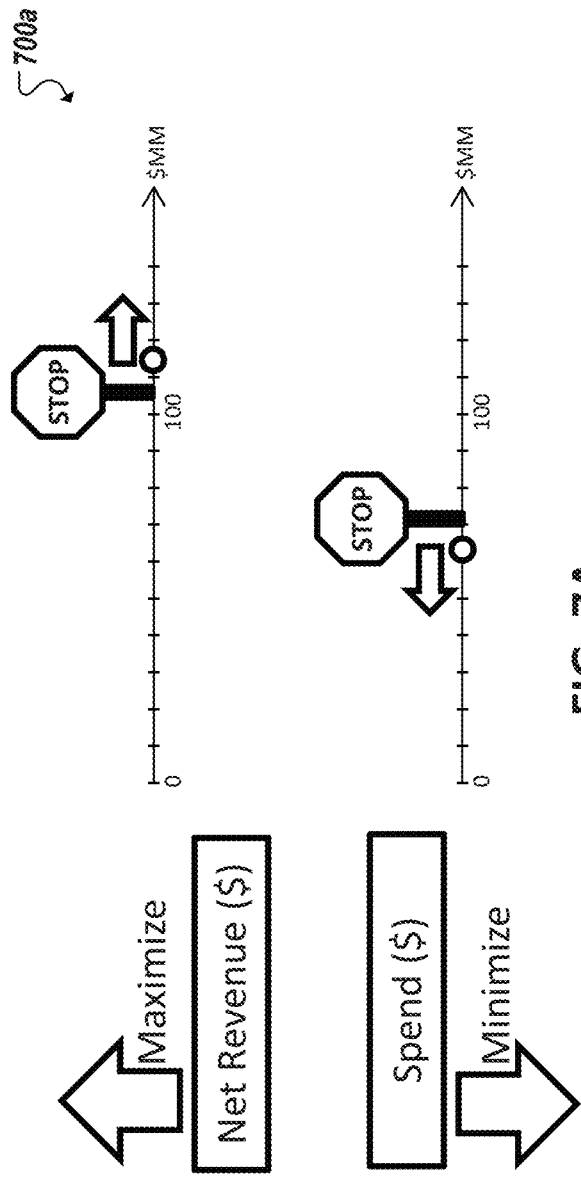
FIG. 7A
FIG. 7B
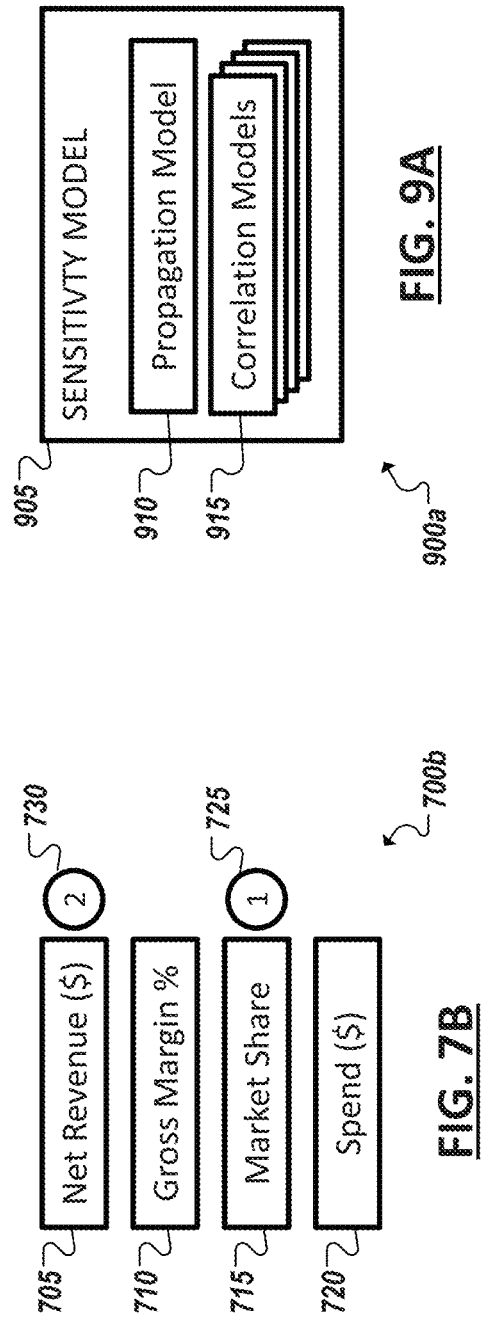
FIG. 9A

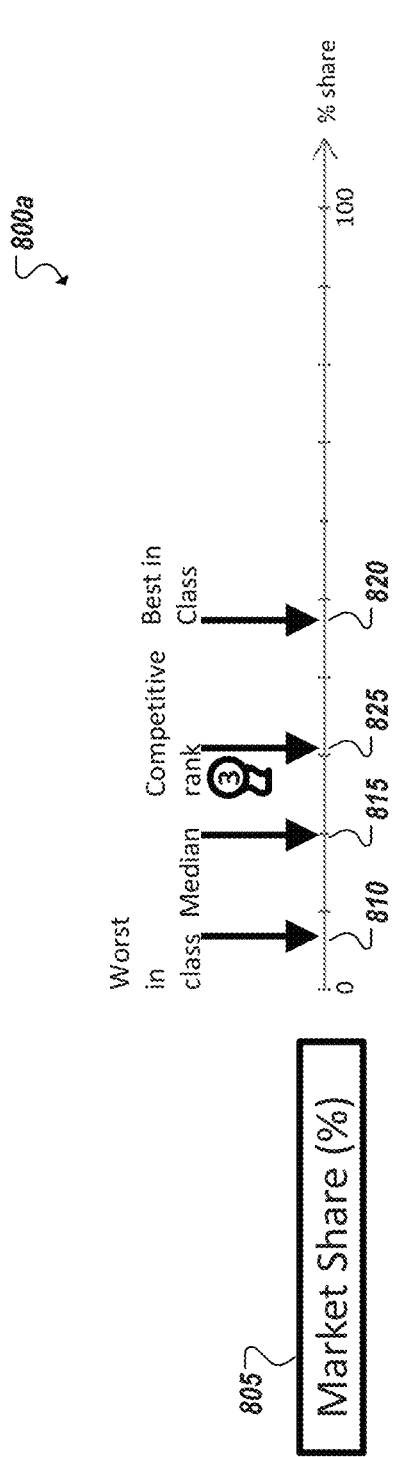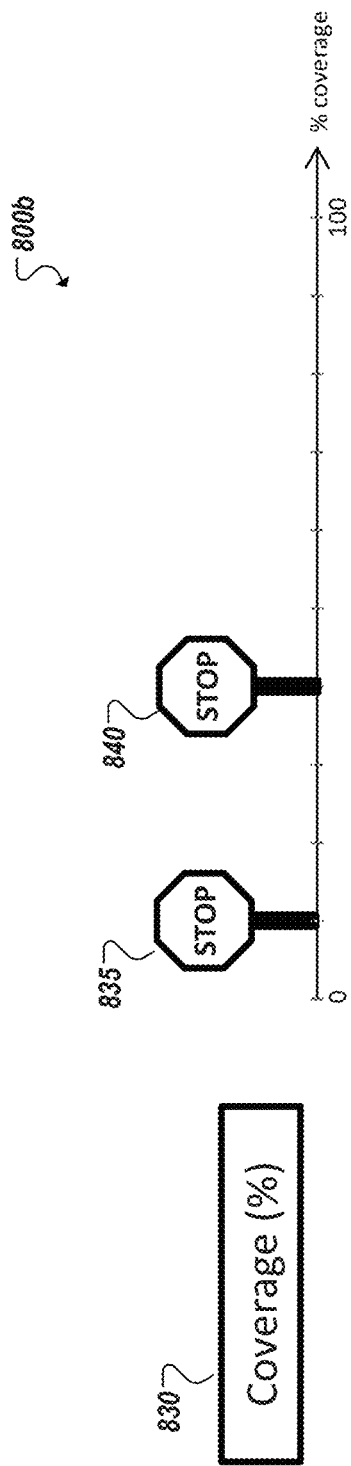

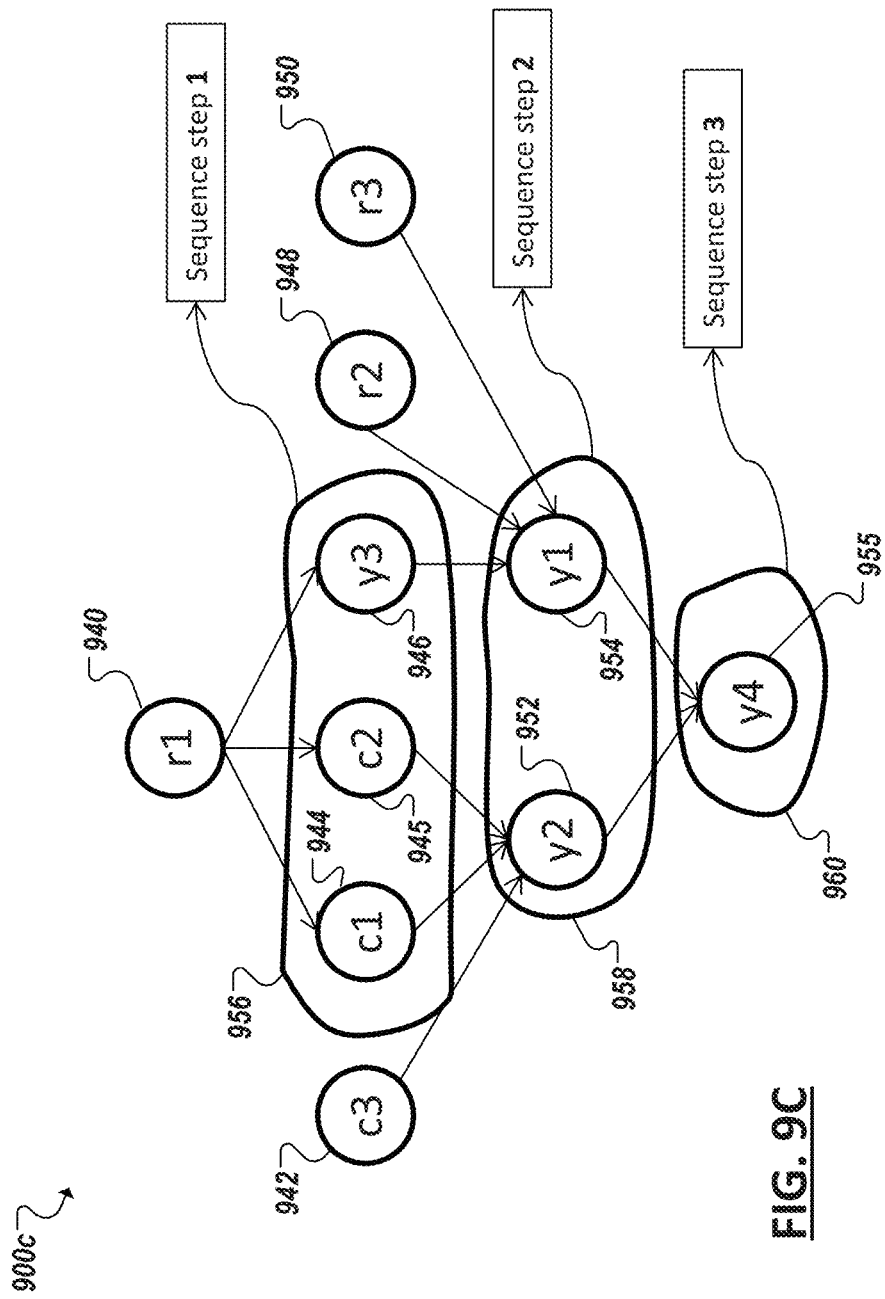

PLAN MODEL SEARCHING

TECHNICAL FIELD

This disclosure relates in general to the field of computer software modeling and, more particularly, to searching a data structure modeling business outcomes.

BACKGROUND

Modern enterprises are competing in global markets that are increasingly complex and dynamic. A single enterprise may have a multitude of different departments, managers, and assignments, each having their own respective objectives, plans, and goals commensurate with their respective roles within the enterprise. Additionally, a single enterprise may have one or more enterprise-wide goals that involve the collaboration and involvement of its different departments, managers, and business units. For each goal, an enterprise may develop a plan for realizing the goal. A variety of different paths may exist for reaching the goal and a plan can establish which of these paths will be followed, such as defined by the particular activities, inputs, and steps the enterprise will adopt in pursuing its goal. Because a variety of potential paths may be adopted by an enterprise to reach its goal, planning can involve determining which of the path(s) are most desirable or optimal for the particular enterprise. Additionally, planning can involve the modification or replacement of previously-adopted plans based on changed conditions within the enterprise, the market place, or geopolitical landscape in which the enterprise exists.

BRIEF SUMMARY

According to one aspect of the present disclosure, an interactive user interface can be generated to illustrate a graphical view of a network of plan models. The network of plan models can include a plurality of plan models, each plan model including one or more measures and one or more dimensions. Each plan model can model a future outcome of a corresponding business domain. A user search request for a search can be received through the interactive user interface, and a search query field can be presented in the interactive user interface. At least one user-entered text character entered in the search query can be detected and the network of plan models can be searched for names of at least one of the corresponding measures and dimensions corresponding to the at least one user-entered text character. The names can be presented as search term suggestions in the search query field and a selection of at least one of the presented names can be received and adopted as at least a portion of a search query. The search query can be received and include a plurality of search terms including the selected at least one presented name. The network of plan models can be searched to generate search results corresponding to the search query. The graphical view of the network of plan models can be revised based on the search results. Indeed, in some instances, the graphical view can be revised to present an infographic representing the search results.

According to another aspect of the present disclosure, a search query corresponding to a network of plan models can be received and the network of plan models can be searched to generate search results corresponding to the search query. The search results can be presented on a graphical user interface as an infographic providing a graphical visualization of the search results. A user request can then be received, through the graphical user interface, to cause the infographic to be included in a particular one of a plurality of windows of a dashboard user interface. In some instances, the infographic can update, within the dashboard, in response to changes to the underlying plan model(s) searched to generate the infographic.

BRIEF DESCRIPTION OF DRAWINGS

FIG. 3 is a simplified block diagram representing principles of an example plan model;

FIGS. 5A-5I are simplified block diagrams illustrating example features and models of an example scope model of an example plan model;

FIGS. 7A-7B are simplified representations of outcome measure guidance in connection with an example plan model;

FIGS. 8A-8B are simplified representations of input driver guidance in connection with an example plan model;

FIGS. 9A-9D are simplified block diagrams illustrating example features of an example sensitivity model of an example plan model;

FIG. 10A is a simplified block diagram illustrating an example process model of an example plan model;

FIGS. 13A-13D are screenshots of example user interfaces for use in connection with one or more example plan models;

Like reference numbers and designations in the various drawings indicate like elements.

DETAILED DESCRIPTION

Figure 1:
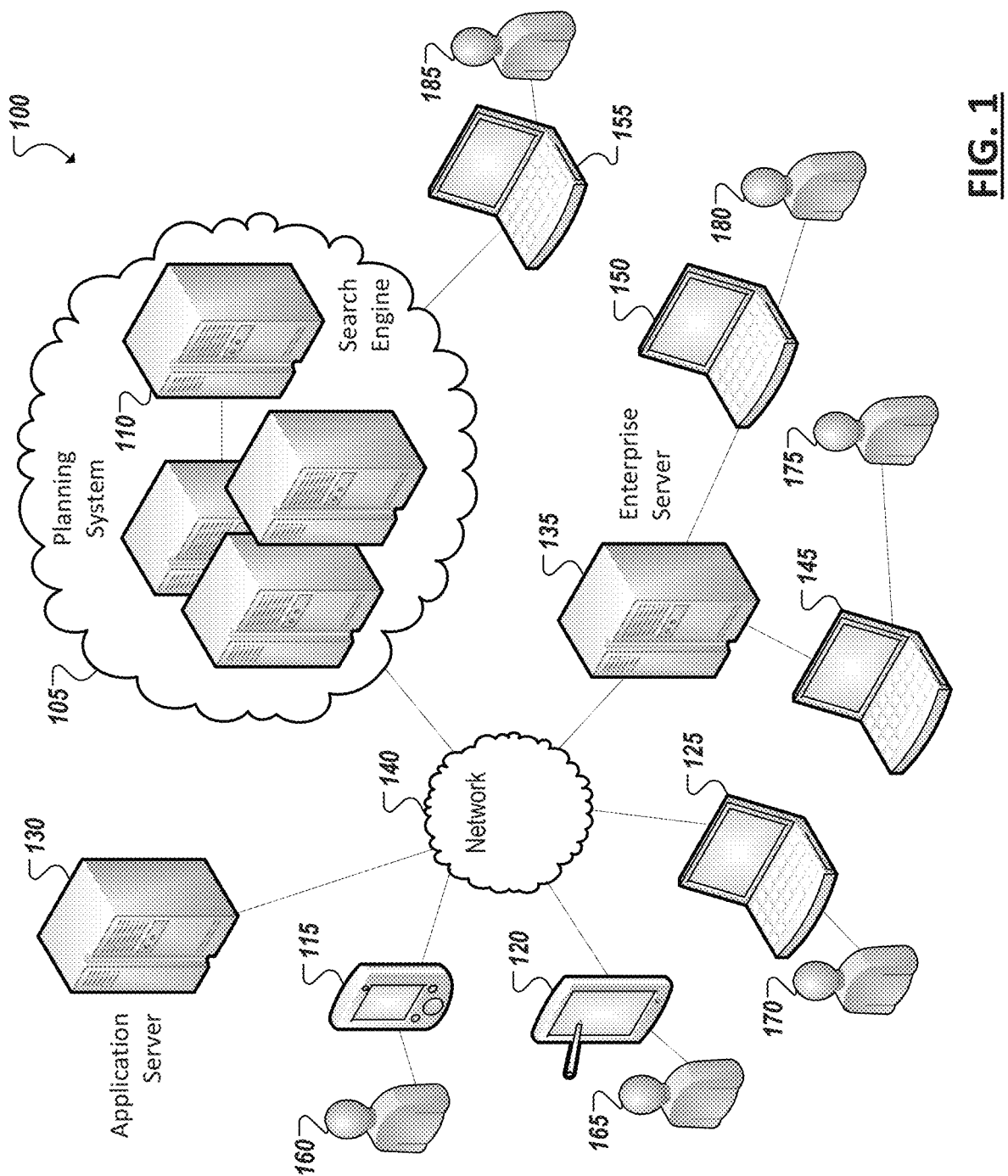
FIG. 1 is a simplified schematic diagram of an example computing system adapted to provide one or more example plan models.

A system is provided that allows users to search a data structure implementing a model of the goals of an enterprise. The data structure can define a structure including multiple plan models each modeling a future outcome of the enterprise relating to a corresponding domain of the enterprise's business. Each model can include sub-models modeling aspects of the domain and the respective inputs within the domain that contribute to the modeled future outcome. This data structure can be searched, using the system, using natural language or assisted natural language query terms. The results can be presented as infographics generated from data returned, and in some cases generated, in response to the query. Such searches can enable interactive, quick, and collaborative decision making for a given user role or roles and can function to achieve the specified domain's goals.

In a general example, the data structure can be defined according to multiple dimensions and levels and include quantitative data structures including measures (of inputs and outcomes/goals) and edge properties (e.g., quantitative data stored against edges of the enterprise graph). The data structure can additionally define relationships between business entities (modeled as graphs) as well as relationships between outcomes and their corresponding inputs. Both qualitative and quantitative enterprise data can be stored and organized in the data structure. The multiple business entities entered within the data structure can serve as keywords for all of the data within the structure, both qualitative and quantitative. For instance, the composite quantitative data structures, such as measure names, edge property names, and relationship types amongst business entities can also serve as keywords.

Modern enterprises can often include complex organizations, such as large multinational corporations with multiple business units and departments operating in multiple different countries, as well as organizations competing in multiple different marketplaces, including multiple product markets and geographical markets, among other examples. Organizations can also include stock and commodity markets and exchanges, non-profit organizations, charities, religious organization, educational institutions, joint-ventures, market segments, trade associations, and so on. Such organizations can adopt a variety of goals and plans in connection with their respective operation, including for-profit and not-for-profit goals. Planning and decision-making activities in connection with these goals has become increasingly complex. For instance, such goals can be set at various levels within the organization, including at the organization level (i.e., goals that apply to the entire organization) as well as at various sub-levels, such as the business unit sub-level, the department sub-level, the region sub-level, the office sub-level, etc. Sub-level goals may be limited in their scope to their respective sub-part of the organization and may only concern a subset of people within the organization. Further, some goals may be limited temporally, such as goals that apply to a certain period (such as a financial year or quarter). Regardless of the level or type of goal, plans can be adopted by the organization or portion of the organization for accomplishing these goals. In some instances, plans and goals of different sub-parts of an organization can conflict and the amount of time needed to communicate and synchronize plans and goals can prevent adequate collaboration and coordination within the organization. Further, a plan may involve setting targets for a variety of inputs relating to a variety of different business entities. The inputs may include values quantifying or defining attributes of the respective business entities relevant to the goal and plan. Such business entities can include such entities as product categories, distribution channels, supply channels, customers, products, fiscal calendar terms, geographic regions and sub-regions, etc.

Software-based models and systems can be developed that model plans, goals, and outcomes within an organization. Such "plan models" can be accessed and used by systems and users to assist in improving an organization's (or group of organizations') planning activities, as well as the realization of the goals associated with its planning activities. A set of plan models can be provided, each plan model corresponding to a defined domain relevant to an organization and modeling aspects of that domain as well as the inputs and outcomes relevant to achieving or analyzing goals of the specified domain. Plan models can be used to enable interactive, quick, collaborative decision-making within an organization, including along particular user or department roles and functions. Plan models can be used, for example, to assess, generate, and modify plans and goals within the organization to increase the overall success of the organization. For instance, plan models can be interlinked to model the interconnectedness of some plans and goals of an organization. Plan models can be used to coordinate the efforts of various portions of an organization directed to different goals to optimize the activities of an organization. Additionally, scenario planning can be carried out using such plan models, with business scenarios of the organization being modeled and compared based on the plan models. Additionally, plan models and business scenarios based on plan models can provide decision-makers of an organization with views into the business entities and attributes relevant to the organization's goals, including views at various levels of abstraction and detail. In general, such plan model and business scenarios can be used to guide the direction of real-world departments and business of an organization, whether for-profit or not-for-profit, to assist in the achieving of the organization's (or multiple organizations') varied goals.

FIG. 1 is a simplified block diagram illustrating an example implementation of a computing system 100 including a planning system 105 capable of generating, maintaining, and serving a plurality of enterprise data models to potentially several different clients. Additionally, a planning system 105 can further include programs, tools, and functionality allowing clients to access, develop, and interact with enterprise data models (e.g., plan models), including the visualization of data contained and synthesized within the enterprise data models and searching of the enterprise data models using natural language and/or directed natural language searching (e.g., using search engine 110).

Enterprise data models can include business model graphs with unlimited dimensions, attributes and properties, multiple hierarchies, and member specific attributes. A system, or network, of interrelated models can be defined to model the intricacies of a specific enterprise and its composite business processes and entities. Relationships can be defined between models including parent-child and graph/network relationships. Multi-dimensional models can be interlinked at appropriate levels of details. Linking can facilitate automatic propagation of changes across linked models. Further, rules can be defined according to a business definition language. The business definition language can support real-time read/write analytics optimized for querying and performing computations using data stored within the models.

A planning system can include an engine can enabling high performance analytics. Analytics and activities enabled by the planning system can include the defining and flagging of personalized alerts, alert propagation based on the graph model, and proactive monitoring of such alerts and events. Scenario analysis can be supported including private and public scenarios and the performance of what-if simulations in real-time. The models can utilize and enhance unstructured data including collaboration context linking to a data model, smart tagging using the underlying models, and contextual plan discussions and cell comments. A computation engine can also be included in the planning system that supports real-time active rules using greedy computations, intelligent incremental planning for impacted cells, fast in-memory online analytical processing (OLAP), and plan versioning snapshots to persistent stores. A library of logic can further be provided to support time-series algorithms, supply planning and replenishment solvers, plug-in extensions to custom or proprietary solvers for potential any calculation (e.g., forecasting, network, inventory, etc.).

The planning system can provide an interactive planning visualization interface. GUIs can be generated providing differentiated user experience and simple and intuitive visual exploration of complex planning data. Read-write analytics can be visualized through the provision of rich interactive widgets to allow active planning as well as visualization of data. A GUI engine included in the planning system can consume and render data that is provided through highly optimized application programming interfaces (APIs) to support real-time updates and incremental planning. The GUIs can further leverage the information with the models to create and manage scenarios for quick interactive planning to perform what-ifs on your data. The GUIs can also be used to visualize and manage workflows to promote scenarios into current working views (e.g., through approvals, events calendaring, etc.).

Client computing devices can include endpoint user devices (e.g., 115, 120, 125, 145, 150) that can include display devices and user interfaces allowing users (e.g., 160, 165, 170, 175, 180) to interact with planning system 105, plan models hosted or provided by the planning system 105, search engine 110, and other tools, and applications, programs, and services hosted or provided by the planning system that allow users to interact with, edit, build, generate and compare scenarios from the plan models, as well as analyze, and generate working business plans for the organization from the plan models. In some instances, client computing devices can include endpoint devices (e.g., 155) local to the planning system 105 allowing administrators, model developers, and other users (e.g., 185) to develop and maintain plan models and plan model tools hosted or provided by the planning system 105. Endpoint devices can also include computing devices remote from at least a portion of the planning system 105 and accessing planning system resources, such as plan model interaction tools and plan models, from the planning system 105 over one or more networks (e.g., 140). In some implementations all or a portion of the planning system 105 (including search engine 110) can be distributed to or implemented on clients (e.g., 115, 120, 125, 145, 150), such as client-specific plan models, software tools for use by clients in interacting with and using plan models, etc.

In addition to endpoint devices, other systems can also act as clients of planning system 105. For instance, application servers (e.g., 130) hosting one or more applications, services, and other software-based resources can access and use plan models and functionality of planning system 105 and search engine 110 in connection with the applications and services hosted by the application server (e.g., 130). Enterprise computing systems (e.g., 135) can also interface with and use plan models and services of an example planning system 105 with search capabilities. For instance, enterprise-specific plan models can be developed and used by endpoint devices (e.g., 145, 150) within the enterprise. In some instances, other enterprise tools and software can be provided through enterprise computing system 135 and consume data provided through plan models and plan-model-related services of the planning system 105, among other examples.

In general, "servers," "clients," and "computing devices," including computing devices in example system 100 (e.g., 105, 110, 115, 120, 125, 130, 135, 145, 150, 155, etc.), can include electronic computing devices operable to receive, transmit, process, store, or manage data and information associated with computing system 100. As used in this document, the term "computer," "computing device," "processor," or "processing device" is intended to encompass any suitable processing device. For example, the system 100 may be implemented using computers other than servers, including server pools. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, and computing devices (e.g., 105, 110, 115, 120, 125, 130, 135, 145, 150, 155, etc.) can each include one or more processors, computer-readable memory, and one or more interfaces, among other features and hardware. Servers can include any suitable software component or module, or computing device(s) capable of hosting and/or serving software applications and services (e.g., plan models and plan model applications and services of the planning system 105, applications and services of application server 130, applications and services of enterprise system 135, etc.), including distributed, enterprise, or cloud-based software applications, data, and services. For instance, servers can be configured to host, serve, or otherwise manage models and data structures, data sets, software service and applications interfacing, coordinating with, or dependent on or used by other services and devices. In some instances, a server, system, subsystem, or computing device can be implemented as some combination of devices that can be hosted on a common computing system, server, server pool, or cloud computing environment and share computing resources, including shared memory, processors, and interfaces.

User or endpoint computing devices (e.g., 105, 110, 115, 120, 125, 145, 150, 155, etc.) can include traditional and mobile computing devices, including personal computers, laptop computers, tablet computers, smartphones, personal digital assistants, feature phones, handheld video game consoles, desktop computers, internet-enabled televisions, and other devices designed to interface with human users and capable of communicating with other devices over one or more networks (e.g., 140). Attributes of user computing devices, and computing device generally, can vary widely from device to device, including the respective operating systems and collections of software programs loaded, installed, executed, operated, or otherwise accessible to each device. For instance, computing devices can run, execute, have installed, or otherwise include various sets of programs, including various combinations of operating systems, applications, plug-ins, applets, virtual machines, machine images, drivers, executable files, and other software-based programs capable of being run, executed, or otherwise used by the respective devices.

Some computing devices (e.g., 105, 110, 115, 120, 125, 145, 150, 155, etc.) can further include at least one graphical display device and user interfaces allowing a user to view and interact with graphical user interfaces of applications and other programs provided in system 100, including user interfaces and graphical representations of programs interacting with plan models and plan-model-related tools and service provided, for example, by a planning system 105. Moreover, while user computing devices may be described in terms of being used by one user, this disclosure contemplates that many users may use one computer or that one user may use multiple computers.

While FIG. 1 is described as containing or being associated with a plurality of elements, not all elements illustrated within system 100 of FIG. 1 may be utilized in each alternative implementation of the present disclosure. Additionally, one or more of the elements described in connection with the examples of FIG. 1 may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
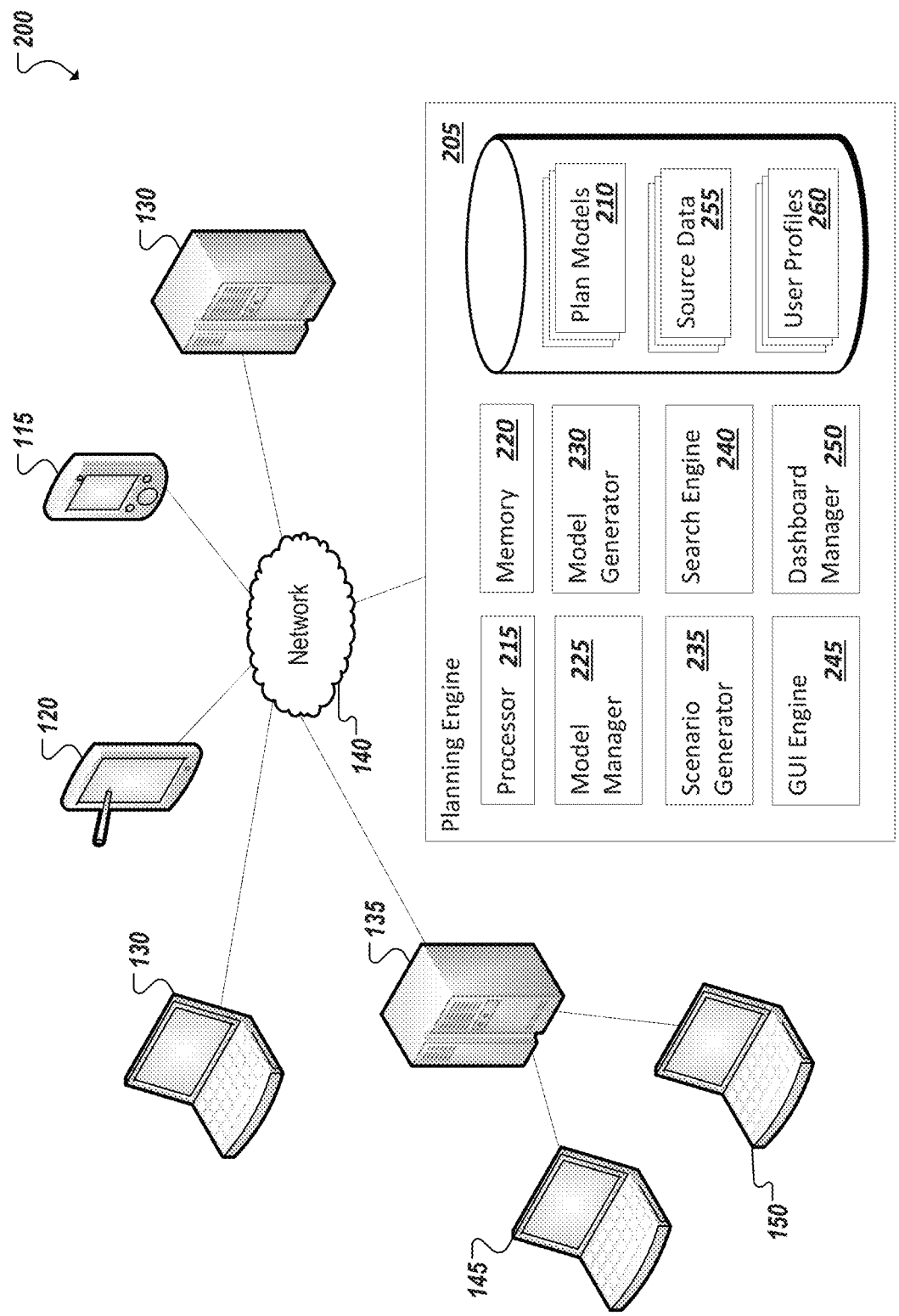
FIG. 2 is a simplified block diagram of an example system including an example plan model engine.

Turning to FIG. 2, a simplified block diagram is shown of an example system 200 including an example plan model engine 205. In some instances, plan model engine 205 can be hosted by a planning system, such as the planning system 105 described in the example of FIG. 1. In other examples, instances of a plan model engine 205 (including multiple distinct instances) can be hosted on enterprise computing platforms and other computing environments accessing and otherwise making use of plan models (e.g., 210). A plan model engine 205 can host, serve, maintain, access, or otherwise provide a set of plan models 210 used to model potential business outcomes of a particular organization or plurality of organizations. A plan model engine 205 can additionally include functionality for using, building, and editing enterprise data models, including plan models 210, as well as providing graphical user interfaces (GUIs) to visualize views of the information defined by the models 210. The GUIs can include search functionality to allow users to search the information included in the plan models 210, with the search using the defined structure of the plan model data structures to deliver insights into forward-looking metrics of a particular business domain in response to the search. Such functionality can be consumed by one or more additional computing devices, systems, and software-based tools (e.g., 115, 120, 125, 130, 135, 145, 150) communicating with plan model engine 205, for instance, over one or more networks (e.g., 140).

In one example implementation, a plan model engine 205 can include one or more processors (e.g., 215) and memory elements (e.g., 220), as well as one or more software- and/or hardware-implemented components and tools embodying functionality of the plan model engine 205. In some examples, a plan model engine 205 can include, for instance, such components and functionality as a model manager 225, model generator 230, scenario generator 235, search engine 240, GUI engine 245, and dashboard manager 245, among potentially other components, modules, and functionality, including combinations of functionality and tools described herein. In addition, in some implementations, a plan model engine can include plan models 210 either hosted local to the plan model engine 205 or accessed from remote plan model servers or other data stores. Functionality of plan model engine 205 can access, utilize, and consume plan models of the plan model engine 205 as well as potentially plan models of other planning systems or plan model engines (e.g., an instance of a planning system belonging to another enterprise distinct from the enterprise or host of plan model engine 205), among other examples.

In some implementations, an example model manager 225 can include functionality for identifying and accessing plan models 210. For instance, a model manager 225 can be used, for instance, to identify and instantiate or access one or more plan models in connection with a scenario session or search, among other examples. In some implementations, a model manager can also identify instances where a plan model is to be generated, edited, or otherwise modified. An example model generator 230 can be included possessing functionality for creating or editing plan models. In some instances, a plan model can be generated by instantiating an instance of a preexisting plan model, plan model template (or class), among other examples. Further, in some implementations, user interfaces and controls can be provided in connection with an example model generator 230 allowing human or automated users to input data to populate and be used in an instantiation of a plan model. In some instances, source data (e.g., 250) can also be collected, requested, retrieved, or otherwise accessed to populate attribute fields, build logic of the plan model, calculate results from the logic within a given plan model, or be otherwise used (e.g., by model generator 230) to generate an instantiation of a particular plan model for addition to the set of plan models 210.

Particular instances of a plan model or a particular set of attribute values of a particular plan model can be adopted by an organization as a model of a current working plan, goal, assumption, or approach to be considered by the organization both in its analysis of other business scenarios (e.g., as modeled using plan models 205) as well as drive the real world behavior and decision-making of the organization. Various versions of one or more of the plan models 210 as well as the set of plan models themselves 210 can be tracked and managed using an example plan manager 225. For instance, a plan manager 225 can manage status of plan models 210, including modeled scenarios generated based on plan models. For example, a particular modeled scenario can be designated as a current working model, adopted business plan, etc. of an organization, and serve as a guide to the organization's decision makers and employees. Accordingly, the plan manager 225 can operate, in some instances, in connection with an example scenario generator 235 for use in connection with plan models 210. A scenario generator 235 can include functionality for generating hypothetical business scenarios based on one or more plan models. Such scenarios can include modeled scenarios based on particular or varying input drivers (e.g., modeling real world business-related inputs affecting a particular business goal or outcome), as well as based on particular goals (e.g., modeling hypothetical conditions that could result in a particular outcome). Additionally, some implementations of scenario generator 235 can further include functionality adapted to provide guidance to users in connection with the generation or modification of a particular scenario or comparisons of generated scenarios. Further, implementations of a scenario generator 235 can additionally include functionality for comparing generated scenarios, for instance, to determine whether a particular scenario is superior to another. In instances where a user determines that a particular modeled scenario is superior to other scenarios, including scenarios previously designated as current or adopted working models, the particular scenario can be flagged, saved, promoted, or otherwise specially designated, for instance, as a working or adopted scenario of the organization relating to particular goals of the organization, among other examples.

The planning engine 205 can include a GUI engine 245 to generate graphical representations of the information derived from the plan models 210. Such GUIs can be used within a scenario session and can include infographics of varying types used to provide visualizations of the information within the plan models 210. A view of a particular portion of the data within the plan model network can be represented in multiple alternative ways. Indeed, a user can toggle between infographic types to present the same data in varying ways and assist the user in assessing the data and interacting with corresponding scenarios. The GUI engine 245 can support such GUI presentations such as described and illustrated in U.S. patent application Ser. No. 14/752,810, entitled "Plan Modeling Visualization," filed Jun. 26, 2015, incorporated by reference herein in its entirety.

The GUIs generated and presented using GUI engine 245 can include a search icon, field, or other control to allow a user to initiate a search query of the information included within the plan models 210. Interaction with the interactive GUI elements representing various portions of a network of plan models 210 can allow a user to filter, navigate, and inspect various aspects of the network of plan model 210. However, such "manual" navigation through the interactive GUI infographics may be time-consuming and inefficient. To directly inspect a certain subset of data relating to modeled future outcomes of an enterprise domain, a user may provide a search query within the GUI search field to prompt search engine 240 to search the network of plan models 210 in response to the search query. The search engine can return search results which can be rendered into one of the supported infographic types provided through GUI engine 245. The search results can also be toggled between different infographic type views (e.g., pie chart, table, line chart, bar chart, etc.) in accordance with user selection of an infographic type through the presented GUI. Additionally, GUI engine 245 can inspect the search query and/or search results to predict which of the supported infographic views is most appropriate for the type of search results. For instance, if the search results compare values of multiple different measures, an infographic type that permits comparison can be selected. In another example, if the search results show measure values over a time dimension, a line chart or other infographic type showing chronology can be selected. Generally, the GUI engine 245 can select an appropriate initial infographic type for any given search. The selected initial infographic type can vary depending on the nature of the search query and related results.

The search engine 240, in some implementations, can support full natural language searching, converting a natural language search query into a syntax compatible with the particular defined structure of the network of plan models. In one example, the search query can be converted into a query of a business planning language, such as Integrated Business Planning Language (IBPL) queries. The syntax can identify particular measures and dimensions defined within the network of plan models from the user-provided natural language search query and search the plan model(s) (and sub-models within the plan model(s)) corresponding to these identified measures and dimensions. The data within the identified plan models can then be used to generate the corresponding search results. In some cases, the business planning language can not only support the generation of search results from retrieval of data (structured or unstructured) within the plan models, but can also support the calculation of new metrics and measures from the plan model data. For instance, the search engine 240 can answer a search query by exploring the data model's structure, by matching the keywords in the user query to the keywords in the data model and generating search results that include either one or both of data previously stored in the plan models or running an on-demand computation (using the existing plan model data) to generate the search results.

The search engine 240 can be utilized to answer queries of a variety of different types. For instance, the search engine 240 can answer search queries supporting any one of descriptive analytics, predictive analytics, and prescriptive analytics, among other examples. For instance, descriptive analytics searches can include searches for information about a particular business entity (e.g., a department, account, product, service, etc. of the business). Among the search results that can be returned from the plan models (and other enterprise data models searchable by the search engine 240) can be the business entity and its various properties, the business entity and various facts associated with it (which could be multidimensional facts, filtered and summarized for this entity), recent conversations (e.g., in enterprise email, text messenger messages, social media messages, etc.) about this business entity, recent alerts raised against this business entity, and links or views providing additional information about this business entity (e.g., source data), and how it is related to other business entities, among other examples. Descriptive analytics searches can also include searches for information about how a particular business entity is related to other business entities. Such searches might take the form, for example, of inquiries such as "In which accounts is product X assorted?," "Which finished goods use this component X?," "Which components are used to make this finished good X?," "What promos are running for Product X in Q3 2015?," etc. For such inquiries, the search engine 240 can formulate a machine language graph query from this human language search query and explore the enterprise data model to find the answers and present the search results in terms of a set of business entities, and summary information on each. It also provides links to other screens where additional information is available. Descriptive analytics searches can also include searches for quantitative facts (e.g., "What were the sales for Product X in year 2014?"), with the search results presenting the returned information in one or more of the supported GUI infographic formats. Another example of a descriptive analytics search can be the search for information from external publicly available resources. For instance, the search engine 240 can be equipped with logic to search a defined network of enterprise planning data models (e.g., using IBPL queries) as well as web-based resources, such as product/service ratings catalogues on another enterprise's ecommerce or other website, among other examples.

Predictive analytics searches, supported by search engine 240, can include searches for facts that do not yet exist and that involve predictive computations based on assumptions or other information modeled in the enterprise data model. For example, a user can search for "What is the sales for Product X likely to be in January 2016?" The search engine 240 can interpret such queries to run predictive computations on-demand, based on underlying algorithms. For example, the search engine 240 can utilize a time-series-based statistical forecasting technique to generate an answer to a predictive analytics search query. In other examples, decision tree-based predictive analytics techniques (e.g., regression analysis or other multi-variate techniques) or other algorithms can be employed. In some implementations, a library of available analytics algorithms can be provided for use by search engine 240 to generate data as a result to a query. In some cases, one or more of the algorithms in the library can be alternatively used to derive a predictive result for a query. Upon receiving the search query, the type and/or content of the query can be identified and a particular algorithm in the library of algorithms can be selected and used to generate a result (e.g., by applying the algorithm to the data and structure of the plan model(s)). In cases where multiple algorithms in the library can be used to answer a particular type of search query, backend services of the planning engine can be used to perform a meta-analysis of various algorithms' performance in generating predictive results to particular types of queries. For instance, testing can be performed to compare the historical performance (e.g., accuracy) of one algorithm versus another in generating results for a particular type of search query of the network of plan models. Based on this testing, certain algorithms within the library can be matched to certain types of queries, such that that algorithm is selected for use by the search engine when the corresponding query type is identified. In either event, algorithms can be used to generate results to varied types of search queries. Indeed, the results can constitute "new" data (i.e., data not already in the plan model) derived from the plan model. These results can then be presented to the user in a GUI according to one or more of the supported infographics of the GUI.

Prescriptive analytics searches, supported by search engine 240, can include searches for recommendations based on the underlying enterprise data models. An example of such a search can include a query such as "Who are the best resources to support this project X?" To generate an answer to such a query, the search engine 240 can identify corresponding plan models and underlying data to compute a corresponding result. For instance, to answer the above example question, the search engine can determine attributes of the project X and attributes of available resources, as modeled in one or more underlying plan models. The search engine 240 can also identify previously generated scenarios or plans ("playbooks") to recommend possible actions that have in the past proved to be more successful. The recommendation results can be presented in the GUI as a set of settings, assumptions, and measure values that represent the recommendation. The same can be graphically represented within one or more of the supported infographic formats supported by the GUI engine 245.

In some implementations, search engine 240 can support assisted natural language searching (e.g., in lieu of or in addition to full natural language searching). For instance, the search engine 240 can detect characters entered in a search field and make search term recommendations based on these characters to assist the user in generating a search that is more likely to be correctly interpreted and converted to the syntax (e.g., IBPL) used to search the underlying enterprise data models (including a network of plan models). For instance, the names of various measures and/or dimensions defined within one or more of the data models can be identified that correlate with text entered by a user. The names of these identified measures and dimensions can be presented for selection to the user. The user can select one of the names and adopt the name as a term within the search query. The user can additionally provide one or more modifier terms within the search query to define relationships between the measure and dimension and one or more other terms including other selected terms recommended by the search engine 240 as well as pure natural language terms entered by the user, among other examples. With such a feature, a user can develop accurate and relevant search queries without direct knowledge of the intricacies of the underlying enterprise data models, their data and structure, among other example advantages.

As noted above, in some instances, a particular plan model or other enterprise data model can model business outcomes or entities relating to a particular business unit, department, domain, or sub-organization of an organization. Accordingly, some plan models may better relate to or be understandable to particular subsets of users and decision-makers within an organization. Indeed, one or more networks of plan models in plan models 210 can be provided, with each department, business unit, etc. of an organization having associated plan models in the network relevant to their respective related entities, outcomes, work, and goals. With each sub-organization potentially utilizing, controlling, and accessing its own related plan models, collaborative decision-making and scenario-planning can be accomplished across an organization as the network of plan models interplay and the interconnectedness of the various goals and outcomes of the sub-organizations are modeled. Indeed, in some implementations, interactions with particular plan models 210 can be at least partially restricted, limited, or otherwise organized so that users utilizing and controlling modeling using particular plan models are associated with or expert in those sub-organization to which the particular plan models are related. In such implementations, the model manager 225 can additionally manage users' roles, identities, and attributes as well as the users' respective permissions, access, and associations to one or more respective plan models, among other examples. Indeed, user profile data 260 can be maintained to identify the respective sub-organizations with which the user is affiliated, as well as the user's role within any one or more of these sub-organizations. Such information can be used to determine what privileges a particular user has with regard to the plan models identified as related to these sub-organizations and roles. Further, user profile data 260 can include user preference information that can be used by search engine 240 and GUI engine 245 to determine which preferred infographic types to present to the user for various types of queries or scenario sessions. For instance, the user can indicate that a particular one of a set of supported infographic types is to be used for results returned in response to a particular type of search query, among other examples.

In some implementations, a user can save a search query and results performed using the search engine 240. As noted above, search results can be returned as a graphical representation of the search result data, presented in a GUI according to a supported infographic type. The user can request (through the GUI) to save a particular infographic returned in response to a search. In some implementations, a user can be provided with a dashboard (e.g., through dashboard manager 250), to allow the user to observe multiple different views of the business objectives modeled by the plan models 210 in connection with the user's responsibilities within the enterprise. For instance, the user can identify two or more infographics presenting information relating to two or more key performance indicators for a particular domain of the business. In one example, one or more of the infographics can be defined from a previous search query by the user (or another user). For instance, an infographic returned in response to a search query of the enterprise data models can be saved by the user for inclusion as a window within the user's dashboard. As data is updated and the model evolves as more data is collected, the infographic may change accordingly. As a result, the information displayed in an infographic returned in a search may change from day-to-day, hour-to-hour, or in real time as better information is acquired (e.g., in source data 255) or as the calendar proceeds as assumptions, forecasts, or other predictive data values are converted into observed data values, among other examples.

Enterprise data models can incorporate a wide variety of defined data structures modeling the enterprise, its business entities, and goals. Enterprise data models can include a network of plan models to model forward-looking outcomes of the enterprise. Turning to the example of FIG. 3, a simplified representation 300a is shown representing principles of an example, software-implemented plan model 305 that can be included in a network of plan models in one example. A plurality of instances of plan model 305 can be developed, each instance of plan model 305 modeling a respective business outcome of an organization (or group of organizations), including business outcomes relating to administrative, educational, charity, commercial, industrial, logistic, and other for profit and not-for-profit activities of the organization. In one example implementation, a plan model can include a scope model 310, an input drivers model 315, a sensitivity model 320, and outcome measures model 320. Additional models can be included in or linked to by a respective plan model, such as entity models, member models, and hierarchy models. Additionally, in some implementations, plan models can each include a process model for use in managing planning activities involving the plan model as well as coordinating planning activities between multiple plan models. Further, one or more designated users, user roles, or users within particular sub-organization (collectively users 330a-d) can interact with and use the plan model, for instance, in connection with planning activities within one or more organizations.

Generally, a scope model 310 can identify and model the specific domain within an organization on which the particular instance of the plan model 305 operates and is associated with. Domains can be relatively broad or narrow and capture certain segments of a particular organization. The scope model 310 can further enable certain domain-specific planning processes and logic relevant to the corresponding domain within the organization. Input drivers model 315 can represent one or more input drivers specifying key variables influencing outcome measures modeled by the particular domain-specific instance of the plan model 305. Accordingly, outcome measures model 320 can model and represent the outcome measures that the particular instance of the plan model will state, predict or attempt to achieve in its modeling of a particular business outcome(s) which can also be expressed as one or more of the outcome measures modeled in outcome measures model 320. A sensitivity model 315 can define the dependencies, relationships, processes, formulas, and other logic used to derive values of various outcome measures from values of input drivers of the plan model 305. Such dependencies, relationships, processes, formulas, and other logic (collectively dependencies) can be domain-specific as well as define how values of intermediate outcome measures or input drivers can be derived from other input drivers or outcome measure values, among other examples.

Figure 4:
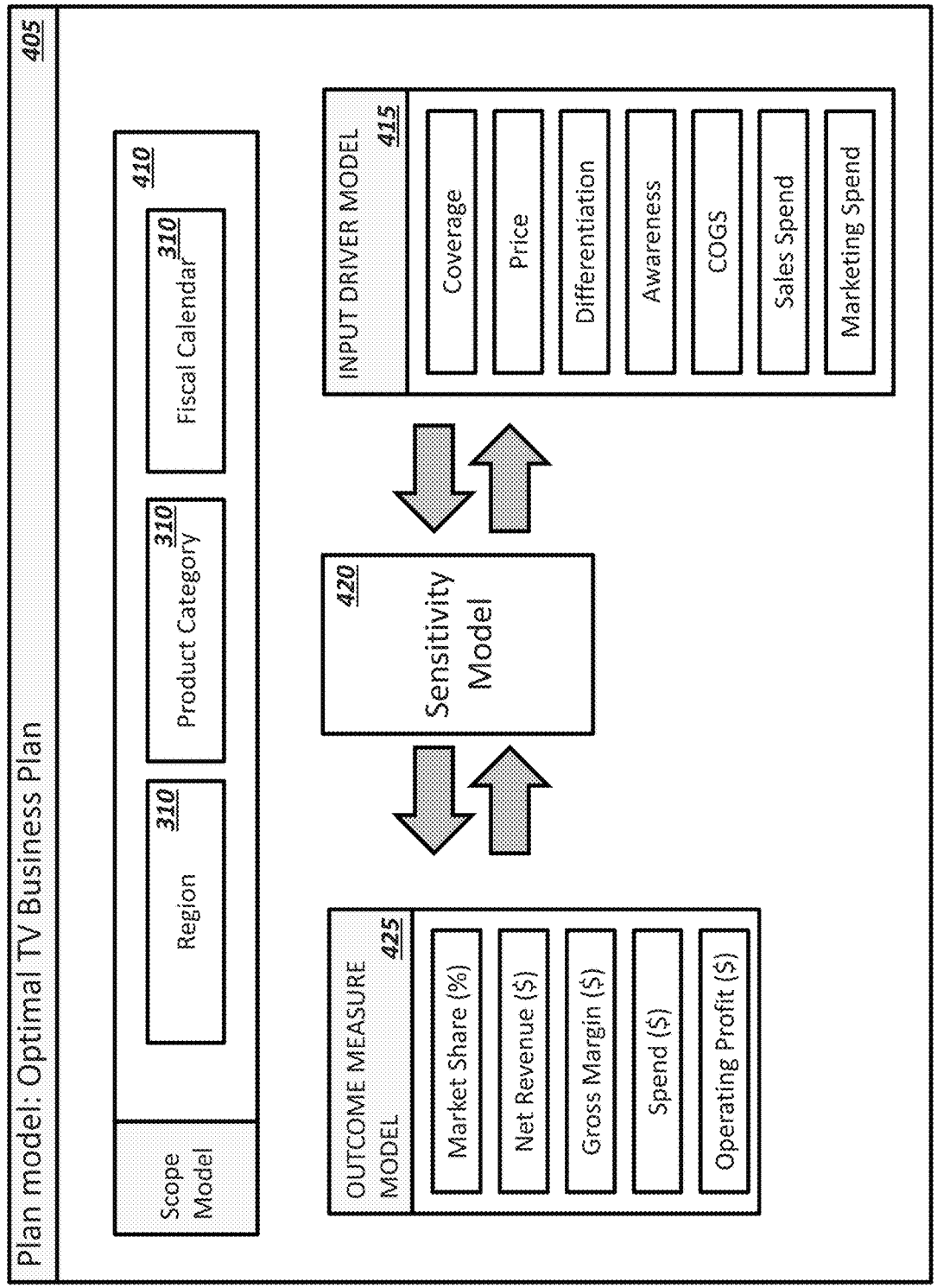
FIG. 4 is a simplified block diagram representing an example instance of a plan model.

Turning to the example of FIG. 4, a simplified schematic block diagram 400 is shown of a particular example instance of a plan model 405. In this example, the plan model 405 is an optimal television business plan model modeling outcomes for a particular product category of a business (e.g., a business selling televisions). As in the example of FIG. 3, example plan model instance 405 can include a scope model 410, input drivers model 415, sensitivity model 420, and outcome measures model 425. Scope model 410 defines a domain to which the modeled outcomes of plan model 405 apply. For instance, scope model 410 can model a domain encompassing a particular product category (i.e., TVs), within one or more geographic regions (or market regions), and within a particular period of time (e.g., a fiscal quarter, year, five year span, etc.). Accordingly, scope model 410 can define the domain according to one or more business entities, such as in this example, regions, product categories, and fiscal calendar. Moreover, in this implementation, scope model 410 can include entity models 430, 435, 440 corresponding to the relevant business entities used to define the domain in the scope model 410.

A plan model's domain, as defined in its scope model (e.g., 410) can drive other models (e.g., 415, 420, 425) of the plan model as the inputs, outcomes, and relationships between outcomes and inputs (e.g., as defined in sensitivity model 420) can be highly domain-specific and tied back to the particular business entities used to define the modeled domain. For instance, in the example input drivers model 415 can include such input drivers, or variables, pertaining to a television product category and product market region for televisions, including input drivers such as channel coverage, price, product differentiation, consumer awareness, cost of goods sold (COGS) or inventory cost, sales spend, marketing spend, etc. Similarly, outcome measures relevant to the outcome, or goal, modeled for the defined domain can be defined in outcome measures model 425, such as market share percentage, net revenue, gross margin, total spend, operating profit, etc.

Some plan models will model outcomes of domains that result in sets of input drivers and outcome measures quite different from the input drivers and outcome measures of the particular example of FIG. 4. However, other plan models can also be developed for different domains (e.g., a different market region, different product, products of a different organization, etc.) that include input drivers and outcome measures similar to those of the optimal television business plan model 405. The dependencies of the respective outcome measures on the respective input measures of a particular domain, however, can fluctuate considerably between domains. For instance, sensitivity of a market share outcome measure to particular input drivers such as price or product differentiation can be quite different in two different markets, including different product markets and market regions. Accordingly, sensitivity model 420 can define domain-specific dependencies between input drivers and outcome measures for a plan model of a particular domain, representing the sensitivities of the outcome measures to the respective input drivers upon which the value of the outcome measure is dependent.

Figure 5A:
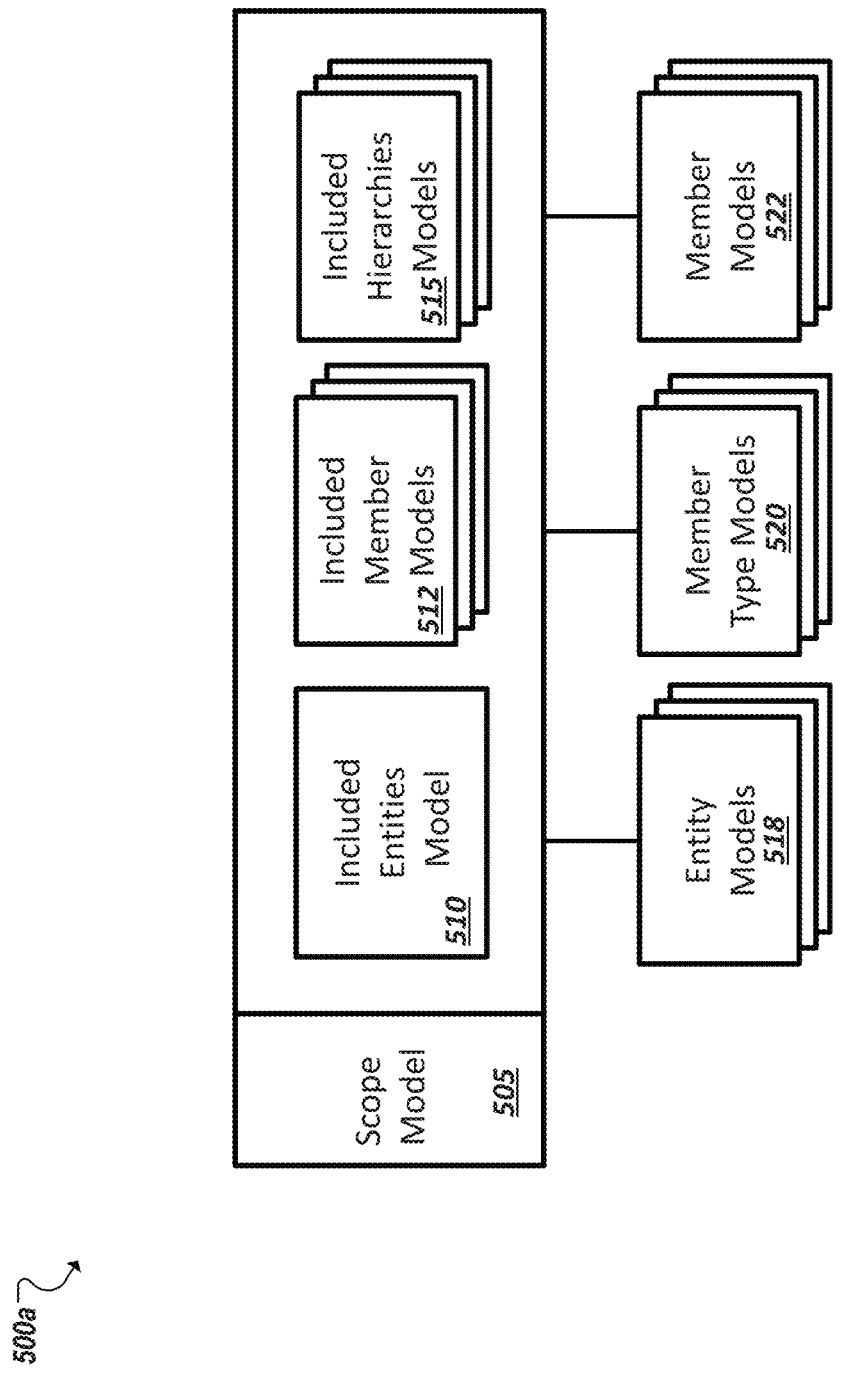

Turning to FIG. 5A, a simplified block diagram 500a is shown illustrating an example scope model structure. For instance, instances of a scope model 505 included in plan models can include an included entities model 510, one or more included members models 512, and one or more included hierarchies models 515 corresponding to those business entities designated as defining the particular domain of the scope model instance 505. The included entities model 510 and included member models 512 can reference or link to one or more entity models 518, member type models 520, and member models 522 maintained in connection with a planning system. As noted above and in other example discussed herein, business entities can include such entities as regions, organizations, persons, products, product categories, market regions, market segments, channels, calendar periods, time, locations, customers, suppliers, factories, and so on. The entities included in the domain can be defined in included entities model 510. A particular business entity can have constituent subcategories of business entities, or member types, and particular members of these entity member types can be included in the particular domain to which a plan model applies. Accordingly, in some examples, each entity designated in included entities model can have a corresponding set of designated members of the respective entity designated in a respective included member model 512. Additionally, for each designated entity, a set of included hierarchies (or included different possible hierarchical representations of the included members of an entity) can be designated in included hierarchies models 515, each entity having its own included hierarchy model 515. In other implementations, the sets of included members and/or included hierarchies can be defined in a single included member model for the scope model 505 or a single included hierarchies model for the scope model 505 (i.e., rather than distinct included member models 512 and included hierarchies models 515 for each individual entity designated in an included entities model 510), among other examples.

Further, a scope model 505 can reference (e.g., through included entities model 510) corresponding entity models 518 of the designated included entities of the domain modeled by the scope model. Entity models 518 can model a particular entity as well as the member types of the entity, hierarchies of the entity, and other attributes and information pertaining to the individual entity. Member type models 520 can also be referenced through the scope model, each member type model 520 modeling a particular type of the business entity as well as defining relevant attributes of that member type (or member type attributes). Further, member models 522 can be referenced, corresponding to the included member models 512, each member model 522 defining the individual members within a particular modeled domain. Each member can be of a particular one of the member type models 520. In some implementations, included member models 512 can be defined for each entity of the domain and included as sub-models of the entity models 518. Relationships between entities, member types, members (or groups (or "sets") of members), and particular member type attributes can be hierarchical and, in some instances, be organized in multi-dimensional hierarchies that allow members, member groups, and member type attributes to organized in multiple different alternate hierarchies. Such hierarchical organizations can be defined, in some instances, through included hierarchies models 515.

Figure 5B:
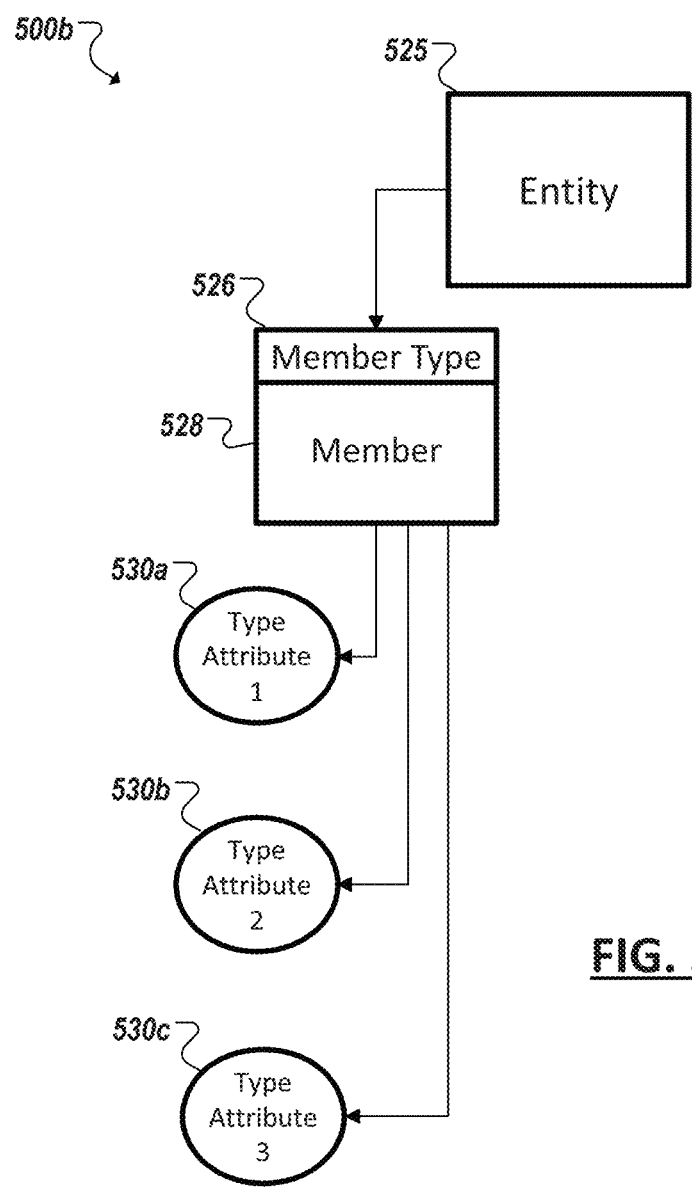

Turning to FIG. 5B, an example block diagram 500b is shown of a simplified hierarchy of a business entity as can be captured through one or more models of the corresponding scope model and/or entity model of a corresponding included business entity including corresponding member type models, member models, included hierarchies models, etc. For instance, in the particular example of FIG. 5B, a member type can be one of a plurality of member types of an entity and each member type (e.g., 526) can include one or more instances, or members (e.g., 528), of that particular member type (e.g., 526). The member type (e.g., 526) can define a set of member type attributes (e.g., 530a-c) relevant to members of that type and that can define members of that type. Indeed, each member (and member model) of a particular member type can inherit the member type attributes of the corresponding member type. To illustrate, turning to FIG. 5C, an example entity 525a is illustrated corresponding to a product business entity. Within the global marketplace a wide variety of different products may exist from smartphones, printers, and digital video recorders to cardboard packaging, breakfast cereal, and tissue papers, among scores of other examples. Further, in the example of product business entities, various products may have relevance to different organizations and different goals within the same organization. Accordingly, plan models can include product business entities within their domains for different reasons in modeling particular outcomes, including domains corresponding to particular products of a particular business unit of an organization, corresponding to competitor products, corresponding to marketing budgets, inventory, etc.

In the particular example 500c of FIG. 5C, a scope model can define a particular domain to which a particular plan model applies by defining two particular member types within the product business entity 525a, in this example, a televisions member type (526a) and computer member type (526b). Each of the member types 526a, 526b can respectively define a set of member-type attributes (e.g., 532a, 532b) describing features and details generally relevant to members of that type. For example, a television member type 526a can include member type attributes such as the refresh rate, screen size, and technology (e.g., LED, LCD, plasma, etc.) of a particular television (i.e., member of the television member type), including other potential television-related attributes. Similarly, a computer member type, while a member type of the same business entity (e.g., Product), can have a different set of attributes corresponding to features and specifications of computers, such as processor type, processor speed, memory, hard drive, etc.

Each member of a member type can be defined, at least in part, according to attribute values defined for the member. For instance, a variety of different attribute values (e.g., 534) may exist among a set of members. For example, a first television member considered in the domain may be a 120 Hz 42" LCD television, while a second television member in the domain is a 240 Hz 46" plasma model. In some instances, multiple members in a member type can share one or more attribute values. Shared member type attributes can serve as the basis for member groups. For instance, a group of members of the example television member type of FIG. 5C can be defined based on screen size, with a group of televisions being defined for 36" televisions, 42" televisions, 46" televisions, and so on.

Turning to the example chart 500d of FIG. 5D, a simplified set of members of a particular member type (e.g., televisions) is represented. In addition to defining a domain according to the business entities and member types to which a particular plan model applies, a scope model (e.g., through an included members model) can further define the domain by the individual members included in the domain. For instance, a set of member television models is listed in chart 500d. A particular domain, however, may only be interested in a particular subset of the set of members available. For instance, a set of included members 535 can be defined that pertains to a set of televisions of interest within the domain, such as televisions made in a certain year, televisions manufactured by a particular plant or vendor of an organization, televisions sold in a particular store or region of an organization, etc.

Further, as can be seen in the example of FIG. 5D, members of an entity (or member type) can share some common attributes and attribute values. On the basis of shared attribute values, members can be grouped or sorted based on the shared attribute value. For instance, included member televisions "M5"-"M8" can be included in an LED TV member group while member televisions "M1-M4" are included in a plasma TV member group. Individual members can belong to multiple member groups. For instance, in the example of FIG. 5D, a member "M1" can belong both to the plasma TV member group, as well as a 46" screen size member group (along with members "M2", "M5", and "M6"), 120 Hz refresh rate member group (along with members "M3", "M5", and "M7"), as well as other member groups. Indeed, in some implementations, member groups of an entity can span multiple member types. For instance, in one example, member types "TV" and "Computer" can share an attribute "price" and members from both member type groups can populate member groups organized according to particular defined price ranges, among other examples involving other business entities, member types, and member attributes.

As noted above, entities and their respective members can be used to define the domain of a plan model. In some instances, a scope model can include an included entities model specifying the set of entities on which the plan model operates. Further, business entities can be hierarchical in nature. Further, multiple alternate hierarchies can exist for a business entity and serve to represent members of the entity at varying levels of aggregation. In some implementations, these levels of aggregation can also be based on or formed from the varying combinations of member groups that can be defined within a business entity. Turning to the example of FIG. 5E, a set 500e of three block diagrams are shown representing example available hierarchies 540a-c of a particular business entity. More specifically, in the particular example of FIG. 5E, three available hierarchies 540a-c are shown of a product business entity included in a domain also specified by members of member type "television," similar to the example television member type in the illustrative examples of FIGS. 5C and 5D. In a first (540a) of the available hierarchies 540a-c, television technology type is designated as the first level of aggregation within the hierarchy 540a. Further, in the example hierarchy 540a screen size is designated as a child to technology type and refresh rate as a child of screen size. Based on this designated hierarchy 540a various groupings of members can be identified and aggregated at the levels of aggregation 545a-e defined by the hierarchy 540a. For instance, a highest level of aggregation 545a in hierarchy 540a can include all members of member type television. At a second highest level of aggregation 545b in hierarchy 540a, two distinct member groups can be identified for two member groups defined by their respective shared technology types (e.g., a LED member group and plasma member group). Further at the next level of aggregation 545c, respective sub-member groups of the LED and plasma member groups can be defined according to the screen sizes of constituent members included in each of the LED and plasma member groups. For instance, 42" LED television member group can be included or defined at level of aggregation 545. Further, still lower levels of aggregations (e.g., 545d, 545e) can be provided based on the defined hierarchy 540a. Indeed, a lowest level of aggregation 545e can be provided representing the individual (i.e., ungrouped) members themselves (e.g., as identified by a member ID attribute of the member type, such as "Product ID").

In addition to hierarchy 540a of a product business entity of an example plan model, further hierarchies 540b and 540c can be provided organizing the product business entity according to other member attributes and defining further potential member groups and levels of aggregation. For instance, a second hierarchy 540b can provide for a screen size attribute of a television member type as the parent to a television technology type which can, in turn, serve as the parent to a product ID attribute, thereby defining four levels of aggregation 545a, f-h. In the example of hierarchy 540c, member type is a parent of the television technology attribute which is a parent of the product ID attribute, thereby defining a hierarchy providing levels of aggregation 545a, b, e.

Figure 5E:
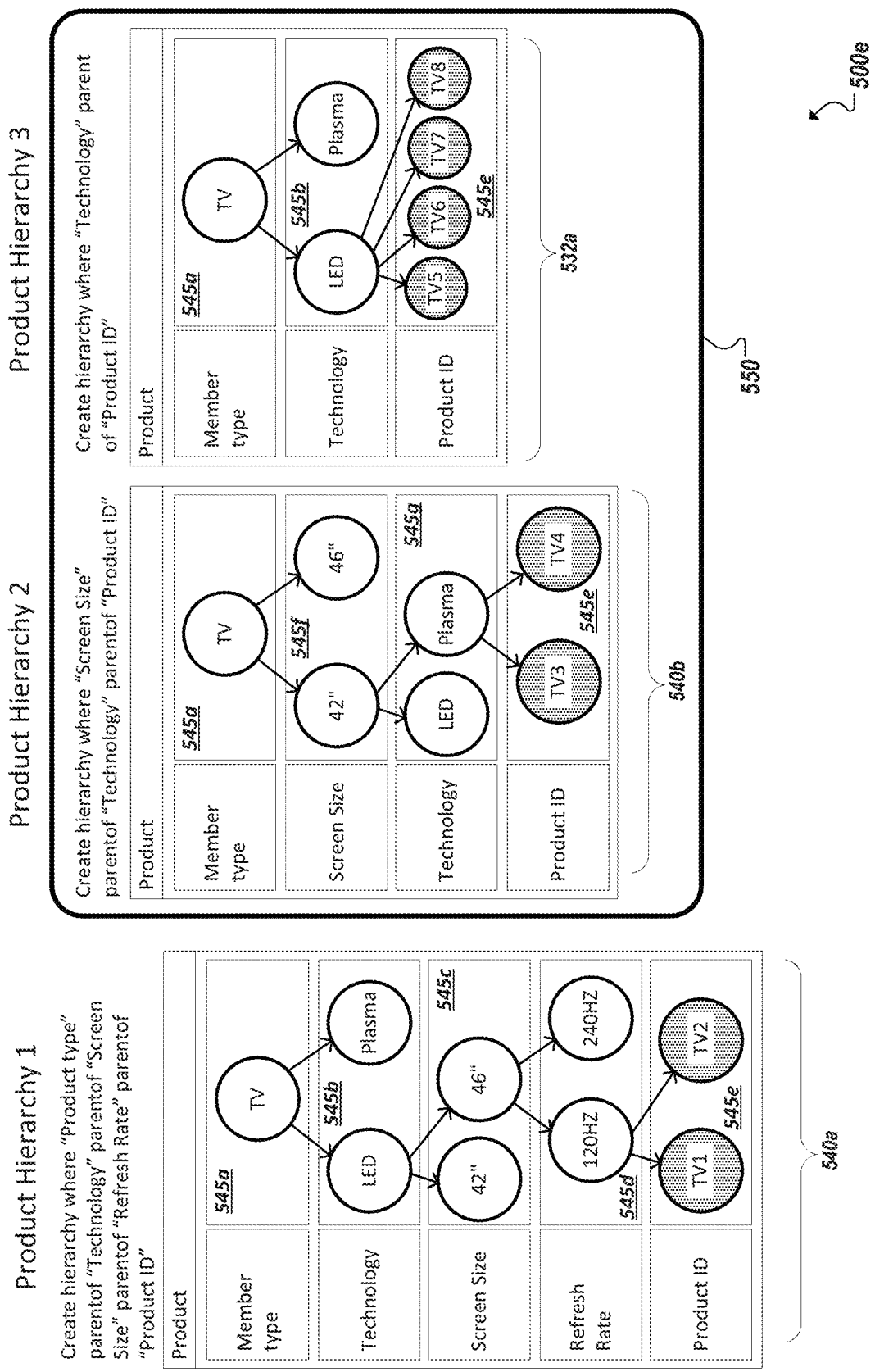

As shown in the example of FIG. 5E, included members and member groups of a particular business entity can be organized or arranged into a plurality of different hierarchies allowing the members to modeled or analyzed at a variety of levels of aggregation. In some implementations, the domain defined by the scope model can specify (e.g., through an included hierarchies model) a particular subset of the available hierarchies that are relevant to the modeling of goals or outcomes of the domain. For instance, a hierarchies model (e.g., 520a-c) can specify only those particular hierarchies in which included members and member groups can be arranged into or that have otherwise been designated (directly or indirectly) for inclusion in the domain. Indeed, in some instances, through designation of a set of included entities, a set of included entity members, and a set of included hierarchies a plan model domain can be specified and distinct domain-specific planning can be enabled through the corresponding plan model. Specification of included entities, members, and hierarchies can be completed manually (e.g., via human user input and user-defined rules and settings), as well as via computer-controlled inputs, logic, and systems. Further, a domain can be defined and modified according to the specification of particular entities, members, and hierarchies as well as through additions, substitutions, deletions, and other changes to the respective sets of included entities, members, and hierarchies.

Figure 5F:
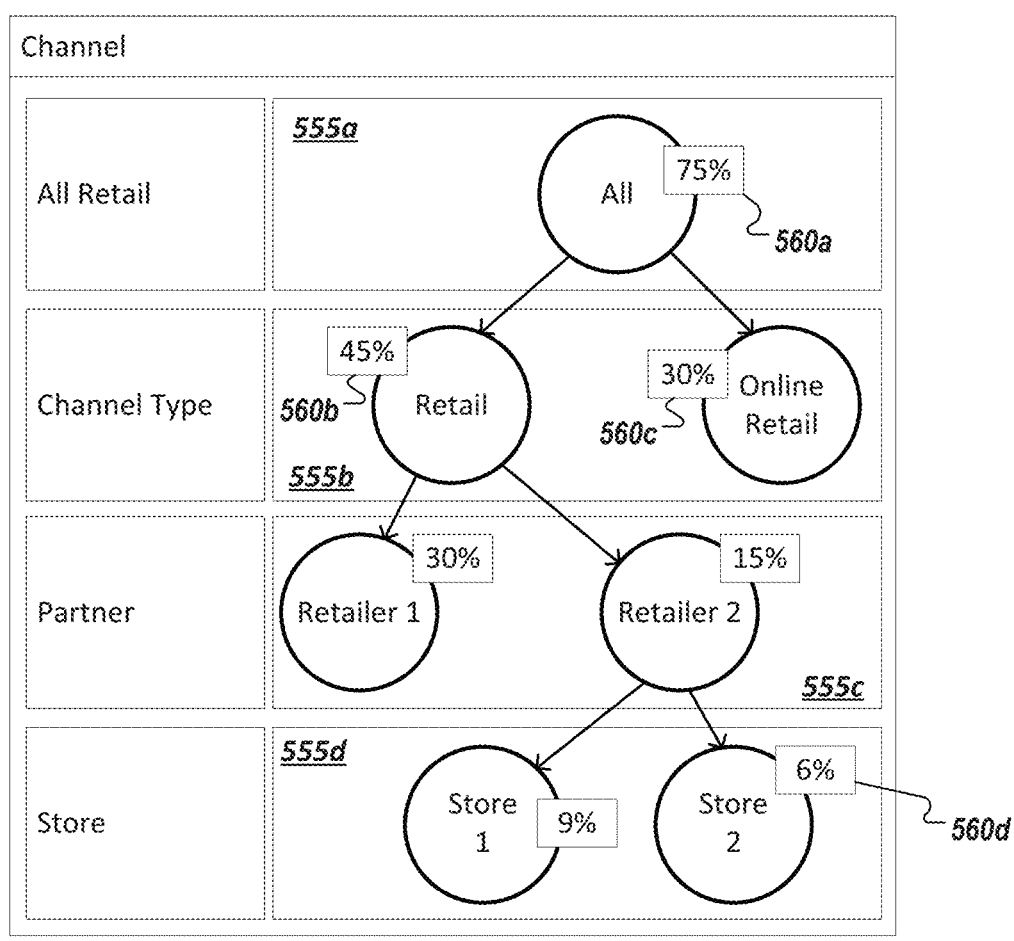

In addition to enabling domain-specific planning, a plan model can further allow management and planning at varying levels of aggregation within a domain-specific context. For instance, turning to the example of FIG. 5F, a simplified block diagram 500f is shown representing how input drivers and outcome measures of a plan model can be viewed, analyzed, and manipulated at any level of aggregation provided through the included hierarchies of the plan model's domain. For simplicity, the example of FIG. 5F illustrates how a single value can be viewed and/or manipulated across different levels of aggregation (e.g., 555a-d). In this particular example, the value pertains to channel coverage for one or more products and can in some instances be an input driver or in other cases an outcome measure (or even both an outcome measure for a first plan model and input driver for a second plan model linked to the first plan model through the use of one or more outcomes of the first plan model for some of its inputs, among other examples).

In the example of an input driver for a particular domain, a single input driver value for aggregate channel coverage of the products included in this particular domain can be 75%. This 75% value (at 560a) can be broken down, or disaggregated, either automatically via logic or rules defined in the plan model (e.g., in a sensitivity model of the plan model instance) or manually through user- or system-provided values and/or rules to show what portion of this 75% channel coverage value is attributable to either one of the two member groups, "Retail" and "Online Retail," at the second level of aggregation 555b. In this example, of the 75% channel coverage, 45% of the channel coverage (at 560b) can be modeled as from Retail channel types and the remaining 30% (at 560c) from Online Retail channel types. The 75% value (at 560a) can be further analyzed at other levels of aggregation, included lower levels of aggregation, such as at a level of aggregation grouped by channel type, channel partner, and store identifier, as at example level of aggregation 555d. For instance, of the 75% channel coverage modeled, 6% (at 560d) can be attributable to a first particular store of a particular channel partner Retailer B of a Retail channel type. Further, at each level of aggregation, values for the input driver can viewed and manipulated. For instance, a user can manipulate the value 560c upward or downward, thereby also potentially affecting values across the hierarchy, such as values 560b, 560d, etc.

Figure 5G:
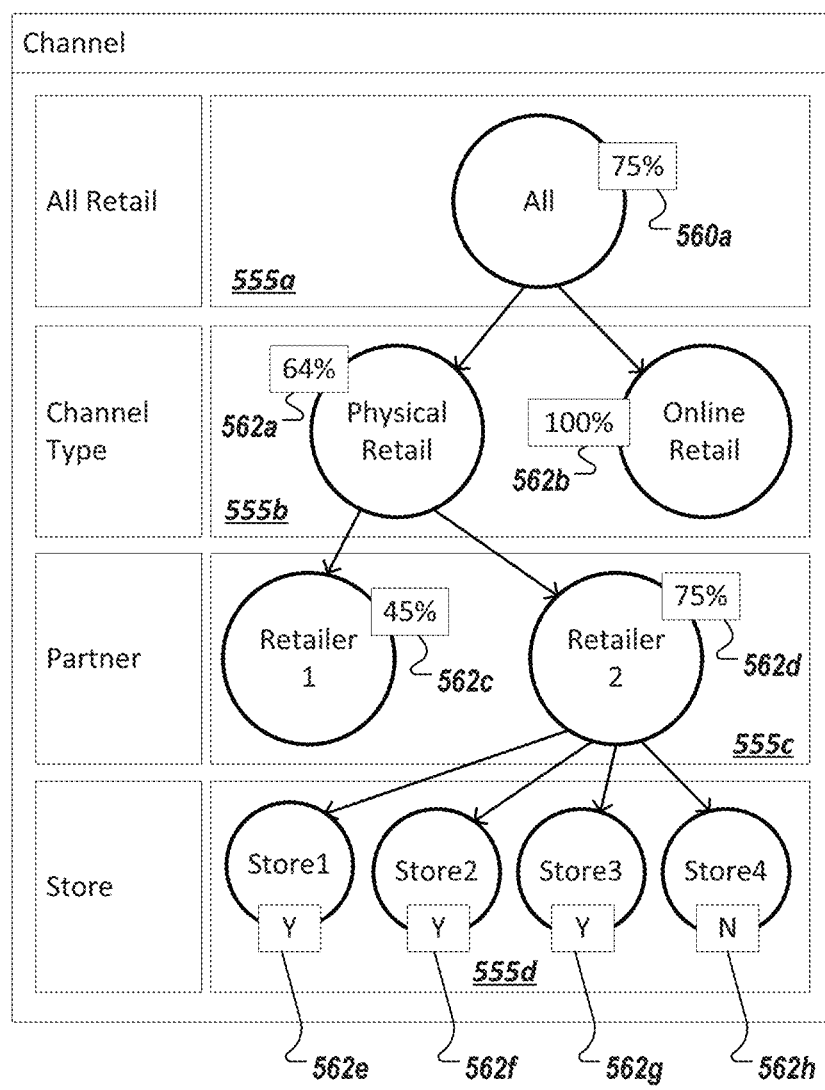

In addition to allowing different views of input driver (or outcome measure) values at varying levels of aggregation, values can be disaggregated in different ways within the same plan model. For instance, in the example of FIG. 5G, rather than disaggregating the value 560a into the portions of the 75% attributable to each of the other, lower-level member groupings (e.g., physical retain vs. online retail; Retailer 1 vs. Retailer 2, etc.), the respective channel coverage of each member group at each level of aggregation can also (or instead) be enabled and represented using the included hierarchies of the scope model. For instance, an organization may have 100% coverage (e.g., at 562b) in the available online retail channels (e.g., as defined in an included members model of the retail channel entity), but only 64% (e.g., at 562a) of the available physical retail channels covered. Similarly, the organization may have 45% (at 562c) of the stores of Retailer 1 covered and 75% (at 562d) of Retailer 2's stores covered. For instance, Retailer 2 may have four available stores, with values 562e-h indicating whether each member store is covered or not, thereby representing the values at the lowest, most detailed level of aggregation, among many other examples. Further, while viewing and manipulating input drivers across multiple levels of aggregation provided through a plan model has been discussed in connection with some of the examples above, similar concepts apply to the outcome measures, with a single outcome measure value capable of being disaggregated, viewed, and manipulated at multiple levels of aggregation, as provided by hierarchies of the respective plan model.

Figure 5H:
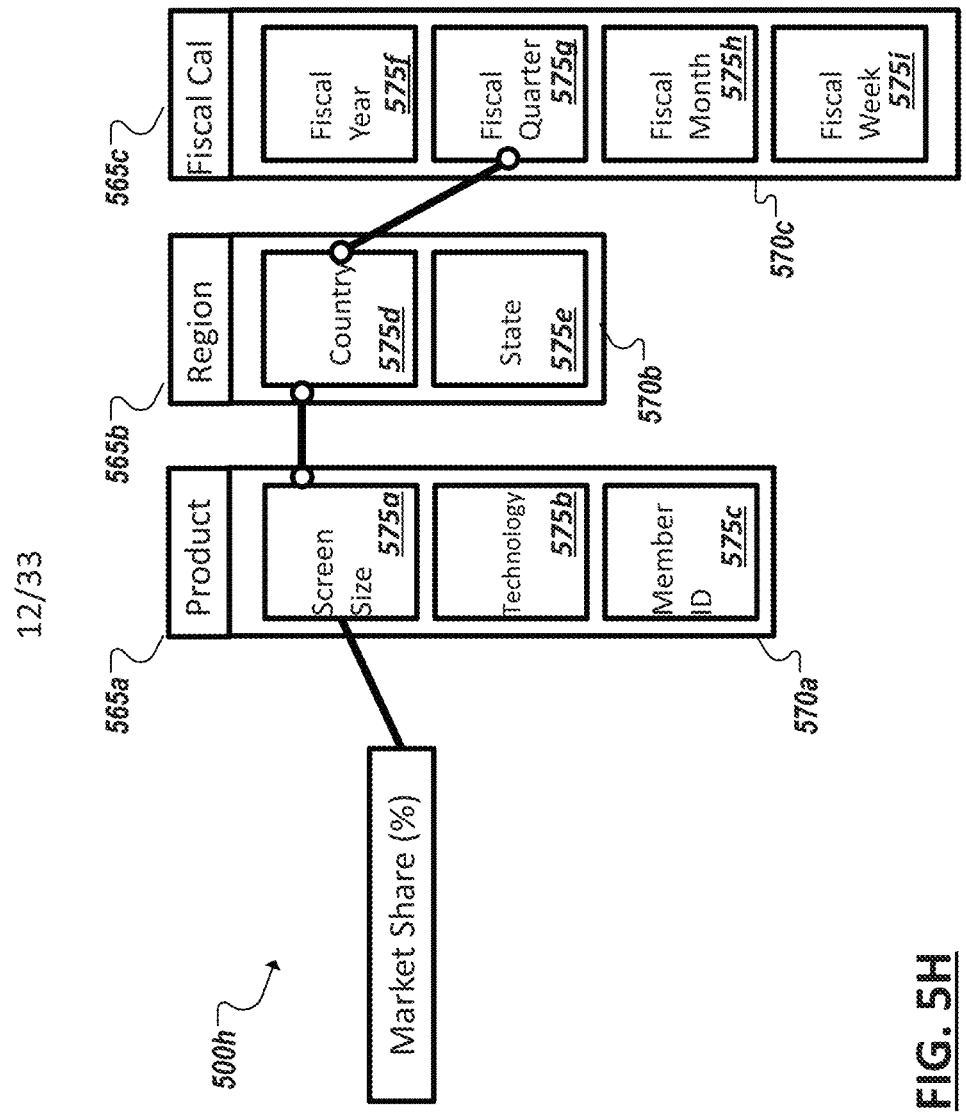

In addition, to allowing analysis and management of input driver and/or outcome measure values at multiple levels of aggregation within a single hierarchy of a single business entity, plan models with multiple business entities (e.g., 565a-c) in its domain can in some cases provide for management and manipulation of input drivers and outcome measures at multiple different levels of aggregation across the multiple different business entities and hierarchies defining the domain. For instance, turning to the examples of FIGS. 5H-5G, simplified block diagrams 500h-i illustrate how a single input driver or outcome measure can apply to and intersect multiple business entities, members, and member attributes. Accordingly, input driver and/or outcome measure values can be managed at various available levels of aggregation defined by the respective hierarchies of the business entities. To illustrate, an example market share percentage outcome measure can be expressed in terms of multiple business entities, in this example, a Product business entity 565a, Region business entity 565b, and a Fiscal Calendar business entity 565c. Further, within each business entity potential multiple different hierarchies can be provided to arrange members and member groups of the business entity as well as manage values of the outcome measures (and input drivers). For instance, a first hierarchy 570a of the Product business entity 565a can be organized with a descending hierarchy of member attributes Screen Size→Technology→Member ID defining levels of aggregation 575a, 575b, 575c. Similarly, a particular one (e.g., 570b) of the available hierarchies of the Region business entity 565b can be utilized with a hierarchy Country→State and levels of aggregation 575d, 575e, as well with a hierarchy 570c of the Fiscal Calendar business entity providing levels of aggregation 575f-575i.

Figure 5I:
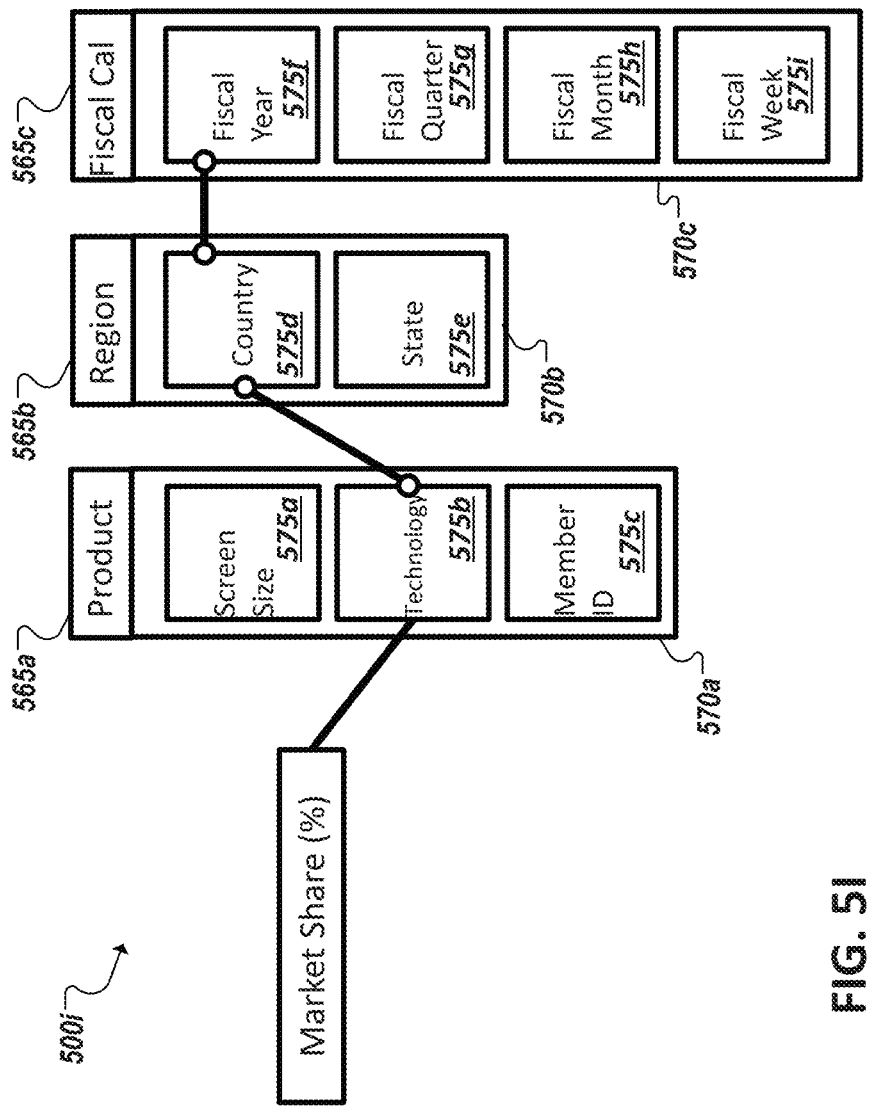

Against the backdrop of this particular example, input drivers and outcome measures can be manipulated and managed at multiple combinations of different levels of aggregation across the three hierarchies 570a-c of the three business entities 565a-c of the present example. For instance, in the example of FIG. 5H, a market share outcome measure can be viewed and managed at a level of aggregation 575a for the Product business entity 565a, at a level of aggregation 575d for the Region business entity 565b, and at a level of aggregation 575g for the Fiscal Calendar business entity 565c. In the other example of FIG. 5I, outcome measures can be instead managed at different levels of aggregation. For instance, market share values could be analyzed and controlled at a lower level of aggregation 575b for the Product business entity 565a, at the same level of aggregation 575d for the Region business entity 565b, and a higher level of aggregation 575f for the Fiscal Calendar business entity 565c. As should be appreciated, a wide variety of different, alternative combinations of levels of aggregations can be employed in the management of the market share outcome measure (among other input drivers and outcome measures), including other levels of aggregation defined and provided through other alternative hierarchies available through the business entities 5605a-c of the example domain of FIGS. 5H-I, as well as any other domain modeled by other plan models developed using these principles. In this way, users of the plan model can have flexible and varied control of information and analytics pertaining to goals and outcomes within a particular domain as well as across multiple different domains.

Figure 6A:
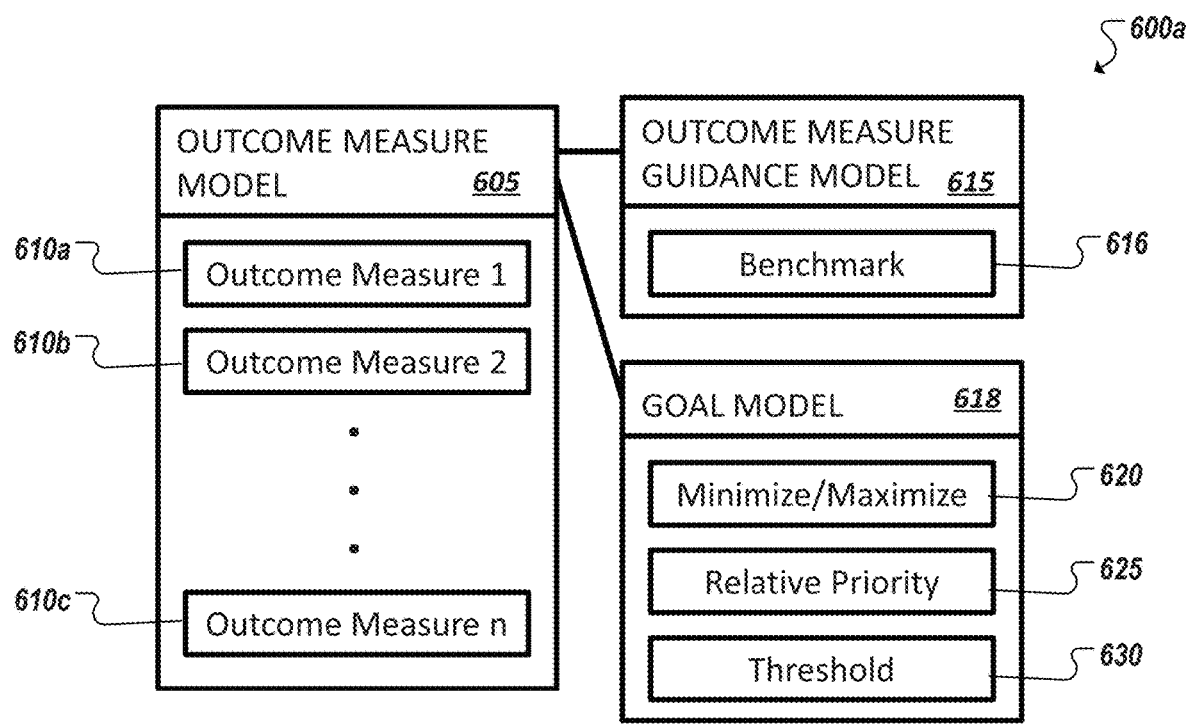
FIG. 6A is a simplified block diagram illustrating an example outcome measures model of an example plan model.
Figure 6B:
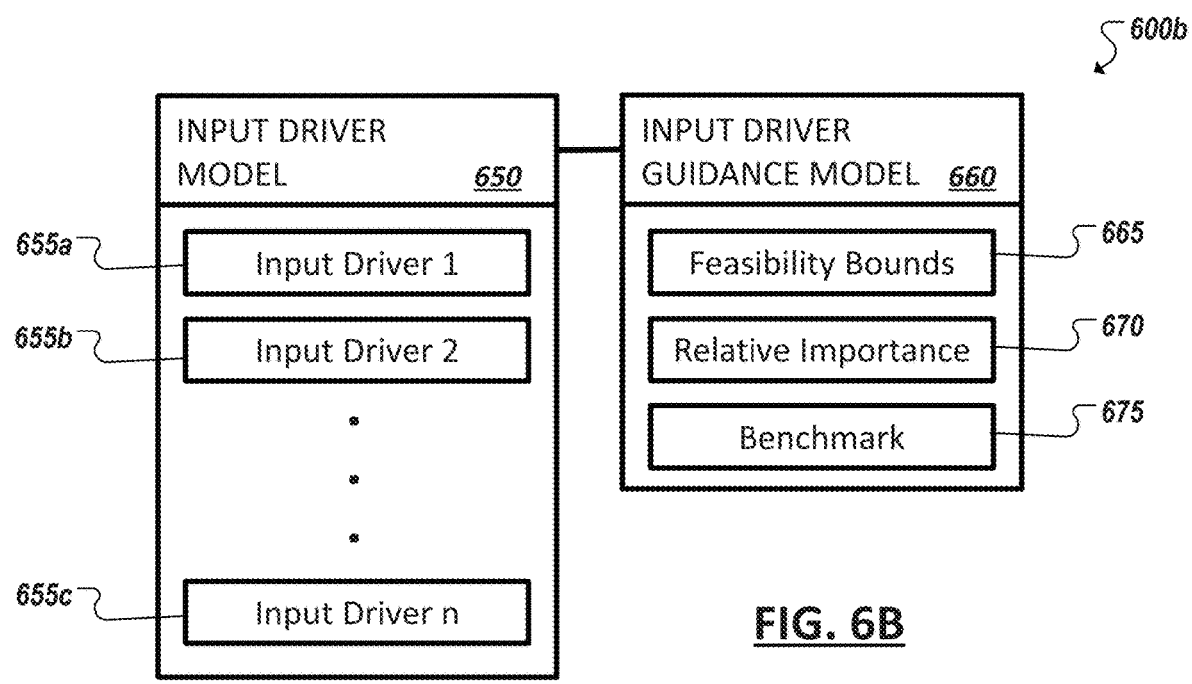
FIG. 6B is a simplified block diagram illustrating an example input drivers model of an example plan model.

Turning to FIGS. 6A and 6B, in addition to defining the domain of a particular plan model enabling distinct domain-specific modeling and input and outcome management, a plan model can additionally define the input drivers and outcome measures pertinent to the domain together with parameters and guides for the input driver and outcome measure values. Such parameters and guides can also be used to provide domain-specific guidance to users in their management, manipulation, analysis, and use of domain planning processes, goals, and outcomes modeled through plan model instances.

Turning to the simplified block diagram 600a of FIG. 6A, outcome measures of a particular plan model can themselves be modeled in instances of an outcome measures model 605. An outcome measures model 605 can define the outcome measures (e.g., 610a-c) pertinent to the domain-specific outcomes and goals modeled by the plan model. Each defined outcome measure can represents an outcome that the plan model will state, predict or attempt to achieve. Further, the outcome measure model 605 can define, for each outcome measure, such attributes as the name, type, unit of measure, etc. of the respective outcome measure. Additionally, a goal model 618 can be defined for the provided in the plan model to define one or more goals of the plan model based on the outcomes modeled by the outcome measure model 605. Further, in connection with the defined outcome measures 610a-c, an instance of an outcome measure guidance model 615 can further be provided in connection with the plan model.

The guidance model 615 can be used to model limits or targets of values of the respective outcome measures 610a-c. For instance, a guidance model can provide direction or limitations on values of outcome measures, according to one or more guidance rules defined in the outcome measure guidance model 615. For instance, a benchmark model 616 can be included in outcome measure guidance model 615 defining guidance rules such as indicators or limits corresponding to a defined best-in-class, worst-in-class, median, market rank value, etc. Other guidance rules can be defined using other models included in outcome measure guidance model 615.

A goal model 618 can be included in some implementations of plan models and can be used to reference and guide outcome measure values of the plan model. For instance, a goal model 618 can define the goals set for a particular domain modeled by the plan model and can be used as a reference point for scenarios generated using the plan model. In one example implementation, a goal model 615 can define, when applicable, minimize/maximize guidance 620 for each outcome measure 610a-c, relative priority guidance 625 for the outcome measures 610a-c, and threshold guidance 630 for each outcome measure 610a-c, as well as target values for one or more outcome measures 610a-c of the plan model. Generally, minimum/maximum guidance 620 can specify, for each outcome measure 610a-c, if the objective of the outcome measure should be maximized or minimized in connection with the domain's goal. Relative priority guidance 625 can generally specify the priority between the outcome measures 610a-c in the event of conflicts between the outcome measures' other guidance values. Additionally, threshold guidance 630 can generally specify the bounds for each outcome measure's values, such as rules specifying that the value of a corresponding outcome measure not go below a value for a maximization objective (i.e., defined in minimum/maximum guidance 620), or not to go above a value for minimization objective (i.e., defined in minimum/maximum guidance 620), and so on.

Turning to FIG. 6B, input drivers of plan models can also be modeled, for instance, through instances of an input drivers model 650 included within a respective plan model. An input drivers model 650 can define the respective input drivers (e.g., 655a-c) pertinent to the plan model's domain and specifying the key variables that influence the outcome measures and domain-specific considerations to be managed by users of the plan model. Further, an input drivers model 650 can also define, for each input driver, such attributes as the name, type, unit of measure, etc. of the respective input driver. Generally, each input driver of a plan model, represent or model particular factors that can exist or decisions that can be made that involve the modeled domain. For instance, input drivers can model decisions that can be under the control of the domain or organization, decisions outside the control of the domain or related organization(s), factors beyond the control of entities internal or external to the domain (e.g., drivers based on environment or market factors), or any combination thereof.

As with outcome measures, input driver guidance models 660 can also be provided to model limits or targets of values of the respective input drivers 655a-c and serve to guide users in their management of input driver values and planning using the corresponding plan model. In some implementations, an input driver guidance model 660 can include feasibility bounds guidance 665 for each of the input drivers 655a-c, relative importance guidance 670 among the input drivers 655a-c, and benchmarking guidance 675 for each of the input drivers 655a-c. Generally speaking, feasibility bounds guidance 665 can model assumptions and constraints for values of a given input driver and provide warnings or enforce limits when input driver values are provided in violation of set feasibility bounds, for example. Relative importance guidance 670 can specify the relative impact of an input driver relative to the set of input drivers 655a-c, on one or more outcome measures of the plan model. Further, benchmarking guidance 675 can generally specify benchmarking details for provided or set values of each of the input drivers 655a-c, among other potential examples.

Continuing with the discussion of outcome measures, input drivers, and corresponding guidance models that can be applied to improve, guide, and constrain construction and selection of planning and goal scenarios, analyses, and other uses of a plan model, FIGS. 7A, 7B, 8A, and 8B are provided illustrating simplified block diagrams 700a-b, 800a-b representing examples presented to illustrate particular features of example guidance rules that can be defined in guidance models (e.g., 615, 660) or goal models (e.g., 618) employed in example plan models. For instance, turning to the example of FIG. 7A, minimize/maximize guidance is represented for two example outcome measures, Net Revenue and Spend, within a particular plan model. Within a particular domain, it can be a goal to maximize net revenue generated in the domain while minimizing total costs of the domain (e.g., to maximize profit). Accordingly, for this particular plan model, minimize/maximize guidance can be defined within a goal model of the particular plan model setting rules or guidelines for at least the Net Revenue and Spend outcome measures of the plan model that their values be respectively maximized or minimized when possible. Further, minimize/maximize guidance can further define threshold values for respective outcome measures, either ceilings or floors for the respective values of the corresponding outcome measures. For instance, in the example of FIG. 7A, minimize/maximize guidance for the Net Revenue outcome measure can be set guidance or rules to promote maximization of the Net Revenue outcome measure values and not allowing the value of Net Revenue to fall beneath a value of $105 MM, as an example.

In the simplified block diagram 700b of FIG. 7B, relative priority guidance for outcome measures of a plan model is represented. In some instances, set goals, rules, or guidance for different outcome measures in a plan model can conflict. For instance, as in the example of FIG. 7A, in some cases the minimization of costs can be in direct conflict with the maximization of net revenue. Relative priority guidance can provide rules for resolving conflicts between outcome measures and the respective guidance rules applied to them to define a hierarchy of tradeoffs that can be exercised in the establishing or calculating of outcome measures during the use of the plan model. For instance, in the example of FIG. 7B, relative priority guidance can be set (e.g., by a user or developer of the corresponding plan model) for one or more of the outcome measures 705, 710, 715, 720. For instance, a Market Share outcome measure 715 can be assigned priority position "1" (725) giving the values and goals of the Market Share outcome measure 715 priority over all the remaining outcome measures (e.g., 705, 710, 720) in the corresponding plan model. Further, the next highest priority (730) can be assigned for Net Revenue outcome measure 705, giving it priority over all other outcome measures (e.g., 710, 720) with lesser priorities defined in priority guidance. Further, some outcome measures (e.g., 710, 720) can be assigned no priority meaning that the system is free to resolve conflicts between unprioritized outcome measures (e.g., 710, 720) any way it deems fit. However, when conflicts arise between an outcome measure and another outcome measure of higher priority, the outcome measure with higher priority takes precedence. For example, minimize/maximize guidance for outcome measures Net Revenue 705 and Market Share 715 may dictate that values of the outcome measure 705, 715 be maximized. However, if maximization of the Net Revenue 705 value conflicts with realizing a potentially higher, or maximum value for Market Share 715, priority guidance can indicate or even resolve the conflict by treating maximization of Market Share 715 as a priority over maximizing Net Revenue, among other potential examples. Similar principles can be applied to relative importance rules (e.g., at 670) for input drivers.

Turning to the example of FIG. 8A, a simplified block diagram 800a is shown representing an example benchmarking guidance for a Market Share input driver of an example plan model. Similar principles can be applied in benchmarking guidance defined and applied for outcome measures (e.g., through benchmark model 616). Benchmarking guidance can designate various benchmark values for a corresponding input driver or outcome driver such as values that would make the value the best in class within a market, worst in class within the market, a certain rank relative other values in the market, a mean value within the market, etc. Such benchmarks can be established from historical and competitive data collected relating to the plan market's domain. Statistical methods and other techniques can also be applied to determine benchmarks for a particular input driver or outcome measure. Further, input driver (or outcome measure) values can be designated as being fixed at certain benchmark thresholds, for instance, through a rule or guide that a particular input driver's value not fall below a top 3 rank among competitors, not fall below a median or mean value, or fall to a worst in class designation, among other examples. In the particular example of FIG. 8A, benchmarking guidance for values of an example Market Share input driver 805 can define a number of benchmarks including a worst in class value 810, median value 815, and best in class value 820. Further, ranking benchmarks can be defined, for instance, input driver 805 values of 31% market share can be defined as claiming a third place competitive rank 825 among other competing organizations, departments within the same organization, or other competing entities.

Turning to the example of FIG. 8B, a simplified block diagram 800b is shown representing example feasibility bounds guidance for a channel coverage input driver 830 of an example plan model. Feasibility bounds guidance can model or define assumptions and constraints that should be enforced or otherwise guide values of the corresponding input driver. For instance, feasibility bounds guidance can model upper bounds or lower bounds of a particular input driver value. In the example of FIG. 8B, a lower bound 835 of 10% coverage is set for values of the example channel coverage input driver 830 and a value of 40% is set for the upper bound 840. Feasibility bounds can correspond to limits, either actual, desired, or predicted, on the acceptable or feasible values of an input driver within the context of a particular domain. Other feasibility bounds can also be defined, for instance, with some bounds representing a conservative feasibility estimate and a second set of bound representing a more generous or optimistic feasibility estimate. Further feasibility bounds can be combined, in some implementations, with benchmarking guidance to set bounds that correspond with a particular benchmark, such as a worst in class rating, best in class rating, particular competitive rank, etc.

Input driver and outcome measure guidance can be used to alert or deny a user attempting to change or modify corresponding values in the use of a plan model. Additionally, input driver and outcome measure guidance can be used to define default or starting values for instances of a particular plan model. Guidance rules can be enforced to constrain or limit the ability of particular values to be entered for corresponding input drivers and outcome measures, or alternatively, can provide guidance (e.g., through GUI presentations) indicating whether proposed values (or which values) comply or do not comply with a guidance rule for the input driver or outcome measure (e.g., but not limiting the ability of the value to be applied to the plan model, in some instances). In general, input driver and outcome measure guidance provide metrics and constraints corresponding to real world decisions, factors, and inputs involved in a domain as well as the goals of the domain modeled through a respective plan model. Further, as with the values of input drivers and outcome measures, and attributes of the plan model (e.g., scope model definitions, member models, etc.), users can also have control over the defined limits, rules, and guides within input driver and outcome measure guidance of a plan model, allowing users to adjust the plan model to change assumptions as well as allowing users to perform hypothetical modeling using different guidance rules, and so on.

Planning and outcomes within a domain can be further modeled based on the domain-specific relationships between input drivers and outcome measures defined for the domain in a plan model. Turning to the example of FIG. 9A, a simplified block diagram 900a is presented representing an example implementation of a sensitivity model 905 included in a plan model. Sensitivity models 905 can model the sensitivity of various outcome measure values on changes to the values of one or more input drivers specific to the corresponding domain of the respective plan model. Further, sensitivity models 905, in some implementations, can additionally model aggregation relationships, including logic and formulas for calculating how an input driver value or outcome measure value can be disaggregated or split among member groups at varying levels of aggregations. Still further, in some instances, some input driver values can be at least partially dependent on other input driver values and, similarly, outcome measure values can be at least partially dependent on other outcome measure values. Accordingly, sensitivity models can further model these dependencies and sensitivities between values of input drivers on other input drivers and outcome measures on other outcome measures.

In one illustrative example, plan model sensitivity models 905 can include a propagation model 910 and one or more correlation models 915. A propagation model 915 can define a propagation sequence for how changes to defined input driver values (or outcome measure values) affect other input drivers' and outcome measures' values. The propagation sequence can define an order or path for how value changes cascade through other related input drivers and outcome measures. Correlation models 915 can be specified for each input driver and/or outcome measure and specify the function(s) and/or algorithm(s) used to compute how values of an outcome measure relate to, depend on, and are sensitive to values of the outcome measures and/or input drivers that influence its value. Respective correlation models 915 can model particular sensitivities and dependencies of all input drivers and/or outcome measures in a plan model. Further, all or a portion of a correlation model can be generated through automated techniques, including the use of data mining (to discover trends and relationships between market entities), regression analysis, design of experiments, and other analysis methods, among other example techniques.

Figure 9B:
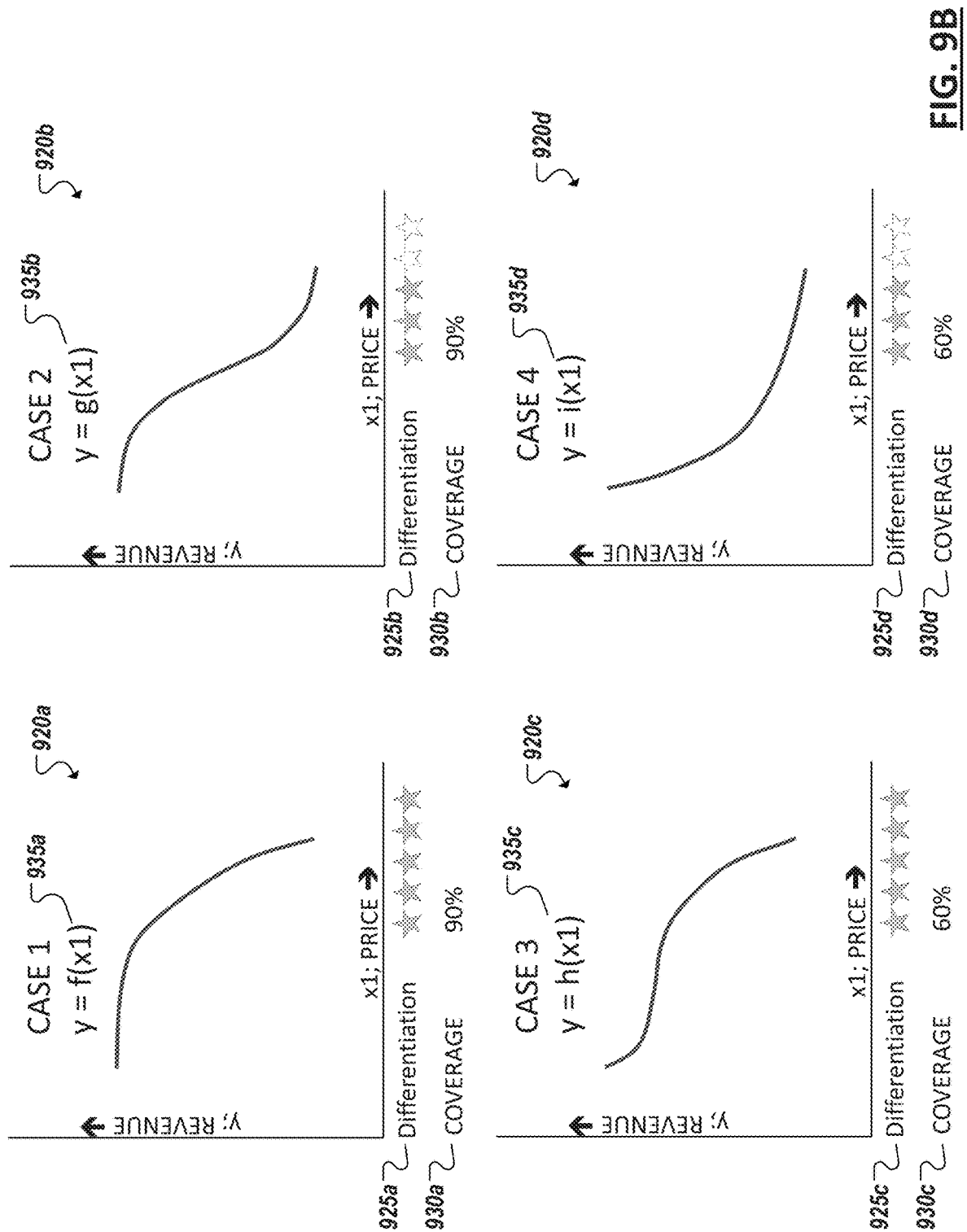

Turning to the example of FIG. 9B, a set of graphs 920a-d representing an example portion of a correlation model modeling the multi-dimensional dependence of a single outcome measure on multiple input drivers. The correlation model can additionally model the dependence of input drivers on outcome measures (and other input drivers).

Indeed, a correlation model can treat both input drivers and outcome measures as arguments of a function that represents a relationship between any one input driver or outcome measure. For instance, in the present example of FIG. 9B, a portion of a correlation model is represented of a relationship, or dependency, of values of an outcome measure Revenue (represented along the y axes of graphs 920a-d) on values of an input driver Price (represented along the x axes of graphs 920a-d). The example Revenue outcome measure can be further based on values of other input drivers including a Product Differentiation input driver (e.g., 925a-d) and Channel Coverage input driver (e.g., 930a-d). For instance, as shown in the example of FIG. 9B, the relationship between Revenue and Price can be based on a first formula 935a when the value of Product Differentiation 925a indicates a high level of product differentiation and the value of Channel Coverage is 90%, the formula 935a indicating that revenue decreases slowly as price increases (e.g., suggesting that demand is less sensitive to price increases when high product differentiation and channel coverage exist). Further, when product differentiation 925b is average but channel coverage is high, the relationship between Revenue and Price can be defined by a different formula 935b, as shown in the graph 935b, illustrating how values of other input drivers (e.g., 925a-d and 930a-d) can affect the relationship and sensitivity (i.e., dependence) of one particular outcome measure on one particular input measure, as further shown in the graphs 935c-d of formulas 935c-d.

The formulas and algorithms embodied and defined in sensitivity models can capture complex dependencies between outcome measures and input drivers, including multi-dimensional dependencies such as in the example of FIG. 9B. For instances, in some examples, a dependency can involve a lead time between a change in an input driver value and changes to values of input drivers and/or output measures dependent on the input driver. Accordingly, in some examples, correlation models can include a lead time function or component as a part of the correlation model, a lead time function defining an amount of time for the impact of a change in an input driver to be observed in other input drivers or outcome measures, among other time-based dependencies on the input driver. As an example, an increase in Marketing Spend to run an ad campaign to increase product awareness can be modeled as creating a two-week delay before correlative changes are observed at an Awareness outcome measure representing the product awareness outcome. In short, correlation models can define algorithms and formulas at varying degrees of complexity to model the domain-specific dependencies between input drivers and outcome measures, as well as between input drivers and other input drivers and between outcome measures and other outcome measures.

In some implementations, a sensitivity model can additionally allow for some input drivers and/or outcome measures that do not have a corresponding correlation function. In such instances, a sensitivity model can allow for user inputs or other outside inputs to specify, temporarily or persistently, a value for the input driver or outcome measure. In still other instances, the lack of a defined corresponding correlation function can permit the sensitivity model to also define, temporarily or persistently a dependency or formula for defining or calculating the value, among other examples. Further, the relationships and formulas underlying correlation models can be automatically generated through statistical modeling and analysis of data relating to input drivers and outcome measures of the domain.

Turning to FIG. 9C, a simplified block diagram is shown illustrating principles of an example propagation model of an example plan model. Generally, a propagation model can specify, for each input driver or outcome measure of a plan model, the sequence of how changes to values of the specific input driver or outcome measure propagate to affect values of other input drivers and outcome measures in the plan model. Indeed, propagation models can be generated from or based upon (and in some cases, automatically generated from) a collection of correlation models defining the inter-relationships of the input drivers and outcome measures of the plan model. Further, a propagation model can additionally enforce constraints to prevent circular references and other conditions. Additionally, propagation models can be used to dictate events allowing or requesting user inputs, such as in instances where an input driver (or outcome measure) is identified in a propagation sequence that lacks a correlation model, among other examples. Additionally, visual representations of a propagation sequence can be generated from propagation models for presentation on a display device to users, for instance, in connection with a scenario planning session based on a corresponding plan model, among other examples.

In the particular example of FIG. 9C, an example propagation sequence is illustrated as modeled by an example propagation model. As another illustrative example, FIG. 9C includes a simplified block diagram 900c showing how a variety of different example outcome measures and input drivers can be interconnected within the context of a particular example plan model. Such example input drivers and outcome measures can correspond to such domain-specific variables, decisions, and outcomes as Profit, Revenue, Cost of Goods Sold (COGS), Spend, Sales Volume, Channel Coverage, Coverage Spend, Sales Incentive Spend, Product Differentiation, Price, among potential others. Consequently also, a web of potential propagation sequences (and correlation models) can be defined for the various interconnections and dependencies of values of input drivers and outcome measures represented in the particular example of FIG. 9C. For instance, Profit can be a function of Revenue, COGS and Spend; Revenue can be a function of Price and Volume; Volume a function of Coverage and Differentiation; and so on. Further, the propagation model of the example plan model can include logic that disallows situations where infinite loops of evaluation can occur, such as circular references. For instance, because Sales Incentive is a function of Profit, Profit is a function of Spend, and Spend is a function of Sales Incentive Spend in this example, the propagation model can halt, suspend, or otherwise guard against evaluation through an infinite loop due to this inherent circular reference between corresponding input drivers and outcome measures.

Figures 9D, 10A:
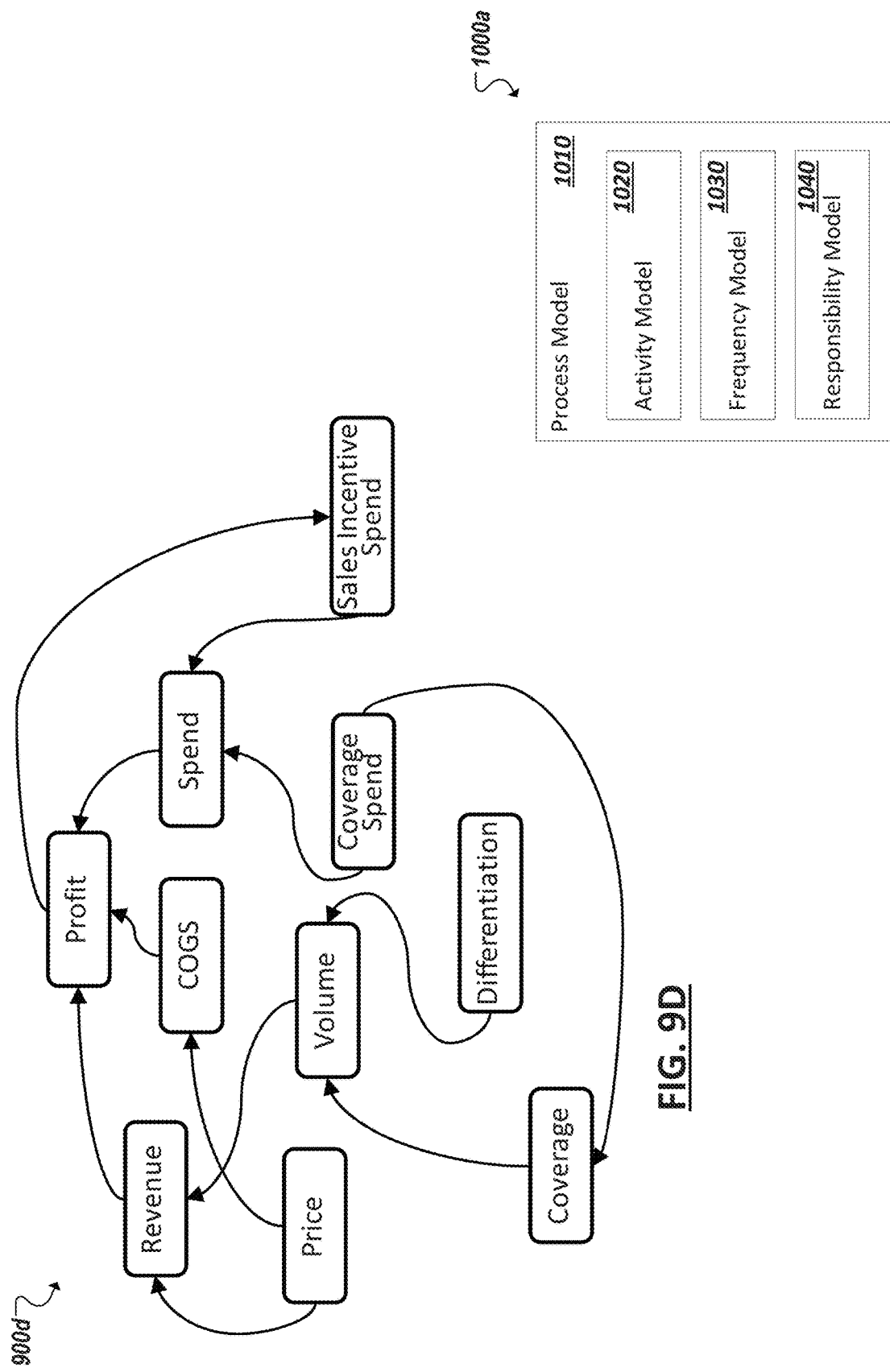

Turning to the example of FIG. 9D, a propagation model can define how a value or value change of a particular input driver (or outcome measure) propagates to and affects values of other input drivers and/or outcome measures. For instance, in the example of FIG. 9D, an example propagation sequence based on changes to values of input driver 940 can involve a plurality of other input drivers (e.g., 942, 944, 945, 948, 950) and a plurality of outcome measures (e.g., 946, 952, 954, 955). Other examples can include more or fewer input drivers and/or outcome measures, and in some instances, a single outcome measure or a single input driver, among other examples. In the particular example of FIG. 9D, the values of two other input drivers 944, 945 and an output measure 946 can be dependent on and affected by changes to the value of input driver r1 (940). This can be considered a first sequence step 956. As the values of input drivers 944, 945 and outcome measure 946 are at least partially dependent on input driver r1 (940), other input drivers and outcome measures (e.g., 952, 954) dependent on input drivers 944, 945 and outcome measure 946 can also be affected by the change to the value of input driver r1 (940). As input drivers and outcome measures can be dependent on values of multiple different other input drivers and outcome measures, subsequent sequence steps (e.g., 958) defining a propagation sequence for changes to the value of input driver r1 (940) can also be dependent on (and wait for) values of these other input drivers and outcome measures (e.g., 942, 948, 950). Some dependent input drivers (e.g., 944, 946) and outcome measures (e.g., 946) may only be a single sequence removed from the first input driver r1 (940), while others values are more removed within the propagation sequence, such as outcome measures 952, 954, 955 affected at second (958) and third sequence steps of this particular example propagation sequence.

It should be appreciated that the examples of FIGS. 9C and 9D (and other examples herein) are non-limiting examples provided merely for illustrating certain principles and features of this Specification. Propagation models (among the other models described herein) can be flexibly tailored to model any variety of propagation sequences involving any variety of combinations of input drivers and outcome measures commensurate with the modeling of particular outcomes of particular modeled domains.

Turning to FIG. 10A, in some examples, in addition to including a scope model, input drivers models, sensitivity models, and outcome measures, a plan model can include other models used in the modeling of a domain's goals and enhancing use of the plan model itself, such as in scenario planning activities based on the plan model. In one example, as shown in the simplified block diagram 1000 of FIG. 10A, a plan model can further include a process model 1010 that further relates to the input drivers and outcome measures of the plan model. A process model, for instance, can specify the timing of planning activities designated for the corresponding plan model. For instance, in one example implementation, process models 1010 can include an activity model 1020, frequency model 1030, and responsibility model 1040, among potentially others. A process model 1010, in some instances, can be used to facilitate coordination between plan models of differing domains and potentially managed by different users by describing the various activities and tasks associated with the plan model, the timing of those activities (e.g., to assist in synchronizing use of the different plan models), and the users and parties responsible for those activities and/or the plan models themselves. In some implementations, a process model 1010 can adopt principles of responsibility assignment matrices, linear responsibility charts, and other protocols describing the participation by various roles in completing activities cross-functional and cross-departmental projects and activities, such as RACI, CAIRO, DACI-based process models, etc.

An activity model 1020 of an example process model can define planning activities of an organization relating to or using the plan model to which the process model 1010 belongs. An associated frequency model 1030 can define the timing of these planning-related activities, including the frequency at which the activities begin and end (e.g., daily, weekly, hourly, etc.), as well as more precise calendaring of activities that take place at less periodic intervals. With this information, planning activities involving multiple different plan models can be coordinated according to the respective planning activities defined for the respective plan models. In addition to activity 1020 and frequency models 1030, process models can further include a responsibility model 1040 identifying particular users, user groups, departments, etc. responsible for the planning activities described in the activity model 1020 as well as the plan model itself. Such models 1040 can be used as well in collaborative planning activities allowing users to identify other users responsible for other plan models linked to or otherwise involved in a planning activity, among other examples.

Figure 10B:
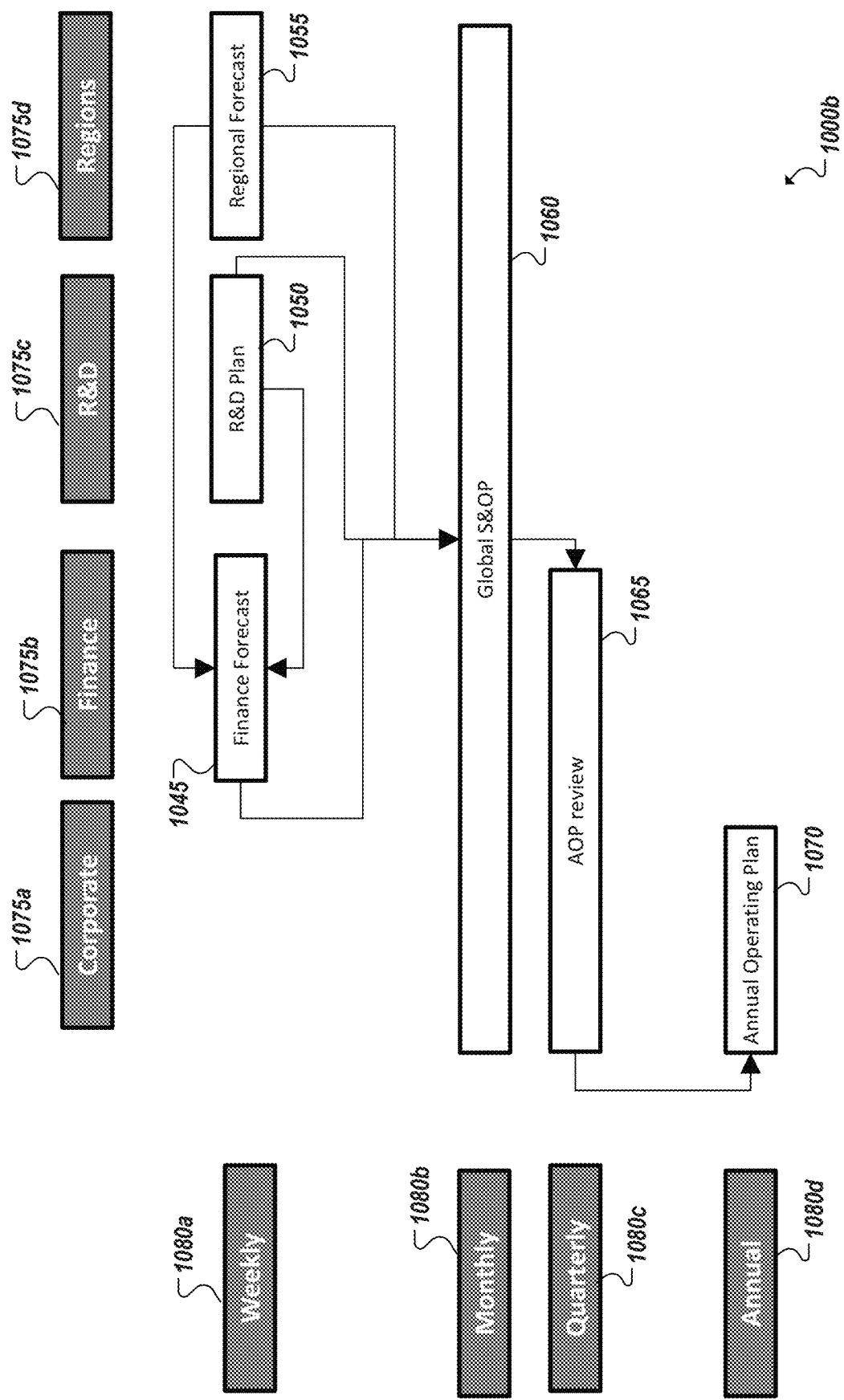
FIG. 10B is a simplified block diagram representing a set of plan model activities defined using example process models of the respective plan models.

The example of FIG. 10B illustrates some principles and features enabled through example process models, such as the example process model shown and described in the example of FIG. 10A. For instance, in the simplified block diagram 1000b of FIG. 10B, a set of interconnected plan models 1045, 1050, 1055, 1060, 1065, 1070 are shown modeling outcomes in domains of an example organization such as finance forecast (e.g., 1045), research and development (e.g., 1050), regional forecasting (e.g., 1055), global sales and operation (e.g., 1060), adjusted operating profit review (e.g., 1065), and annual operating plan (e.g., 1070) among other potential plan models and other examples. Each of the plan models 1045, 1050, 1055, 1060, 1065, 1070 can have respective process models modeling activities using the corresponding plan model, such as the development of certain scenarios, such as a plan of record for the organization, or other planning activities. As represented in FIG. 10B, the process models of the plan models 1045, 1050, 1055, 1060, 1065, 1070 can identify particular departments or user groups (e.g., 1075a-d) that is responsible for the activity or to which the plan model belongs. Some plan models (e.g., 1045, 1050, 1055, 1070) can be belong to or be associated with a single department, while other plan models (e.g., 1060, 1065) are controlled by multiple departments in concert. For example, both a Corporate group 1075a and Finance group 1075b can be defined (in a corresponding process model) as responsible for generating a plan of record scenario (as well as other scenarios) using the AOP Review plan model 1065. Further, in addition to indicating an activity and a group (e.g., 1075a-d) responsible for performing the activity, process models can also define the timing of the activity. For instance, a plan of record scenario activity can be defined as being generated on a weekly basis (e.g., 1080a) for plan models 1045, 1050, 1055, monthly basis (e.g., 1080b) for plan model 1060, a quarterly basis (1080c) for plan model 1065, and annually (e.g., 1080d) for plan model 1070. The process models of interconnected plan models 1045, 1050, 1055, 1060, 1065, 1070 can thereby assist users in coordinating and managing activities that could potentially be impacted by or influence other plan models in the interconnected network of plan models, among other examples.

As noted above, a single plan model can be but a single plan model in a network of plan models for an organization (or group of organizations). Indeed, plan models can be adapted to be interconnected with other plan models in a network of plan models. As each plan model is tailored to a particular objectives and goals of a particular, defined domain, a network of interconnected plan models, each corresponding to a distinct domain, can provide a powerful system of software-based models enabling interactive, quick, collaborative decision making across the different plan models and, consequently, across multiple different, corresponding domains of an organization. Each plan model can independently model goals of its particular domain as well as be adapted to interconnect to other plan models to generate multi-domain scenarios and perform multi-domain planning activities using multiple plan models. In some implementations, process models of the respective plan models can assist in facilitating such multi-plan model activities.

Figure 11A:
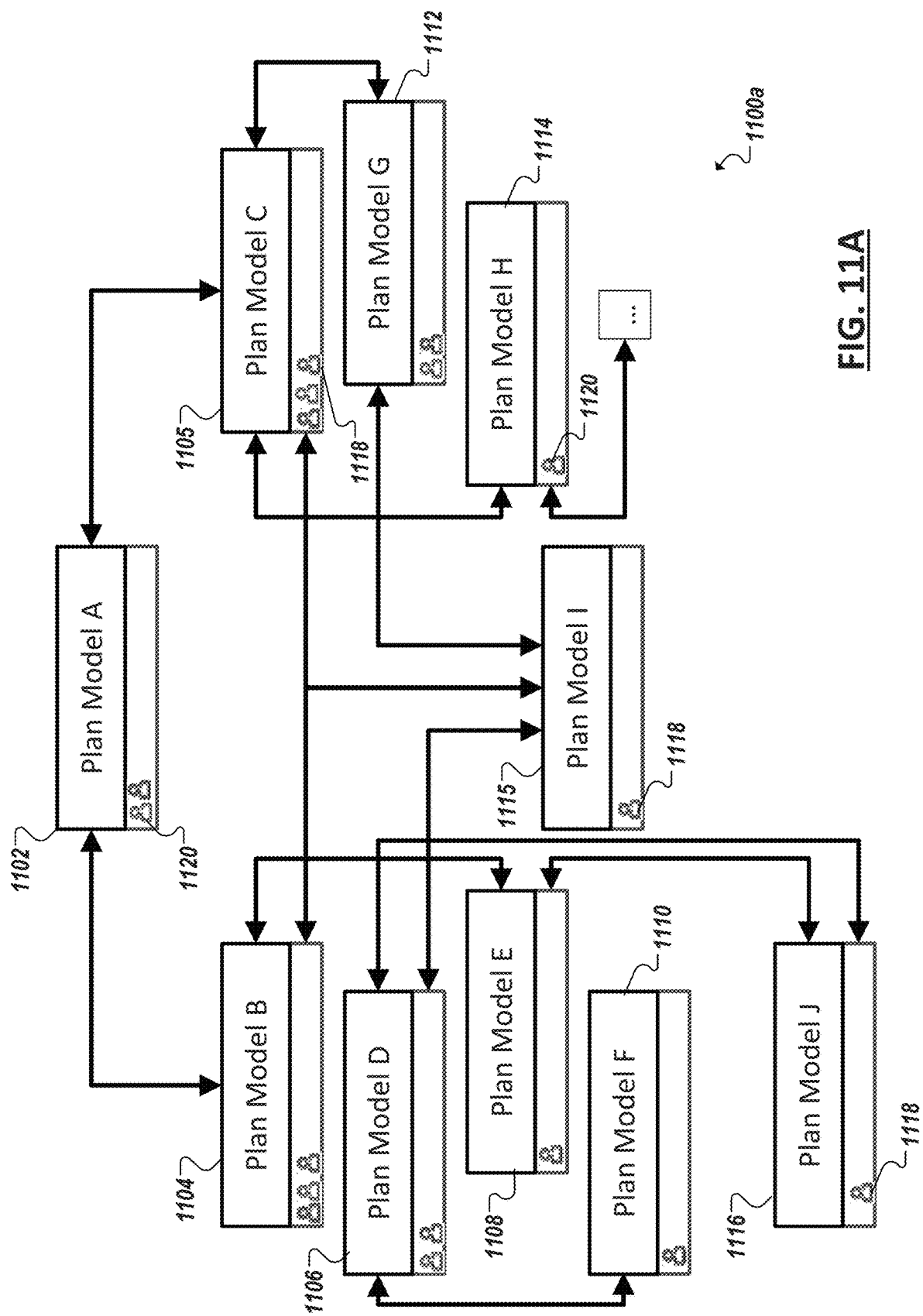
FIGS. 11A-11B are simplified block diagrams illustrating example networks of plan models.

Turning to the example of FIG. 11A, a simplified block diagram is shown representing a network 1100 of plan models (e.g., 1102, 1104, 1105, 1106, 1108, 1110, 1112, 1114, 1115, 1116). Plan models in the network 1100 can be interconnected with one or more different other plan models in the network 1100 based on one or more input drivers of the plan model being dependent on one or more outcome measures (or even input drivers) of another plan model in the network 1100. Further, a plan model in the network 1100 can also be interconnected with other plan models in the network 1100 by virtue of an outcome measure (or input driver) of the plan model driving values of input drivers of the other plan model. Each plan model in the network 1100 with respective included scope models, input drivers models, outcome measures models, sensitivity models, process models, etc. The respective models of each plan model in the network 1100 can be tailored to model outcomes for a particular, distinct domain within the network, including representative scope models, sets of input drivers and outcome measures, etc.

Further, different users (or groups of users) (e.g., 1118, 1120) within an organization (or organizations) of the network 1100 of plan models can be assigned to or associated with particular plan models in the network 1100. Such associations can be based, for instance, on the users' respective roles, office locations, departments, etc. within the organization, with particular plan models being made available to those users corresponding to the particular defined domain of the respective plan model. As a simplified example, a particular user can be a manager of a particular department of an organization that is responsible for one or more different product lines. As the particular user 1118 can be responsible for managing, planning, and making decisions within this particular realm of the organization, the particular user 1118 can be associated with plan models that relate to the user's role, such as plan models (e.g., 1105, 1115, 1116) with domains corresponding to the particular department or constituent product lines of the user. Being associated with the plan models can authorize access and use of the respective plan models 1105, 1115, 1116 associated with the user in some instances. Other users not associated with the plan models 1105, 1115, 1116 may be blocked or limited in their ability to access and use the plan model 1105, 1115, 1116. However, other users (e.g., 1120) can be associated with other plan models (e.g., 1102) with domains more pertinent to their role within an organization. Some users can be associated with multiple plan models based on their role(s) within the organization, among other examples.

Dependencies between values of outcome measures (or other input drivers) of one plan model and input drivers (or outcome measures) of another plan model can be defined through link expressions. Link expressions can be specific to a single input driver-outcome measure pair (or input driver-input driver or outcome measure-outcome measure pair) of a plan model and define such aspects of the relationship as the algorithms and functions determining the sensitivity and dependence of the input driver on the outcome measure (e.g., analogous to correlation models of plan models' individual sensitivity models), as well as aggregation and disaggregation relationships (i.e., allowing modeling of the effects of inter-plan-model dependencies at their respective levels of aggregation), filter conditions applicable to the input driver-outcome measure pair, and so on. Linking expressions can further utilize established dimension- and attribute-based relationships between members of two or more different plan models linked through the link expressions.

Linking of plan models can allow for analysis of one or more plan models as the focus of a planning activity (e.g., the "focus plan models" of the planning activity), based at least in part on the dependencies of the focus plan models on other plan models to which they are linked through link expressions (or the "linked" plan models of the focus plan models).

Figure 11B:
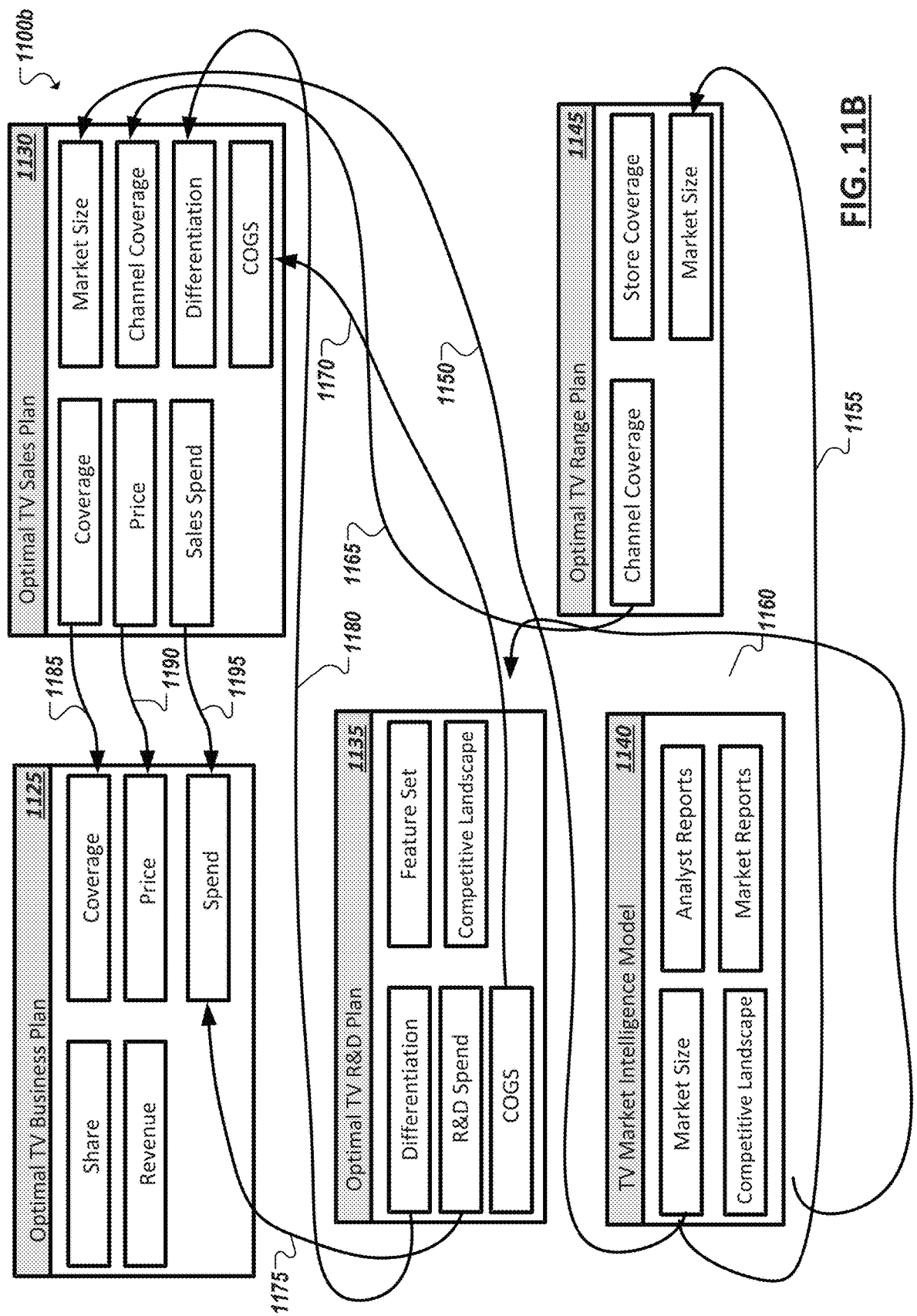

FIG. 11B illustrates one potential example of link expressions (e.g., 1150, 1155, 1160, 1165, 1170, 1175, 1180, 1185, 1190, 1195) between example plan models (e.g., 1125, 1130, 1135, 1140, 1145) in a network 1100b of plan models. In the example of FIG. 11B, input drivers of each of the represented plan models 1125, 1130, 1135, 1140, 1145 are listed in a right column and outcome measures in a left column. For instance, example Optimal TV Business Plan plan model 1125 can include input drivers Coverage, Price, and Spend while including outcome measures Share and Revenue. As further illustrated by FIG. 11B, inputs drivers of the example Optimal TV Business Plan plan model 1125 can be based on outcome measures of other plan models. For instance, values of Coverage input driver of example Optimal TV Business Plan plan model 1125 can be dependent on a Coverage outcome measure of example Optimal TV Sales Plan plan model 1130, the dependency defined through a link expression 1185. Similarly, the Price input driver of plan model 1125 can be dependent on a Price outcome measure of plan model 1130 and the Spend input driver of plan model 1125 can be dependent on multiple outcome measures (Sales Spend and R&D Spend) of two different plan models (e.g., 1130, 1135), with respective link expressions (e.g., 1195, 1175) defining the dependencies between the respective input drivers and outcome measures.

Continuing with the discussion of FIG. 11B, an example plan model (e.g., 1130) can serve as a focus plan model in one activity and as a linked plan model in another activity (e.g., where one of the example plan model's linked plan models is the focus plan model). For instance, while input drivers of plan model 1125 are represented as dependent on outcome measures of Optimal TV Sales Plan plan model 1130, the Optimal TV Sales Plan plan model's 1130 may itself be dependent on values of other plan models in the network 1100b, such as defined by link expressions 1150, 1165, 1170, 1180, among other examples.

Link expressions (e.g., 1150, 1155, 1160, 1165, 1170, 1175, 1180, 1185, 1190, 1195) can interconnect example plan models (e.g., 1125, 1130, 1135, 1140, 1145) in a network 1100b of plan models and further enable scenario planning, analyses, and other uses across multiple plan models. This can further enable users of the network of plan models to cross-collaborate and plan across multiple, corresponding domains within an organization. For instance, link expressions (e.g., 1150, 1155, 1160, 1165, 1170, 1175, 1180, 1185, 1190, 1195) between plan models (e.g., 1125, 1130, 1135, 1140, 1145) can enable an ask-response collaboration protocol within the network of plan models as well as automated network propagation between multiple plan models in the network 1100b.

An example ask-response collaboration protocol can enable the setup of process workflow parameters within a given organization that is based on at least two different plan models in a network of plan models. Such workflow parameters can include, for instance, a due date for response, owner of a request, owner of response, etc. In ask-response collaboration, a focus plan model can request or provide a particular target value for one or more target outcome measures of a corresponding linked plan model. In response, the linked plan model can provide a response with feedback concerning the feasibility of the target value and effects of applying the target value to its targeted outcome measure based on its plan model. In this manner, one department or business unit of an organization can collaborate with and solicit input from other departments (and corresponding plan models) in the scenario building, planning, and other uses of their own plan models.

To illustrate, in one particular example corresponding to the example of FIG. 11B, Optimal TV Business Plan plan model 1125 can be the requesting focus model in a planning activity and one or more linked plan models (e.g., 1130, 1135) of the Optimal TV Business Plan plan model 1125 can be identified. The Optimal TV Business Plan plan model 1125 can "ask," through an example ask-response-consensus protocol, that Price for a given television product be set, for instance, to $1000 in the United States (i.e., specifying a value corresponding to a particular level of aggregation for the plan model 1125 (e.g., the type of television and market region, etc.). A corresponding linked plan model, Optimal TV Sales Plan plan model 1130, can be identified as the recipient of the "ask" and can be used to assess the feasibility of the requested $1000 value. Accordingly, Optimal TV Sales Plan plan model 1130 come back with a response, based on its plan model 1130 and the input driver(s) that would enable the realization of a $1000 value of its corresponding Price outcome measure. In some instances, plan model 1130 could attempt to set the provided outcome measure to the targeted value (e.g., $1000) and report back whether or not the value could be achieved and what input driver values would result in such a value. This can be achieved, for instance, by analyzing and computing, through regression algorithms, or other techniques, the values (or sets of values) of input drivers of the linked plan model that would result in the requested value for the linked plan model's outcome measure.

In some instances, the "response" by the Optimal TV Sales Plan plan model 1130 can indicate that whether or not the "asked" value is obtainable as well as the consequences of adopting such a value across not only the Optimal TV Sales Plan plan model 1130 but also linked plan models (e.g., plan models 1135, 1140, 1145) of the Optimal TV Sales Plan plan model 1130 itself. Based on the feedback of the "response," a "consensus" value can be derived, in some instances through iterative ask-response exchanges between the plan models 1125, 1130, until a value is settled upon for Price that is agreeable to both the Optimal TV Business Plan plan model 1125 and the Optimal TV Sales Plan plan model 1130 (as well as, potentially, other plan models in the network linked to the Optimal TV Business Plan plan model 1125 and/or the Optimal TV Sales Plan plan model 1130), among other examples.

As noted above, because input drivers of a linked plan model (e.g., 1130) in an ask-response exchange can themselves be dependent on outcome measures of other plan models (e.g., 1135, 1140, 1145) of the network 1100b, a request of a focus plan model (e.g., 1125) to a linked plan model (e.g., 1130) that is itself also a focus plan model, can result in a chain of ask-responses. In other instances, the requested linked plan model (e.g., 1130) can ignore, for purposes of providing a response to a focus model's request, its own dependencies on other plan model (e.g., 1135, 1140, 1145). However, more powerful and accurate modeling can be achieved by considering a larger chain of interconnected plan models, potentially modeling effects across an entire organization, business unit, or department having multiple related plan models. For instance, input drivers of a plan model 1130 can themselves be dependent on outcome measures of plan models 1135, 1140, 1145. In order to set values of the input drivers of plan model 1130 to respond to the "ask" request of plan model 1125 relating to a Price outcome measure, plan model 1130 can initiate its own series of ask-response exchanges with each of plan models 1135, 1140, 1145 to confirm the feasibility of values for input drivers Market Size, Channel Coverage, Differentiation, and COGS of Optimal TV Sales Plan plan model 1130 used as the basis of delivering a response to the original request from Optimal TV Business Plan plan model 1125 regarding the feasibility of a $1000 value for Price.

Given the interconnection of plan models, a single input driver or outcome measure of any given plan model can be considered dependent on values of other interconnected plan models' input drivers and outcome measures. In simple analyses, these dependencies can be ignored, however, as illustrated in the example above, a chain or sequence of link expressions can be leveraged to more completely model effects and dependencies across multiple plan models. Automated network propagation can automate this propagation of ask-responses across multiple plan models, for instance, with one user-generated ask from a first focus plan model (e.g., 1125) to a first requested linked plan model (e.g., 1130) prompting the automated generation of asks directed to other plan models (e.g., 1135, 1140, 1145) upon which the first linked plan model (e.g., 1135) is dependent as well as automating propagation of responses to these asks through the interconnected plan models to generate the ultimate response to the original ask (e.g., from plan model 1125). Automated network propagation can further enable and drive execution of goal-based scenario planning involving two or more linked plan models, including plan models within a network of plan models (e.g., 1100b), among other examples. Indeed, many other examples of ask-response exchanges and automated propagation between plan models are possible, not only within the context of this particular example, but generally across any conceived network of plan models, particularly considering the potentially infinite number of different plan models that can be developed to model various domains and the potentially infinite ways such plan models can be interconnected in plan model networks modeling organizations and other entities.

FIGS. 12A-12L show screenshots of additional example user interfaces of an example plan model (or planning) system. User interfaces and GUI planning tools can be provided to present visualizations of information contained within the data models of an enterprise. For instance, the screenshot 1200a shows a GUI illustrating a table infographic corresponding to a process monitor illustrating various processes of a particular enterprise. The processes, in this example, include multiple plans that have been developed by an enterprise relating to various domains of the enterprise's business. Corresponding plan models can be generated and populated with data to model each of the respective plans. For instance, in this example, the plans (and corresponding plan models) can include a merchandise plan (e.g., to facilitate demand-side planning such as modeling future planned merchandise purchase needs at the department or category level), an assortment plan (e.g., to model future product assortment offerings by market (e.g., sales quarter and geographical area)), and a buy plan (e.g., to predict supply needs of the enterprise by modeling sourcing and predicted sourcing needs (e.g., based on the corresponding portions of the merchandise and assortment plans)), among other examples. The plan models underlying each of these plans can include data that can be synthesized to generate the table and table contents shown in the example of FIG. 12A. For instance, the data can be analyzed (e.g., by a planning engine) to determine the percentage completion of the plan (e.g., how close the enterprise is to achieving the goal(s) of the corresponding plan).

Figure 12A:
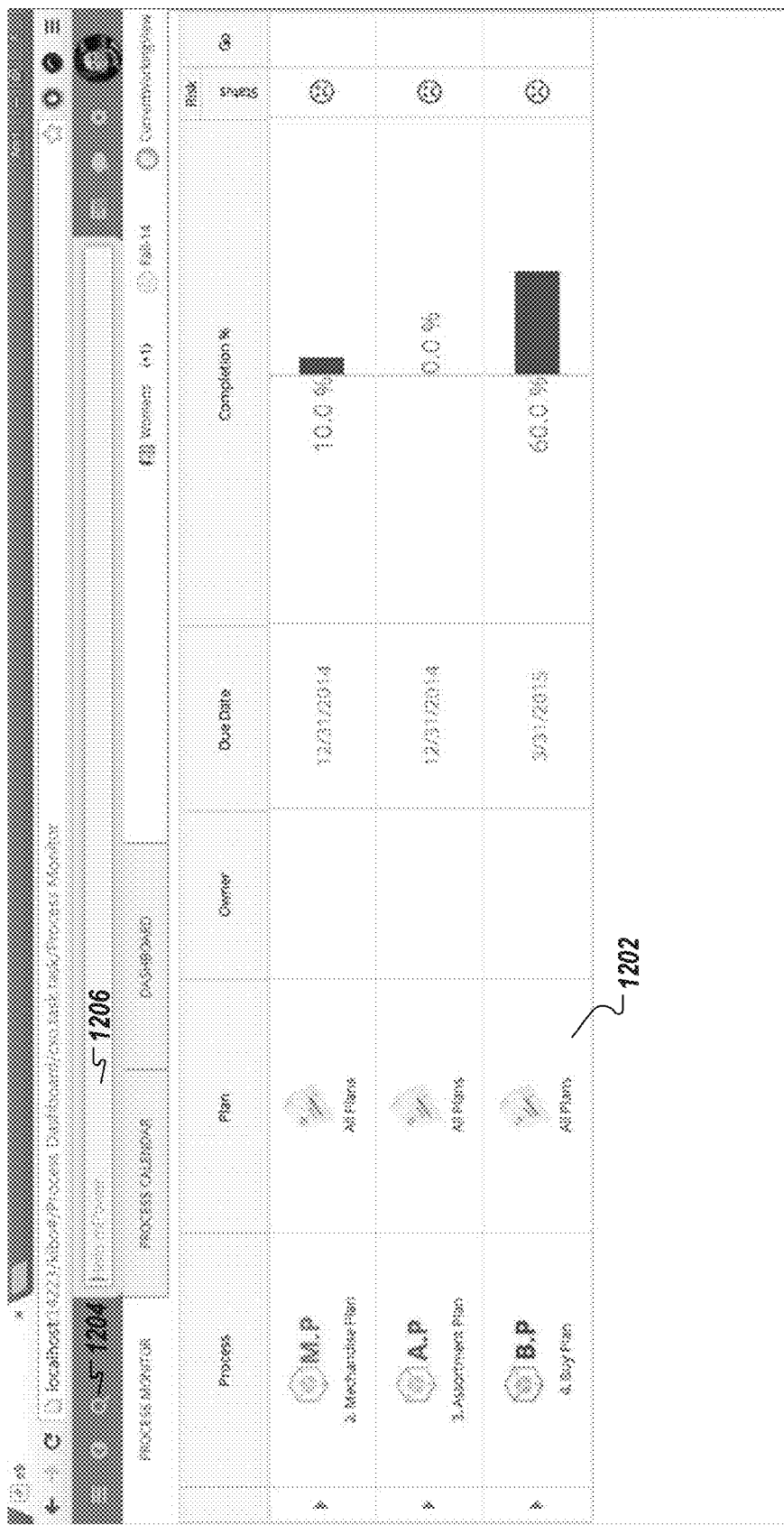
FIGS. 12A-12L are screenshots of example user interfaces for use in connection with one or more example plan models.
Figure 12B:
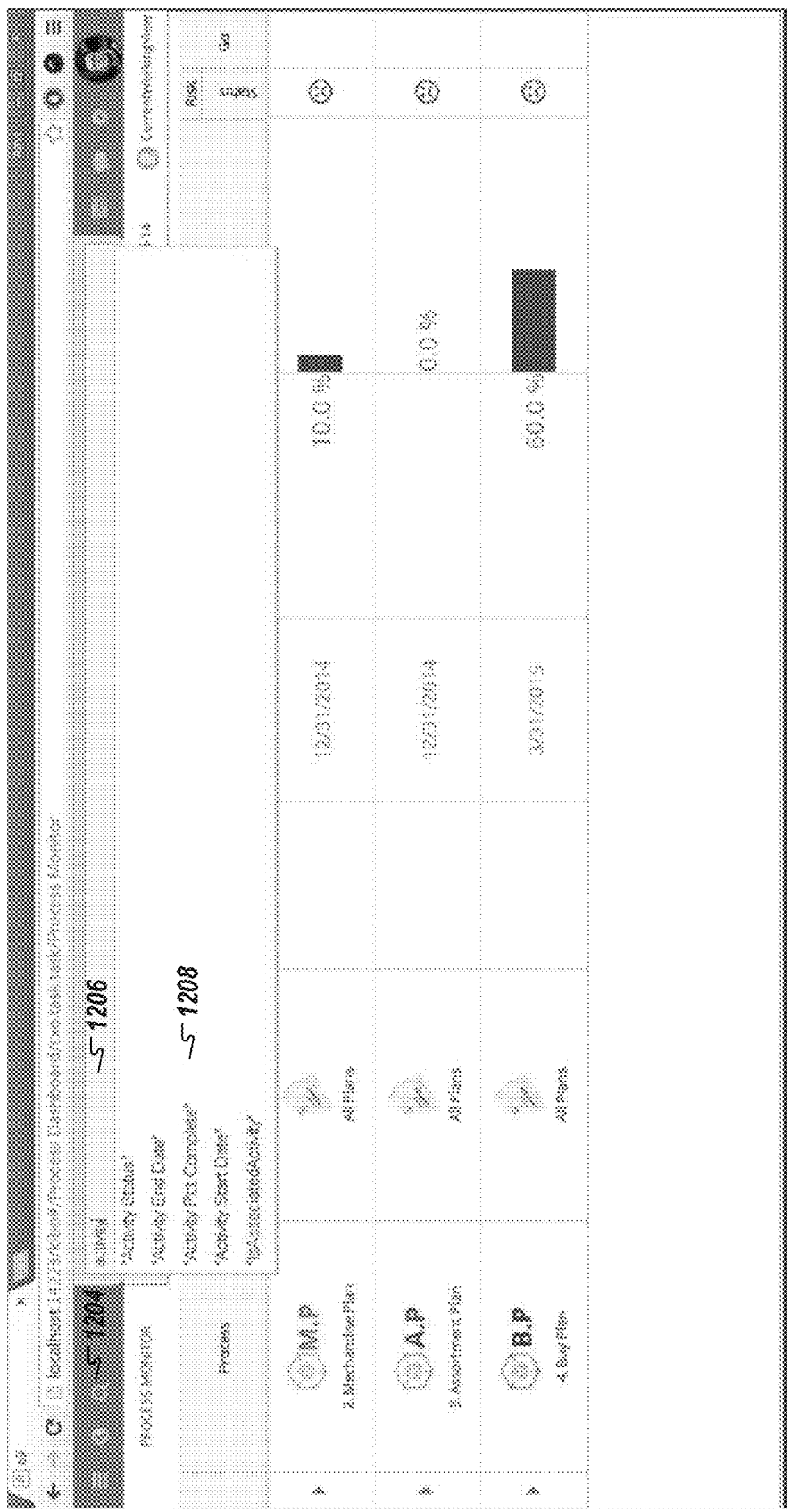
Figure 12C:
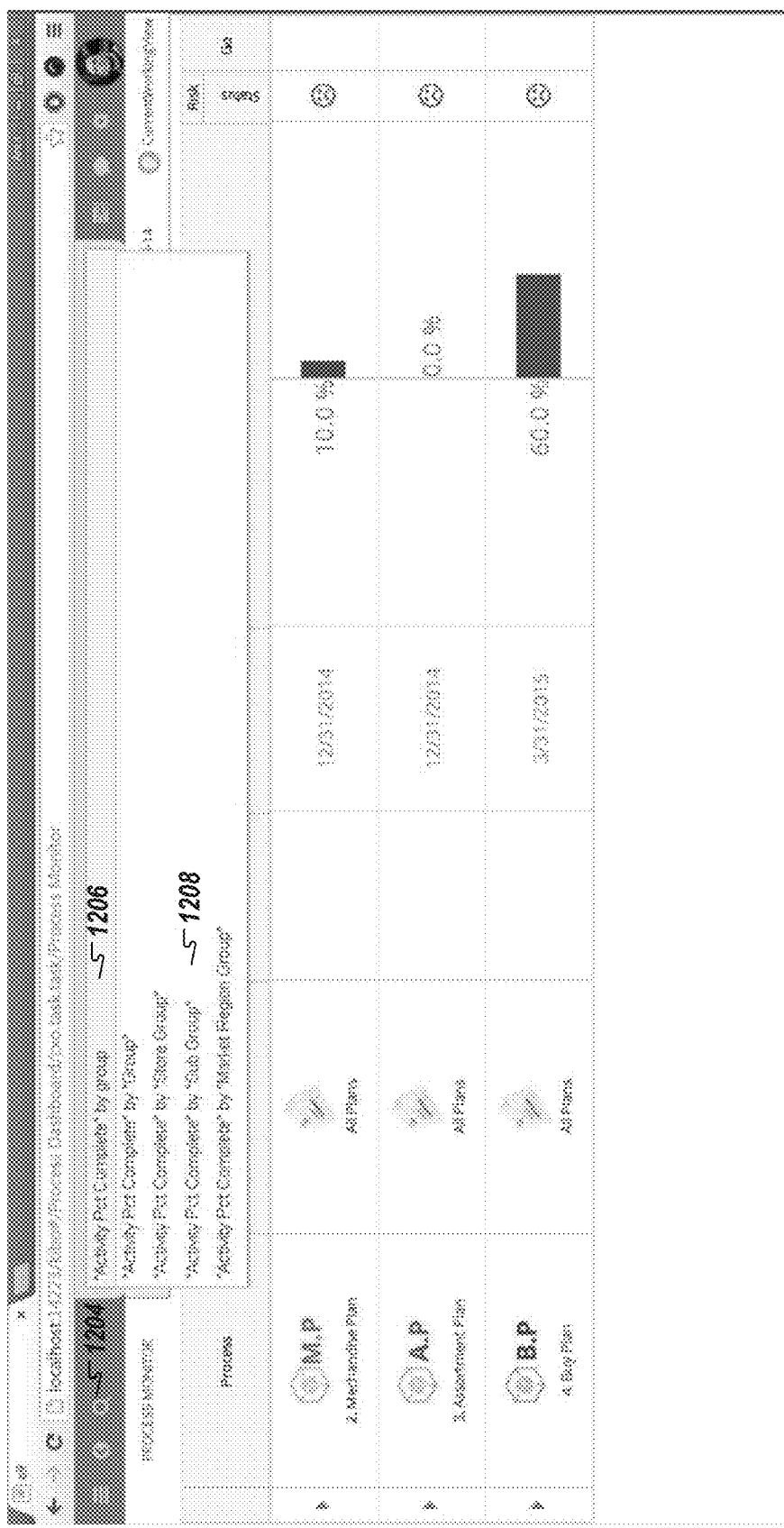

The GUI and included infographics can be interactive. A user can select a portion of the infographic (e.g., through a mouse and cursor or touchscreen) and the GUI can be updated to show a different view of the same or a different infographic showing details of the plan model corresponding to the selected portion of the infographic. For instance, selection of cell 1202 in the example table shown in FIG. 12A can cause additional hidden rows of the table to be presented that correspond to sub-plans of the Buy Plan (such as shown in the example of FIG. 12F). Other selections can cause the GUI to navigate to other views that show visualizations of other information modeled within the enterprise data models (using infographics of the same or a different type).

In addition to navigating the enterprise data model through the provided interactive GUI infographics, a GUI can also facilitate searching of the enterprise data model (and include plan models), using one or more of the search techniques described herein. For instance, a user can access the search functionality by selecting a search icon or button (e.g., 1204). As shown in FIG. 12B, a search field 1206 can be presented in response to the selection of the search icon 1204. A user can type a search query (e.g., a natural language search query) into the field, and a search engine capable of understanding and searching the underlying enterprise model data structures, can return a result to the query.

In the particular example shown in FIG. 12B, the search engine can further provide assistance to the user in the form of suggested search terms based on text entered by the user. For instance, a user begins typing the word "activity" in an assisted-natural language search using search field 1206. The search engine can detect the entered text and immediately begin searching the underlying plan models to identify the measures and dimensions defined within the plan models that potentially correspond to the characters entered by the user in the search field 1206. In the example of FIG. 12B, identified potential search terms referencing measures, dimensions, or other named attributes within the underlying plan models corresponding to "activity" can be identified and presented to the user (e.g., at 1208). One of the suggestions can be selected from the listing 1208 and can be adopted as a search term within the field 1206. For instance, "Activity Pct Complete" can be selected and adopted as a term within a query, such as shown in FIG. 12C. The user can then continue to build the search query by entering additional search terms, including modifier terms to define the type of results to be generated from the search and/or define relationships between other search terms. For instance, the user may wish to view a representation of the measure "Activity Pct Complete" sorted by plan group (or "Group"). The user, after selecting the suggested term "Activity Pct Complete" can add sorting modifier term "by" to the search term, followed by text "group." Upon identifying the presence of the "by" modifier term, the search engine can again generate a listing of suggested queries from subsequent text (e.g., "group") based on a search of the structure of the underlying plan models to identify other measures and dimensions defined in the model. The search engine can also identify custom measure terms defined by a user or enterprise for inclusion in their respective plan models. For instance, plan models can be customized and include measures with names that are unique, custom, or otherwise tailored to an organization. Listing 1208 illustrated in FIG. 12C, shows the updated listing presented in the response to the user's entry of text "group" (i.e., added to the remainder of the search query "'Activity Pct Complete' by . . . "). As in the example of FIG. 12B, the user can select a desired one of the suggested terms to adopt in the search query. For instance, the user can select "'Activity Pct Complete' by 'Group'" from listing 1208. In other instances, the user may decline the recommended search terms and provide their own custom term. Custom terms can also be interpreted using the search engine to query the underlying data models. From here, the user can continue to enter text to further develop the search query. Alternatively, the user can press enter or otherwise indicate that a search is to be performed using the current terms within the search field 1206.

Figure 12D:
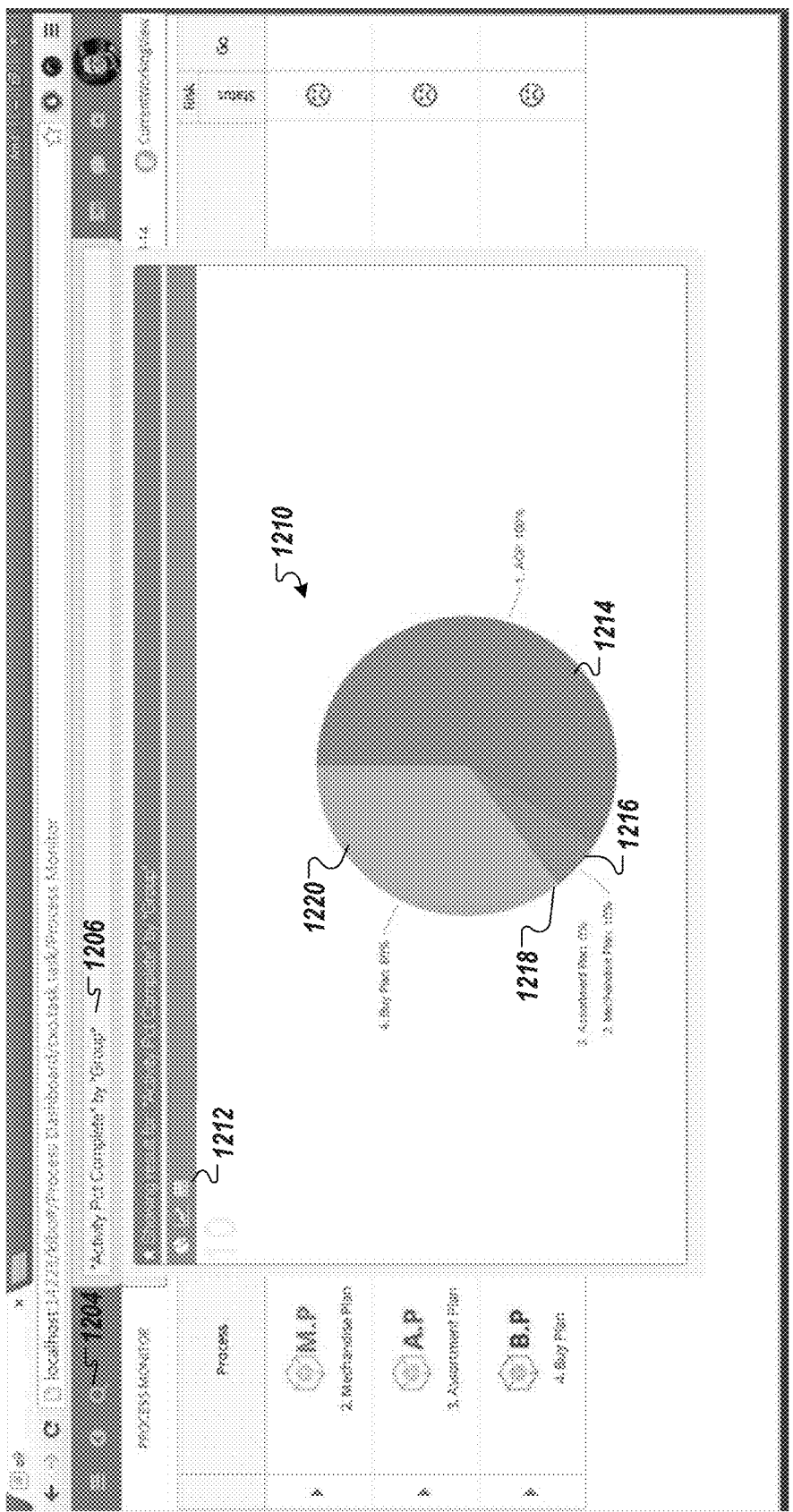

Turning to FIG. 12D, in one example, a search is carried out using the search query "'Activity Pct Complete' by 'Group'." The search engine can interpret the query and search the underlying plan models. For instance, in this case, the search engine can identify all plan models that include the measure "Activity Pct Complete" and can group the identified plan models according to their respective groups. Further, the search engine can access or use logic to determine an aggregate value for the measure "Activity Pct Complete" for each of the groups from the measures of the corresponding identified plan models. The search results generated by the search engine can be rendered by a GUI engine into an infographic 1210. The infographic 1210 can be a particular one of several available infographic types. The search engine can predict from either or both the search query and search results which of the available infographic types is most appropriate to use. Additionally, user profile data can be consulted to identify whether user preference information is defined for the current user. In some cases, user preference information can also influence which of the available infographic types is selected for a set of search results. For instance, user preference information can identify which infographic types are preferred by the corresponding user for searches of this or a similar type, among other example considerations.

Figure 12E:
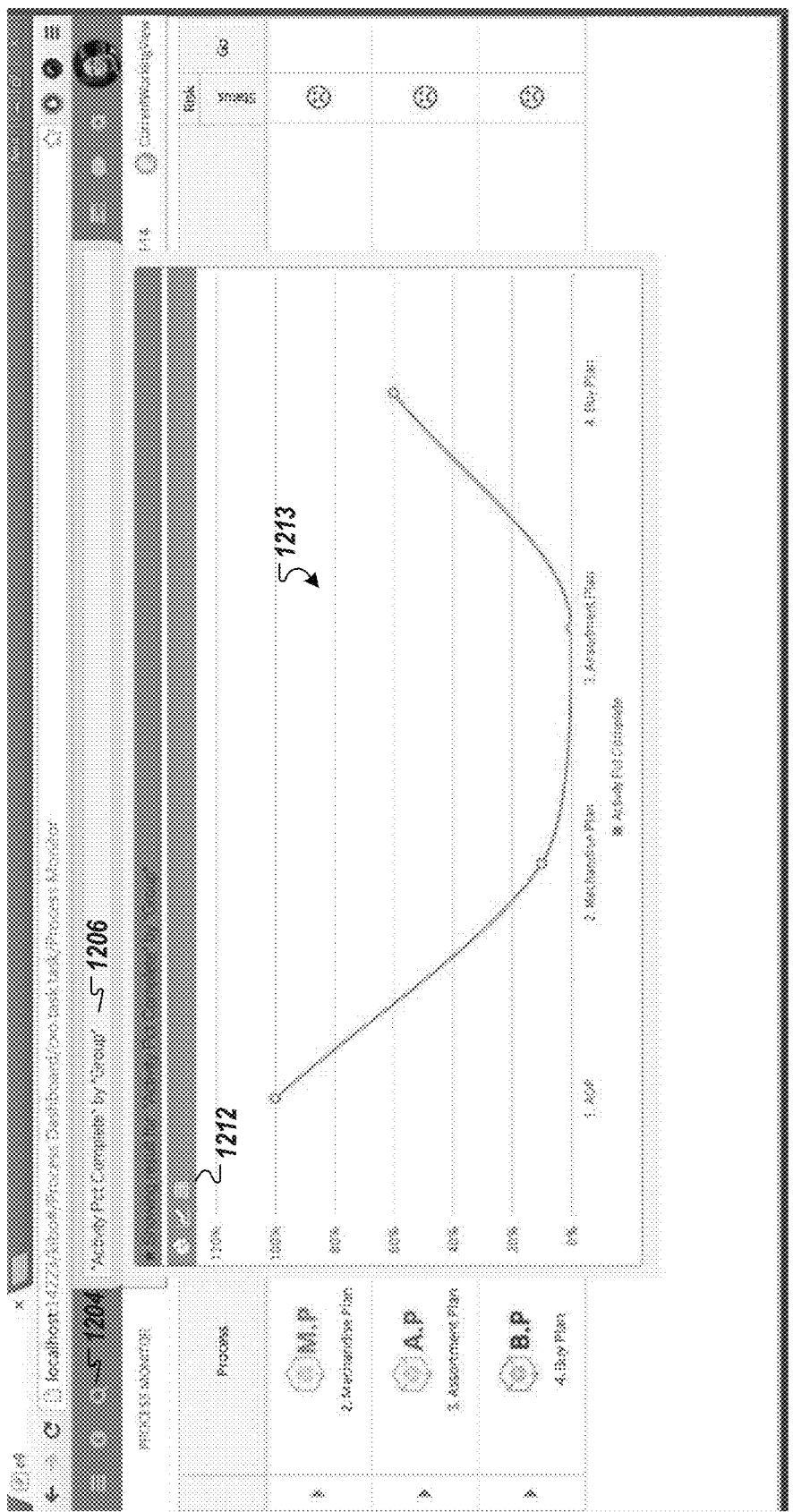
Figure 12F:
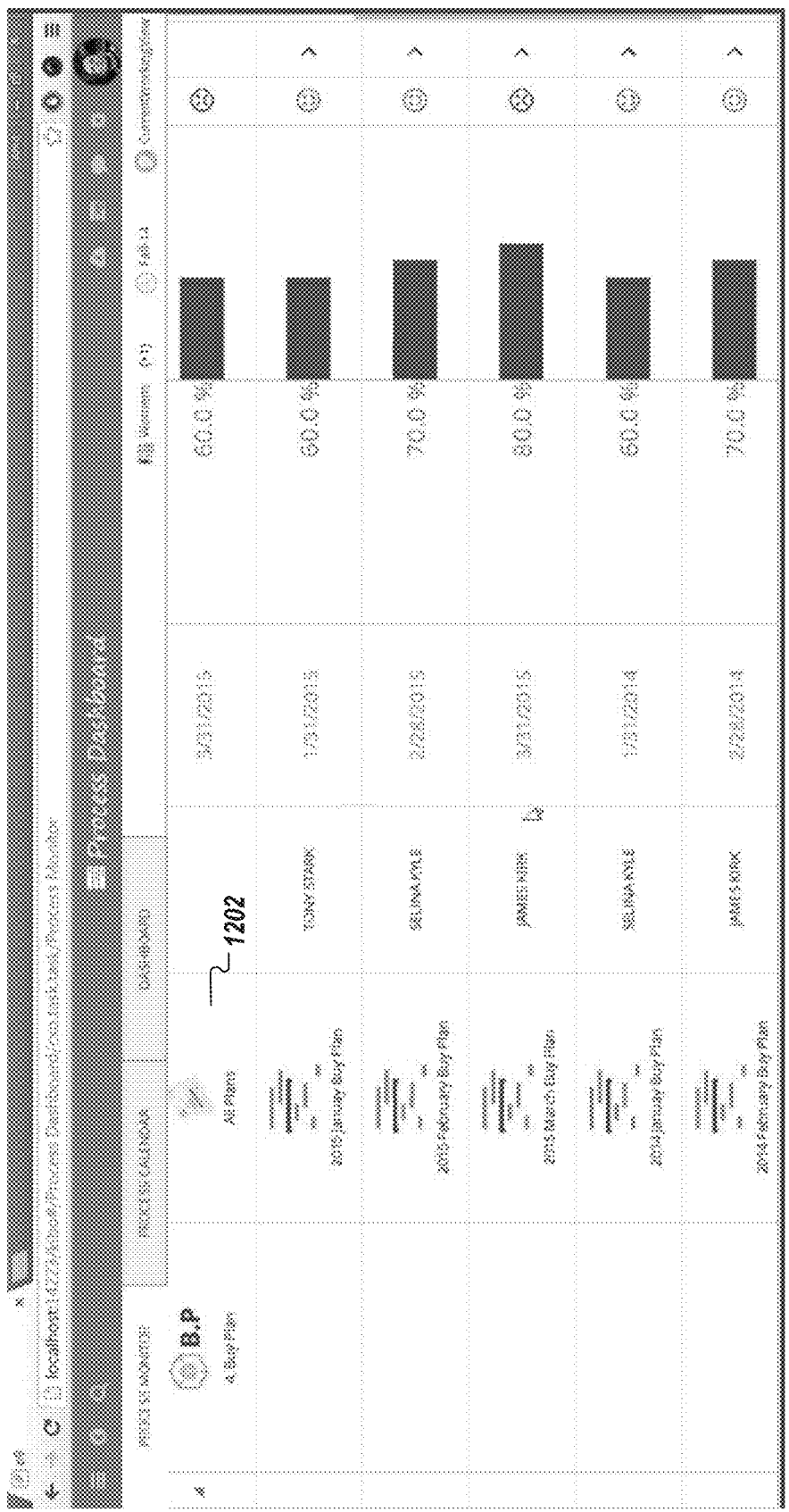

While the search engine (and/or GUI engine) can select the initial infographic type to be used to represent the returned search results, a user can request that the same results be instead presented in a different one of the available infographic types. For instance, a control 1212 can be provided to identify one or more alternative infographic types that can be used to represent the returned data. The set of available alternative infographic types can vary, in some implementations, based on the type of the search query and/or returned search results. In one example, shown in FIG. 12D, control 1212 can allow a user to toggle between three potential infographic types. The initial, or default, infographic type for searches of the type illustrated in FIG. 12D (e.g., to compare values of a single measure across multiple business entities) can be a pie chart view. Alternative views, in this particular example, can include a line chart infographic type and a table infographic type, each infographic type presenting the information in a different manner and, in some cases, allowing different forms of user interaction and analysis. Accordingly, in some cases, a user may wish to toggle between the various available infographic types to inspect the same search result data set in each infographic type. For instance, as shown in FIG. 12E, a user can select to view and interact with the returned search result data in the line graph infographic view 1213 (e.g., by selecting the view using control 1212).

As in other examples, the infographic (e.g., 1210) returned in response to a search query can be interactive and include graphical elements (e.g., 1214, 1216, 1218, 1220) that allow a user to further navigate to other GUI views (as shown in FIG. 12D). For instance, selection of a particular one of the graphical elements (e.g., 1214, 1216, 1218, 1220) presented in the pie chart type infographic of FIG. 12D, can cause a different infographic (of the same or a different type) to be presented related to the selected element. For instance, the selection of a particular one of the groups can cause the infographic of FIG. 12D to be replaced with an infographic (e.g., another pie chart) that shows the relative values of the "Activity Pct Complete" measure for each plan within the selected group (e.g., as shown in the example of FIG. 12G), among other examples.

Figure 12G:
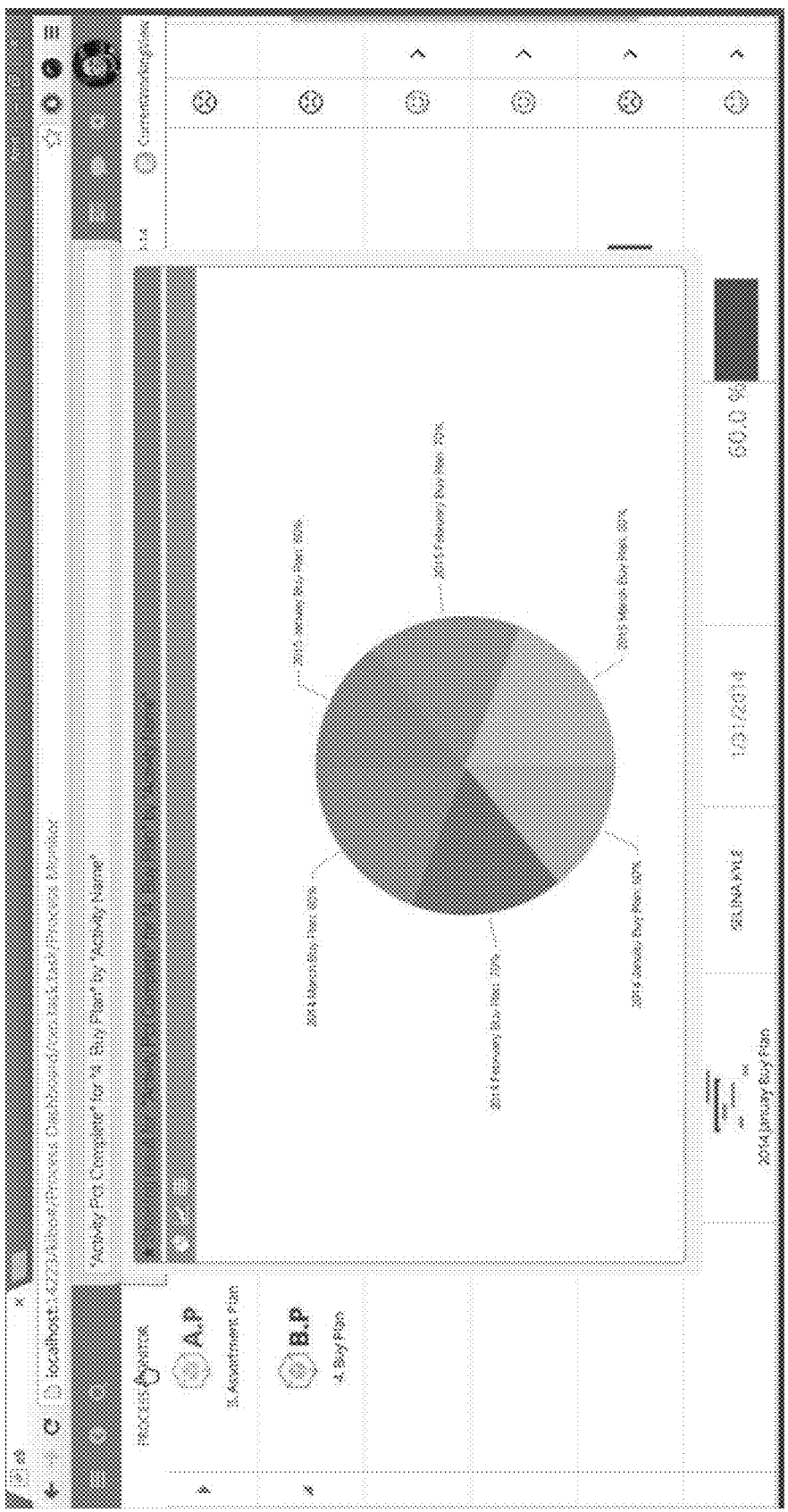

Turning to FIG. 12G, another example is shown of a search query that can be constructed to search an underlying network of plan models. In the example of FIG. 12G, a query "'Activity Pct Complete' for '4. Buy Plan' by 'Activity Name'" is received. The query may be generated with the assistance of the search engine and include user selections of recommendations made by the search engine for terms based on the structure of the data model to be searched. In response to the query, the search engine interprets the search according to the structure of the underlying plan models and extracts information to be incorporated in an infographic. In the example of FIG. 12G, the infographic is a pie graph showing a comparison between the respective degree of completion of each sub-plan of the Buy Plan. The infographic displayed in response to the search may also be presented by clicking on the Buy Plan graphic element 1220 (as shown in the example of FIG. 12D). Each of the sub-plans may have a corresponding plan model with an "Activity Pct Complete" value defined in a measure of the corresponding plan model. In another example, the value of "Activity Pct Complete" can be calculated by the search engine or other planning engine logic based on values of other measures defined within the respective plan models corresponding to each of the sub-plans (e.g., 2014 March Buy Plan, 2015 January Buy Plan, etc.). In another example, Buy Plan can be modeled by a single plan model. The single plan model can have a defined structure for storing data identified as generally relating to the Buy Plan. Values for measures at various levels of aggregation can be determined from the single plan model, such as values of "Activity Pct Complete" (or other measures used to calculate of "Activity Pct Complete") at any of a monthly, weekly, or quarterly level. For instance, to derive the monthly values, business logic can access data within the plan model and sort and/or filter the data to obtain the set of data corresponding to the measure at each respective month. The respective monthly measure values can then be generated. This filtering, sorting, and calculation can be performed in response to an initial search query (for which the measure value(s) is/are relevant) or a user interaction with a GUI that causes the presentation to show the measure values at a different level of aggregation, among other examples.

Figure 12H:
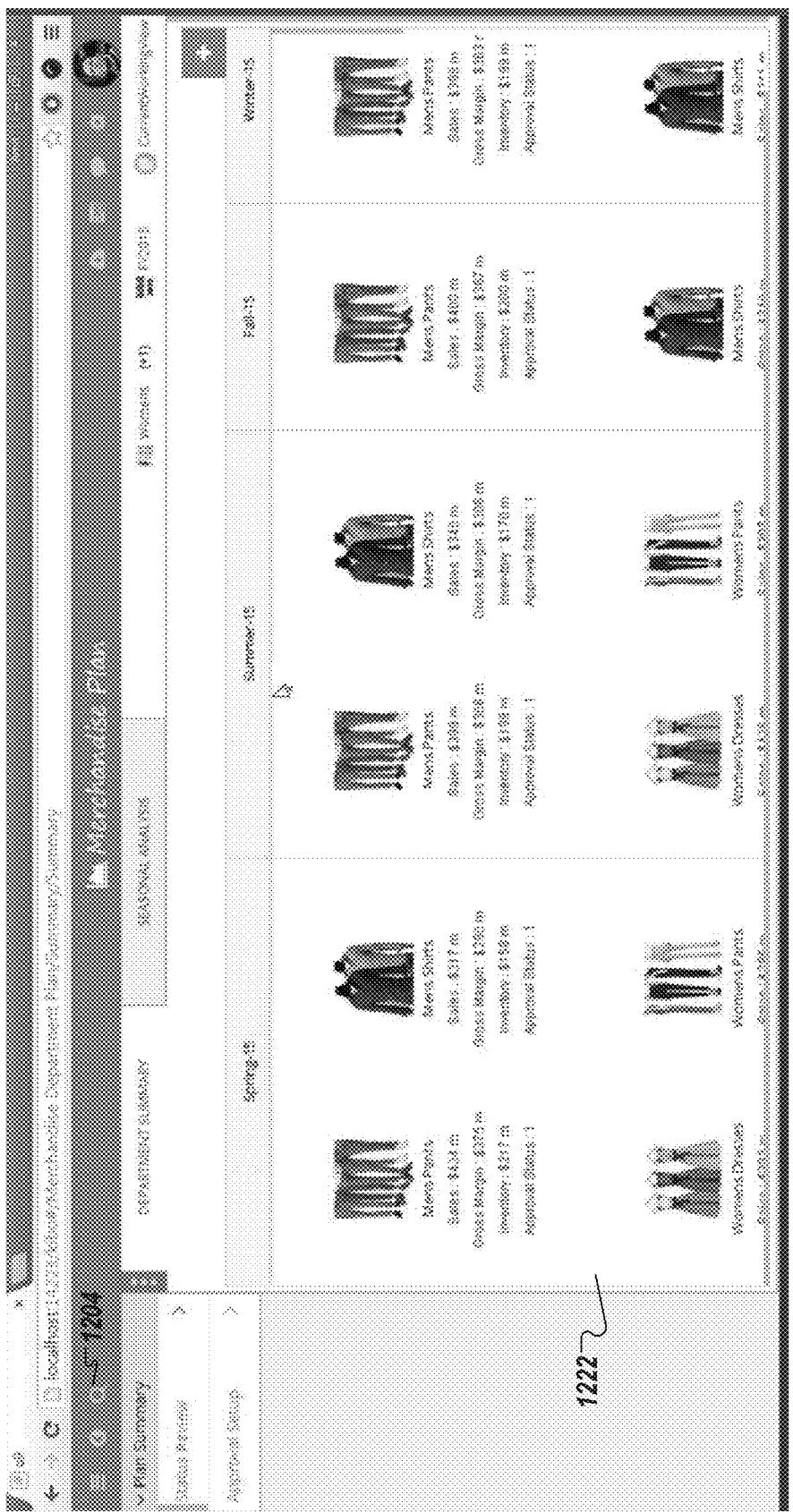
Figure 12I:
Figure 12J:
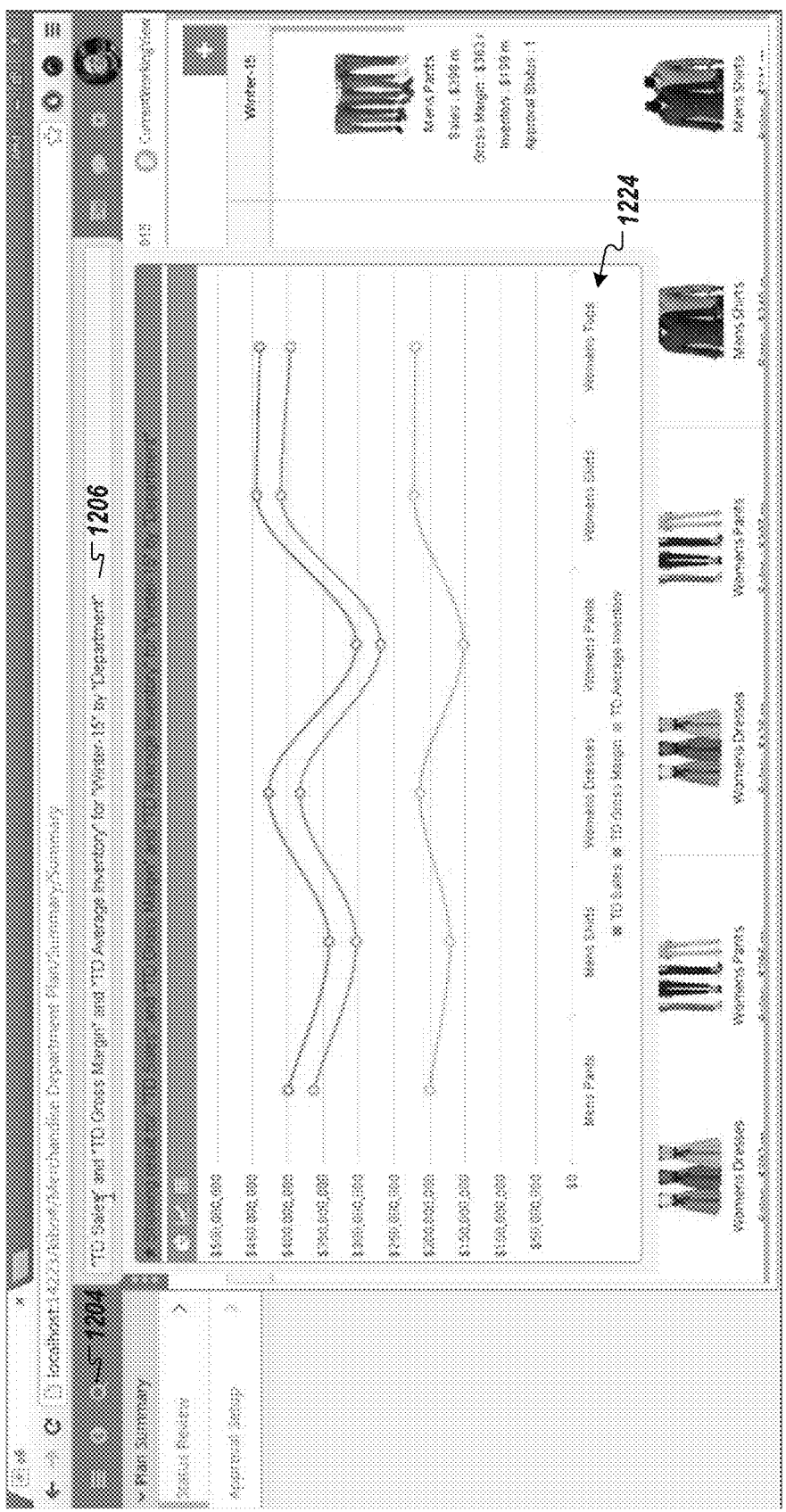

Turning to FIG. 12H, another screenshot 1200h is shown illustrating a visualization of information included in a merchandise plan model. The merchandise plan model may pertain to plans relating to merchandise offered by a particular enterprise. The enterprise may be the same or different from the enterprise whose plan models were discussed in connection with the examples of FIGS. 12A-12G. In this example, a visualization is presented in a table infographic 1222 showing various categories of merchandise (e.g., men's pants, men's shirts, women's pants, women's shirts, etc.) to be offered in various future retail seasons (e.g., Spring 2015, Summer 2015, Fall 2015, Winter 2015). The underlying merchandise plan model can model a plan for launching and carrying certain merchandise during these particular retail seasons. A user can use the GUI to sort by women's or men's merchandise, by season, fiscal year, and so on. Additionally, a user can toggle between a view showing summaries of merchandise by department (e.g., men's, women's, juniors, children, etc.) and a view showing representing the plan's seasonal analysis. As in other examples, a user can also search this (and other) plan models relating to the enterprise. Access to some plan models (and corresponding searches and search results) may be limited or customized base on the particular user signed in and involved in the session. As shown in FIG. 12I, by selecting search icon 1204, the user can launch a search field 1206 and enter in a search-engine assisted search query "'TD Sales' and 'TD Gross Margin' and 'TD Average Inventory' for 'Winter-15' by 'Department'". FIG. 12J shows a search result infographic 1224 that is returned in response to the search shown in FIG. 12I. In this example, the infographic type used in infographic 1224 is selected by the GUI engine (and/or search engine) based on identifying that multiple measures (e.g., TD Sales, TD Gross Margin, TD Average Inventor) were being asked to be compared in the search query. Accordingly, a "default" infographic type for this type of search is selected and used that enables easy comparison of the multiple measures. Further, the alternate infographic types (e.g., 1212) that are provided for selection by the user to toggle between this and other infographic presentations of the search result data can also be selected (e.g., by the GUI engine) based on the presumed usefulness of this subset of infographic types in visualizing the search results corresponding to this type of search.

Figure 12K:

Turning to FIG. 12K, another example screenshot 1200k of another visualization of a network of plan models is shown. In this example, a table infographic 1226 is shown showing sales drivers for a variety of departments of an enterprise (e.g., Women's Tops, Women's Pants, Women's Skirts, etc.). Each of the cells of the table infographic 1226 can be selectable through the GUI and allow a user to navigate to other filtered or detailed views relating to the selection. For instance, a user may select cell 1228 to view a breakdown of the sales drivers for each of the individual segments (e.g., retail, online, etc.) within "All Segments," among other examples. Again, a user can launch a search from the GUI presentation. The search can relate to the same or a different portion of the underlying network of plan models (or other enterprise data models).

Figure 12L:

FIG. 12L shows an example of a search launched from the GUI presentation in FIG. 12K. Modifiers included in a search query can indicate what types of results to be returned from the search. For instance, a user may request the "most," "best," "least," "top," or "bottom" measures within one or more dimensions defined by one or more dimension search terms and other modifiers. In the example of FIG. 12L, a search query is entered (with or without assistance of the search engine): "top 5 'Department' and 'Market Region Group' by 'MI Market Size'". The search engine can interpret the query to identify the universe of "MI Market Size" measure values for each of the combinations of department and market regions (e.g., men's shirts in specialty stores, women's tops in specialty stores, men's shirts in department stores, etc.) defined within a network of plan models and then return the combinations with the top five highest "MI Market Size" measure values. In this example, the search engine (and/or GUI engine) can determine that a table-type infographic 1230 should be returned for this type search result. Alternate infographic view types can also be made available for presenting these results in different infographic types.

Figure 13A:
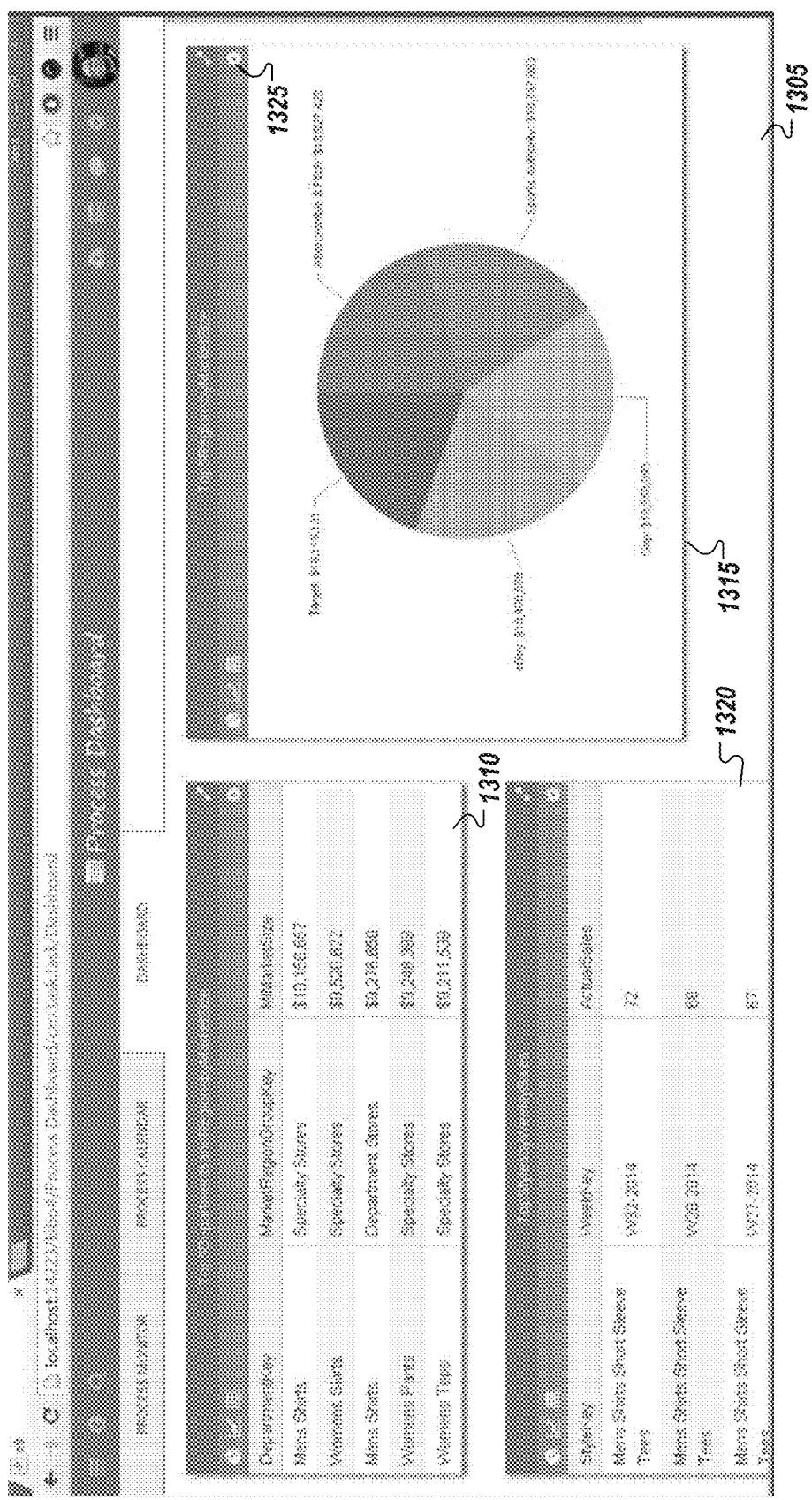

Turning to FIGS. 13A-13D, screenshots 1300a-d are shown of additional example user interfaces of an example plan model (or planning) system. As introduced above, in some implementations, one or more dashboards can be defined by a user or group of users (e.g., in a particular department). Each dashboard 1305 can include one or more windows or views (e.g., 1310, 1315, 1320) presented simultaneously in the dashboard 1305, such as shown in the example of FIG. 13A. The windows 1310, 1315, 1320 can be selected for the value they provide to a user in assessing key performance indicators relating to the plans and activities they engage in. In the example of FIGS. 13A-13D, a Process Dashboard has been defined by one or more users. A planning engine may offer pre-defined dashboard windows showing common windows of use by other users or customers. Additionally, the user may custom define the windows. Indeed, in one implementation, the windows can correspond to an infographic generated in response to a search query of a network of planning models, such as shown and described in the examples of FIGS. 12A-12L. As an example, in FIG. 13A, a user has selected to include the infographic 1230 returned from the query "top 5 'Department' and 'Market Region Group' by 'MI Market Size'" (in window 1310). Indeed, from the search results view (e.g., shown in FIG. 12L), a user can select a control presented with the infographic to request that the presented infographic be adopted in one or more dashboards controlled by the user. The user may then drag and drop the selected infographic into the desired position within the dashboard 1305.

Planning models can be periodically or continuously updated as new source data is discovered or made available and populated within corresponding planning models. The source data can be user entered and/or automatically identified and auto-populated within the modules by one or more planning engine tools. In some cases, model updates can occur in real time with updates or changes to the source data. As a result, an infographic developed from a search of the underlying enterprise plan models at a first instance of time may differ from the same search of the underlying enterprise plan models at a later second instance of time. Moreover, in some implementations, should the updates to the plan model take place as a user is viewing an infographic based upon the updated plan model, the infographic presentation (whether in a search session or within a dashboard window) can be updated as well, in real time, to reflect the changes to the plan model. For instance, the search engine can identify that a change has been made to a plan model for which the search engine has recently generated search results for a corresponding query or upon which a dashboard window is reliant, and push updated search results to a GUI engine and/or dashboard engine to cause these changes to be reflected in a corresponding infographic, among other example implementations.

Figure 13B:
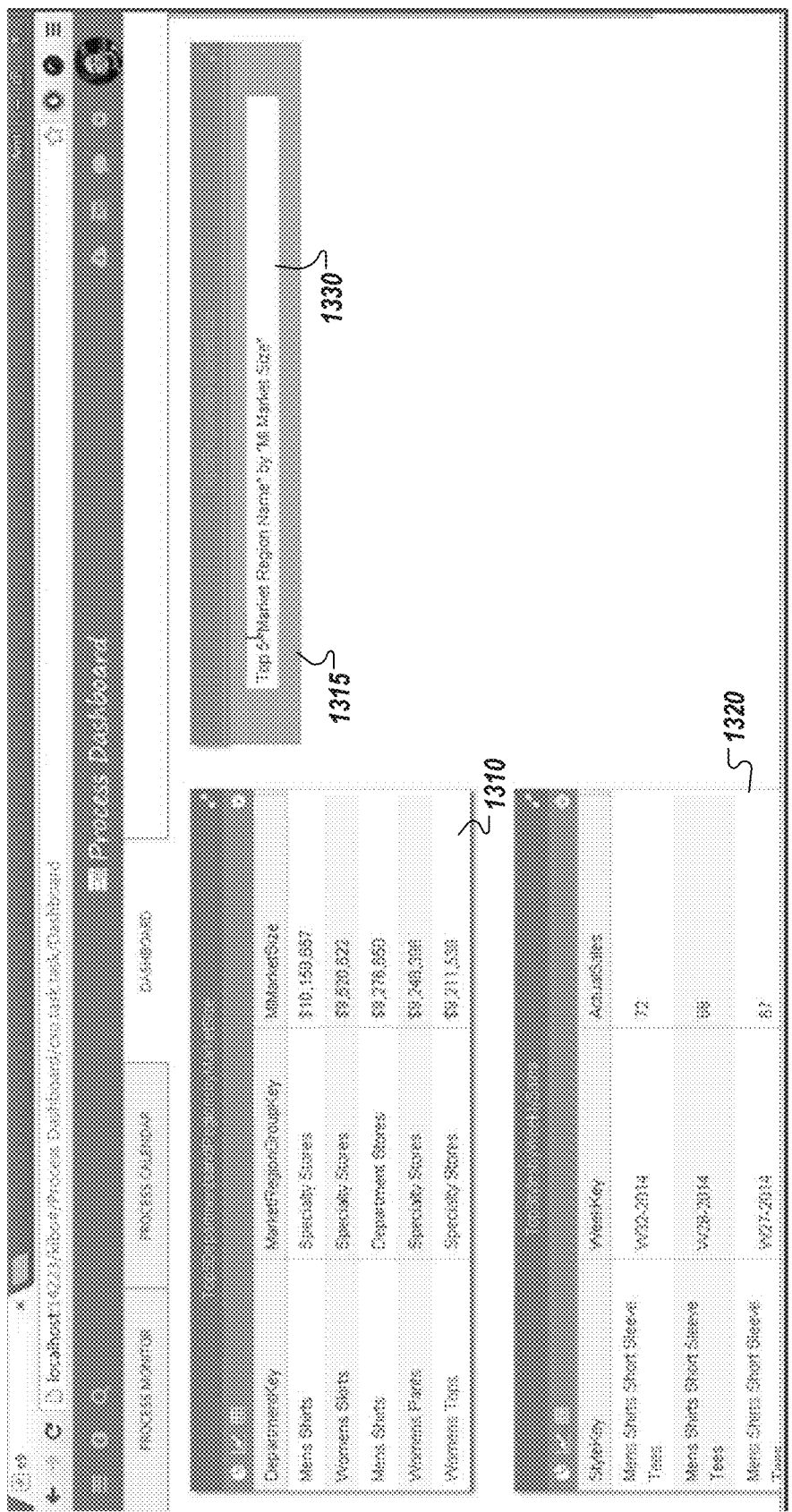
Figure 13C:
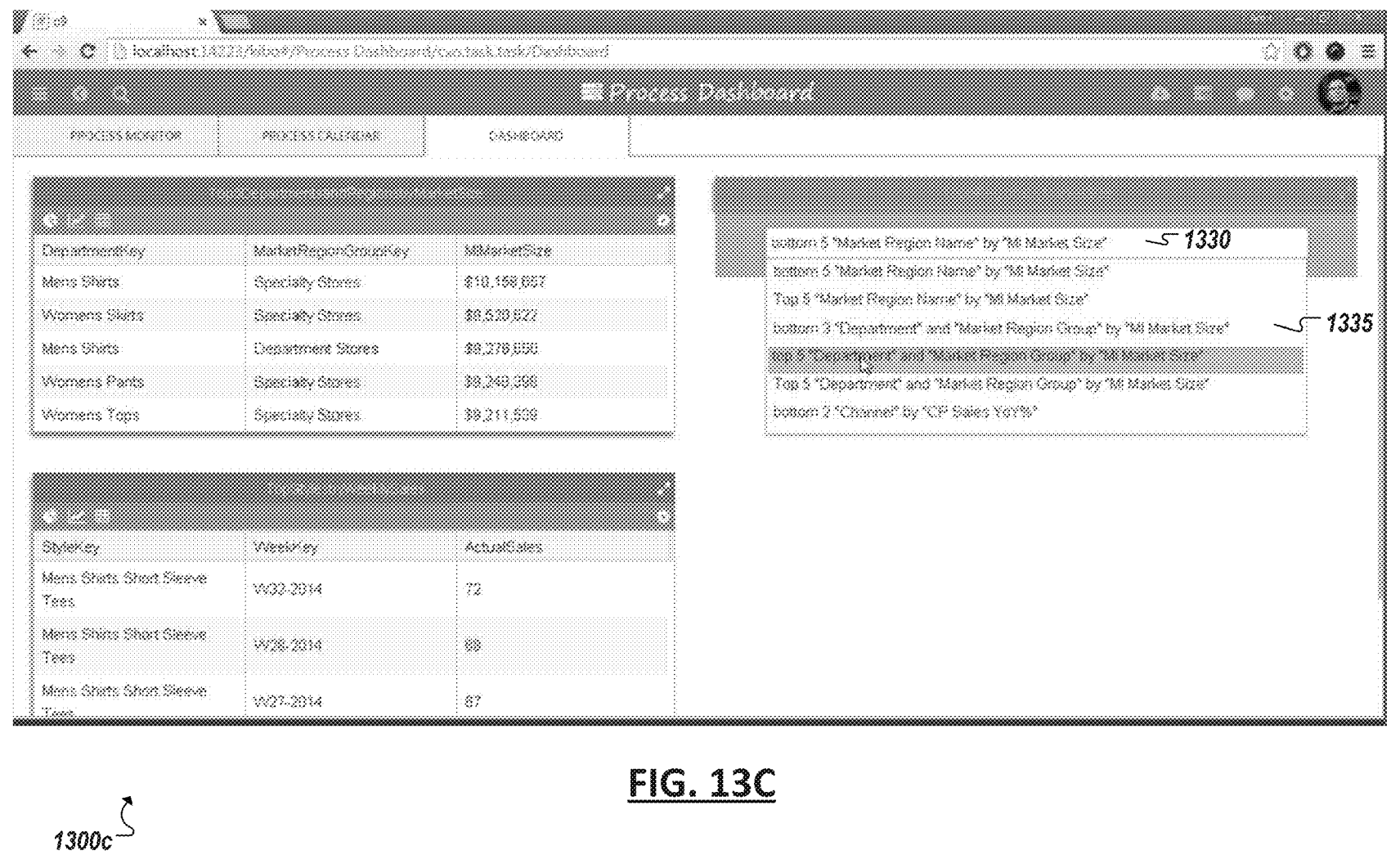
Figure 13D:
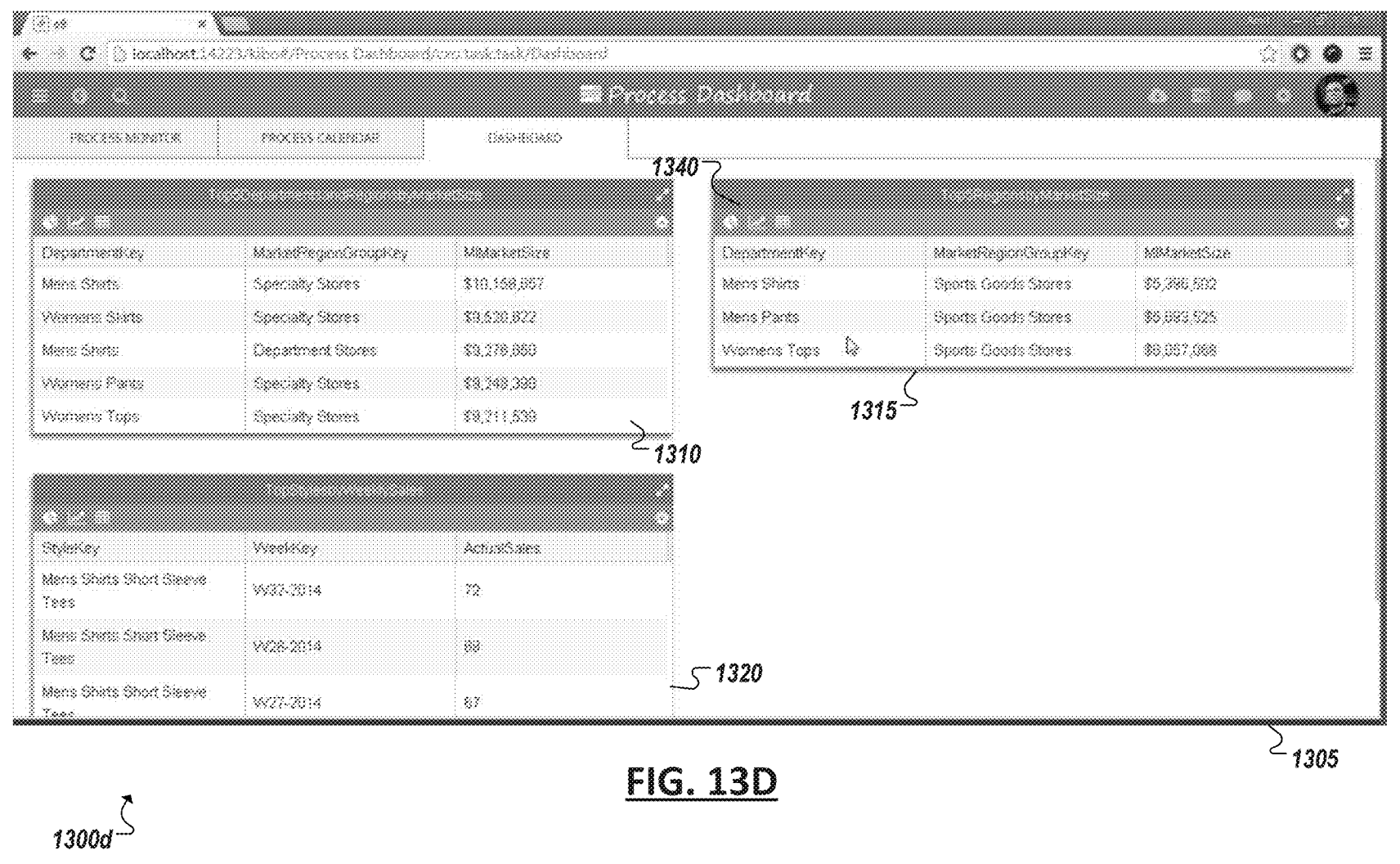

A user can refine the underlying definition of any one of the infographic windows 1310, 1315, 1320 by editing the corresponding search query upon which the infographic is based. For instance, a user can select a settings button (e.g., 1325) of one of the windows (e.g., 1315) to edit the window definition. For instance, FIG. 13B shows a screenshot 1300b showing the result of selecting settings button 1325. The dashboard GUI can present a query field 1330 showing the search query (e.g., 'Market Region Name' by 'MI Market Size'") that resulted in the infographic presented in window 1315 (as shown in FIG. 13A). The user can then enter additional text within the field 1330 to edit the query and thereby also the corresponding dashboard window's infographic. As with other searches, editing of the query can be assisted by a search engine providing search term recommendations based on the search engine's global view of the network of plan models' structure. For instance, as shown in FIG. 13C, a number of search recommendations can be presented to a user in a listing 1335 based on text entered by a user in field 1330. Upon finalizing the editing of the search query (and potentially accepting one or more search term or search query recommendations made by the search engine), the user can request that the updated search query be used in the window. For instance, as shown in FIG. 13D, a user can edit the query corresponding to window 1315 to "top 5 'Market Region Group' by 'MI Market Size'". The search engine can generate results for the search from the underlying plan models and the search engine and/or GUI engine (as in other searches) can determine an appropriate infographic type for the search results. For instance, in the example of FIG. 13D, a table infographic type is selected and presented to the user, replacing the pie chart infographic shown in FIG. 13A based on the previous search query. Additionally, the table infographic may be a default infographic selected by the search engine based on characteristics of the search query or search results. The user may further customize the infographic presented in the window 1315 by selecting an alternate available infographic type (e.g., using control 1340).

It should be appreciated that the screenshots presented in FIGS. 12A-12L and 13A-13D are presented as examples only. The principles described herein, including the search functionality described, can be applied to a variety of user interfaces associated with structured enterprise data models. For instance, the principles discussed herein may be applied to such user interfaces as shown and described in U.S. patent application Ser. No. 14/752,810.

Figure 14A:
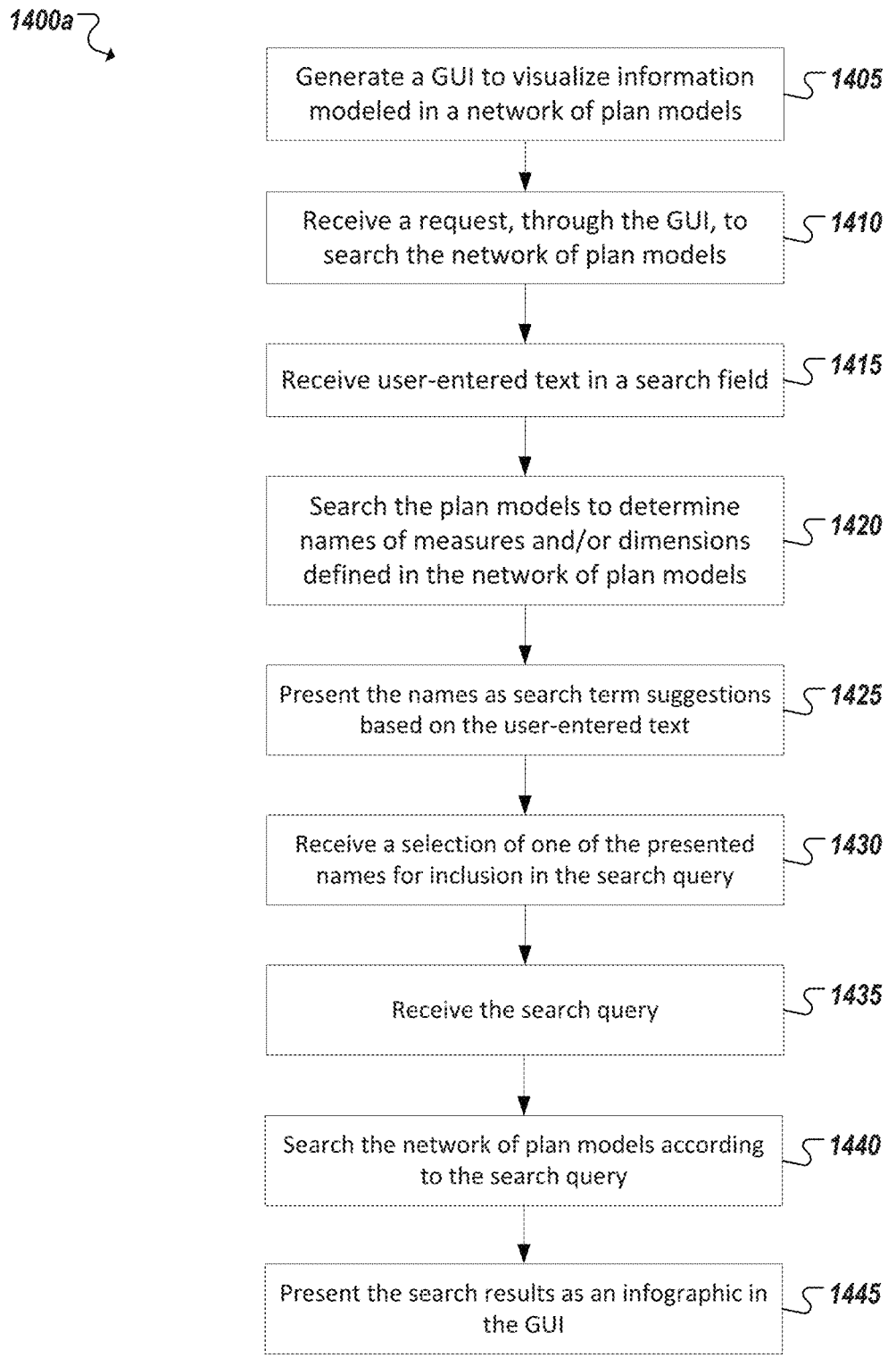
FIGS. 14A-14B are flowcharts of example techniques for using a search engine to search one or more example plan models in accordance with at least some embodiments.
Figure 14B:
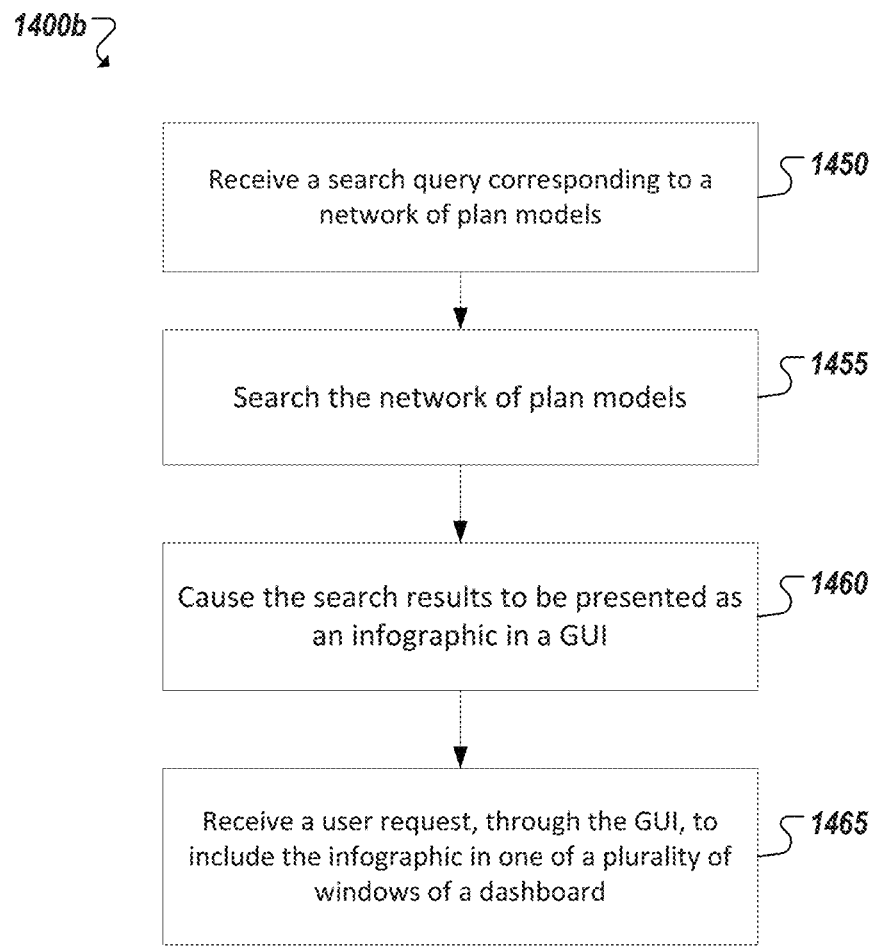

FIGS. 14A-B include simplified flowcharts 1400a-b illustrating example techniques for searching a network of enterprise data models, such as plan models. In the example of FIG. 14A, a GUI can be generated 1405 and presented on a user computing device, the GUI used to present visualizations of information modeled in the plan models. A request can be received 1410 through the GUI from a user requesting a search of the plan models. User-entered text can be received 1415 in a search field presented in the GUI in connection with the requested search. The plan models can be searched 1420 to determine one or more names of measures and/or dimensions included in the plan models that potentially correspond to the user-entered text. The names can be presented 1425 in the GUI (e.g., in a listing corresponding to the search field) as suggestions for search terms to be included in a search query. A selection of one of the presented names can be detected or received 1430 and adopted in the search query developed by the user in the search field. The user can complete the remainder of the search query and submit it. In connection with the receipt 1435 of the search query, the network of plan models can be searched 1440 according to the search query to generate a set of search results. The search results can be caused to be presented 1445 as an infographic providing a graphical representation of the content of the search results within the GUI.

In some cases, a search results infographic can be saved, for instance, as a window in a dashboard GUI including multiple windows. As shown in FIG. 14B, a search query can be received 1450 corresponding to a network of plan models. The network of plan models can be searched 1455 to generate a set of search results. The search results can be caused to be presented 1460 as an infographic providing a graphical representation of the content of the search results in a GUI. A user request can be received, through the GUI, to adopt the search result infographic as one of the windows in the dashboard GUI. The dashboard GUI can be interactive and allow the user to inspect the search query whereon the infographic is based. Indeed, the infographic can be updated as the search results corresponding to this search query change in connection with changes of the underlying network of plan models, among other examples.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. Systems and tools illustrated can similarly adopt alternate architectures, components, and modules to achieve similar results and functionality. For instance, in certain implementations, multitasking, parallel processing, and cloud-based solutions may be advantageous. Additionally, diverse user interface layouts, structures, architectures, and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. A computer storage medium can be a non-transitory medium. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

Networks, including core and access networks, including wireless access networks, can include one or more network elements. Network elements can encompass various types of routers, switches, gateways, bridges, load balancers, firewalls, servers, inline service nodes, proxies, processors, modules, or any other suitable device, component, element, or object operable to exchange information in a network environment. A network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

The following examples pertain to embodiments in accordance with this Specification. One or more embodiments may provide an apparatus, a system, a machine readable storage, a machine readable medium, a method, and hardware- and/or software-based logic (e.g., implemented in connection with a shared memory controller) to add an event to a plan model modeling outcomes of a particular business domain of a business organization, determine an effect of the event on values of one or more measures of the plan model, and present a graphical representation illustrating the effect.

In some examples, the addition of the event can be saved as a scenario. The event can include an initiative or program to be performed by at least a portion of the business entity. A definition of the initiative or program can be received identifying that the initiative or program affects the one or more measures. A graphical representation of the initiative or program can be rendered on a calendar user interface to be displayed on a computer display device.

One or more embodiments may provide an apparatus, a system, a machine readable storage, a machine readable medium, a method, and hardware- and/or software-based logic (e.g., implemented in connection with a shared memory controller) to identify one or more measures defined for a plan in a corresponding plan model, determine, from the plan model, a current value of the measures, and present a graphical representation of the values of the measures in a summary view within a graphical user interface to be displayed on a computer display device. The representation of each value can be selectable to navigate the graphical user interface to a different view highlighting the selected measure.

In some examples, a change to another measure received through the user interface can be identified, the value of a particular one of the one or more measures can be updated, and the update can be reflected in the summary view. The summary view can include a column persistently occupying a portion of the user interface while information of the corresponding plan model is to be rendered in at least another portion of the user interface. One or more measures can be determined to be key performance indicators for the plan. Different plan models can be selected to be presented in a graphical user interface and a similar summary view can be determined and presented for each of the different plan models.

One or more embodiments may provide an apparatus, a system, a machine readable storage, a machine readable medium, a method, and hardware- and/or software-based logic (e.g., implemented in connection with a shared memory controller) to identify a user selection of one or more business entities, modeled within a plan model, can be identified defining a domain. A user selection of a particular one of a set of measures defined in the plan model can be identified. One or more values for the particular measure can be determined from the plan model and a grid user interface can be rendered in a computing display device, the grid identifying one or more members of member types corresponding the business entities and measure values corresponding to a combination of the member types.

In some examples, the grid can be sorted based on the respective measure values of each combination. The grid can be expandable to present sub-combinations under each combination, together with corresponding measure values for each sub-combination. Subcombinations can be based on relationships between each subcombination and the combination defined within the plan model. Each grid cell can be selectable to enable both navigation to another user interface view of details of the respective combination's measure value and editing of the respective combination's measure value.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
    generating an interactive user interface to illustrate a graphical view of a network of plan models, wherein the network of plan models comprises a plurality of plan models, each plan model comprises one or more measures and one or more dimensions and models a future outcome of a corresponding business domain, wherein each plan model of the plurality of plan models comprises a respective instance of a data structure defining:
        one or more outcome measure models,
        a set of input driver models, and
        a sensitivity model, comprising correlation models and a propagation model, defining dependencies, using the correlation models, of each outcome measure model on one or more of the set of input driver models, wherein the correlation models include a lead time function defining a period of time before a change to an input driver impacts at least one of: a dependent input driver or a dependent outcome measure;
    identifying a particular input driver from the input driver models without a corresponding correlation model;
    determining an outcome measure dependency for the particular input driver using the propagation model, wherein the propagation model is automatically generated from a set of correlation models that define input drivers and outcome measures;
    selecting an infographic type based on a user preference,
    generating a dashboard in the interactive user interface with the graphical view of the network of plan models and an infographic of the infographic type;
    identifying a change with at least one of the plan models based on the outcome measure dependency for the particular input driver, wherein the outcome measure dependency for the particular input driver is continuously monitored and updated as a new source data for the particular input driver is discovered or made available, and wherein the change with the at least one of the plan models is based on the updated outcome measure dependency for the particular input driver; and automatically updating the infographic in real time based on the change with at least one of the plan models and the user preference.

2. The method of claim 1, further comprising:
receiving a search query comprising a plurality of search terms;
searching the network of plan models to generate search results corresponding to the search query; and
selecting the infographic of the infographic type to present the search results based on characteristics of at least one of the search query and the search results.

3. The method of claim 2, wherein the infographic type is selected based on a number of measures identified from the search query.

4. The method of claim 2, wherein the infographic type is selected from a time dimension identified in the search query.

5. The method of claim 2, wherein the search query further comprises one or more modifiers.

6. The method of claim 2, wherein generating the search results comprises calculating, from values of one or more plan model measures, a new value for inclusion in the search results.

7. The method of claim 1, wherein infographic types comprise a pie chart type, line chart type, and table type.

8. The method of claim 7, wherein the graphical view presents an interactive control to allow a user to toggle the infographic between two or more of the infographic types.

9. The method of claim 1, wherein the infographic comprises a plurality of interactive graphical components and user interaction with any one of the plurality of interactive graphical components filters information presented in the infographic.

10. The method of claim 1, wherein the network of plan models comprise one or more link expressions defining relationships between two or more of the plurality of plan models.

11. The method of claim 1, further comprising receiving a user selection to save the infographic for inclusion in one of a plurality of windows of a graphical dashboard.

12. A non-transitory computer readable medium storing instructions operable, when executed by a processor, to cause the processor to:
generate an interactive user interface to illustrate a graphical view of a network of plan models, wherein the network of plan models comprises a plurality of plan models, each plan model comprises one or more measures and one or more dimensions and models a future outcome of a corresponding business domain, wherein each plan model of the plurality of plan models comprises a respective instance of a data structure defining:
one or more outcome measure models,
a set of input driver models, and
a sensitivity model, comprising correlation models and a propagation model, defining dependencies, using the correlation models, of each outcome measure model on one or more of the set of input driver models, wherein the correlation models include a lead time function defining a period of time before a change to an input driver impacts at least one of: a dependent input driver or a dependent outcome measure;
identify a particular input driver from the input driver models without a corresponding correlation model;
determine an outcome measure dependency for the particular input driver using the propagation model, wherein the propagation model is automatically generated from a set of correlation models that define input drivers and outcome measures;
select an infographic type based on a user preference;
generate a dashboard in the interactive user interface with the graphical view of the network of plan models and an infographic of the infographic type;
identify a change with at least one of the plan models based on the outcome measure dependency for the particular input driver, wherein the outcome measure dependency for the particular input driver is continuously monitored and updated as a new source data for the particular input driver is discovered or made available, and wherein the change with the at least one of the plan models is based on the updated outcome measure dependency for the particular input driver; and
automatically update the infographic in real time based on the change with at least one of the plan models.

13. A method comprising:
receiving a search query corresponding to a network of plan models, wherein each of the plan models model a future outcome of a corresponding business domain, and wherein each of the plan models comprises a respective instance of a data structure defining:
one or more outcome measure models,
a set of input driver models, and
a sensitivity model, comprising correlation models and a propagation model, defining dependencies, using the correlation models, of each outcome measure model on one or more of the set of input driver models, wherein the correlation models include a lead time function defining a period of time before a change to an input driver impacts at least one of: a dependent input driver or a dependent outcome measure;
identifying a particular input driver from the input driver models without a corresponding correlation model;
determining an outcome measure dependency for the particular input driver using the propagation model, wherein the propagation model is automatically generated from a set of correlation models that define input drivers and outcome measures;
identifying user preference information in user preference data of a user;
searching the network of plan models to generate search results corresponding to the search query, wherein the search results are generated based in part on the user preference information;
causing the search results to be presented on a graphical user interface as an infographic providing a graphical visualization of the search results;
receiving a user request, through the graphical user interface, to include the infographic in a particular one of a plurality of windows of a dashboard user interface;
identifying a change with at least one of the plan models based on the outcome measure dependency for the particular input driver, wherein the outcome measure dependency for the particular input driver is continuously monitored and updated as a new source data for the particular input driver is discovered or made available, and wherein the change with the at least one of the plan models is based on the updated outcome measure dependency for the particular input driver; and
automatically updating the infographic in real time based on the change with at least one of the plan models and the user preference information.

14. The method of claim 13, further comprising:
detecting a user interaction with a second window of the plurality of windows, wherein the second window comprises another infographic; and
presenting text of another search query, wherein the other infographic is generated from search results returned to correspond to the other search query.

15. The method of claim 14, further comprising:
receiving user inputs to edit the other search query;
performing a search of the network of plan models based on the edited other search query; and
replacing the other infographic with a new infographic based on search results corresponding to the edited other search query.

16. The method of claim 13, wherein the infographic comprises a particular one of a plurality of infographic types, the method further comprising:
receiving a user selection of an alternative one of the plurality of infographic types to be applied to the infographic; and
causing the infographic to be changed within the particular window to an infographic of the alternative type based on the search results.

17. A non-transitory computer readable medium storing instructions operable, when executed by a processor, to cause the processor to:
receive a search query corresponding to a network of plan models, wherein each of the plan models model a future outcome of a corresponding business domain, and wherein each of the plan models comprises a respective instance of a data structure defining:
one or more outcome measure models,
a set of input driver models, and
a sensitivity model, comprising correlation models and a propagation model, defining dependencies, using the correlation models, of each outcome measure model on one or more of the set of input driver models, wherein the correlation models include a lead time function defining a period of time before a change to an input driver impacts at least one of: a dependent input driver or a dependent outcome measure;
identify a particular input driver from the input driver models without a corresponding correlation model;
determine an outcome measure dependency for the particular input driver using the propagation model, wherein the propagation model is automatically generated from a set of correlation models that define input drivers and outcome measures;
identify user preference information in user preference data of a user;
search the network of plan models to generate search results corresponding to the search query, wherein the search results are generated based in part on the user preference information;
cause the search results to be presented on a graphical user interface as an infographic providing a graphical visualization of the search results;
receive a user request, through the graphical user interface, to include the infographic in a particular one of a plurality of windows of a dashboard user interface;
identifying a change with at least one of the plan models based on the outcome measure dependency for the particular input driver, wherein the outcome measure dependency for the particular input driver is continuously monitored and updated as a new source data for the particular input driver is discovered or made available, and wherein the change with the at least one of the plan models is based on the updated outcome measure dependency for the particular input driver; and
automatically updating the infographic in real time based on the change with at least one of the plan models and the user preference information.

* * * * *